US010380911B2

(12) United States Patent
Hsu et al.

(10) Patent No.: US 10,380,911 B2
(45) Date of Patent: Aug. 13, 2019

(54) METHODS AND APPARATUS TO PROVIDE VISUAL INFORMATION ASSOCIATED WITH WELDING OPERATIONS

(71) Applicant: Illinois Tool Works Inc., Glenview, IL (US)

(72) Inventors: Christopher Hsu, Appleton, WI (US); Scott Nicholas Schmidt, Tipp City, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 36 days.

(21) Appl. No.: 15/061,336

(22) Filed: Mar. 4, 2016

(65) Prior Publication Data
US 2016/0267806 A1 Sep. 15, 2016

Related U.S. Application Data

(60) Provisional application No. 62/143,243, filed on Apr. 6, 2015, provisional application No. 62/130,340, filed on Mar. 9, 2015.

(51) Int. Cl.
*G09B 19/00* (2006.01)
*G09B 19/24* (2006.01)
(Continued)

(52) U.S. Cl.
CPC ............ *G09B 19/00* (2013.01); *B23K 9/0956* (2013.01); *B23K 9/32* (2013.01); *G09B 5/02* (2013.01);
(Continued)

(58) Field of Classification Search
CPC .... B23K 9/095; B23K 9/0953; B23K 9/0956; B25H 3/06; B25H 3/02; B25H 1/04
(Continued)

(56) References Cited

U.S. PATENT DOCUMENTS 3,652,824 A 3/1972 Okada
4,021,840 A 5/1977 Ellsworth
(Continued)

FOREIGN PATENT DOCUMENTS

CA 2725719 A1 6/2012
CA 2778699 11/2012
(Continued)

OTHER PUBLICATIONS

Hillers, Bernd & Aiteanu, D & Tschirner, P & Park, M & Graeser, Axel & Balazs, B & Schmidt, L. (2004). TEREBES: Welding helmet with AR capabilities.*
(Continued)

*Primary Examiner* — Robert J Utama
(74) *Attorney, Agent, or Firm* — McAndrews, Held & Malloy, Ltd.

(57) ABSTRACT

Methods and apparatus to provide visual information associated with welding operations are disclosed. An weld training system includes a display, a camera, a communications device, and a welding helmet. The communications device communicates with welding equipment. The welding helmet has a view port. The communications device is configured to hold the camera, the communications device, and the display such that, when the welding helmet is worn by a wearer, the display is viewable by the wearer, the camera has a view through the view port such that the display displays to the wearer images taken by the camera through the view port and displays a simulated object generated based on information received from the welding equipment via the communications device.

19 Claims, 35 Drawing Sheets

(51) Int. Cl.
   *B23K 9/095* (2006.01)
   *B23K 9/32* (2006.01)
   *G09B 5/02* (2006.01)
   *B25H 3/06* (2006.01)
   *B25H 3/02* (2006.01)
   *B25H 1/04* (2006.01)

(52) U.S. Cl.
   CPC .............. *G09B 19/24* (2013.01); *B25H 1/04* (2013.01); *B25H 3/02* (2013.01); *B25H 3/06* (2013.01)

(58) Field of Classification Search
   USPC .................................................. 434/219, 234
   See application file for complete search history.

(56) References Cited

U.S. PATENT DOCUMENTS

| | | |
|---|---|---|
| 4,280,137 A | 7/1981 | Ashida |
| 4,477,712 A | 10/1984 | Lillquist |
| 4,577,796 A | 3/1986 | Powers |
| 4,641,292 A | 2/1987 | Tunnell |
| 4,707,647 A | 11/1987 | Coldren |
| 4,733,051 A | 3/1988 | Nadeau |
| 4,812,614 A | 3/1989 | Wang |
| 5,275,327 A | 1/1994 | Watkins |
| 5,380,978 A | 1/1995 | Pryor |
| 5,572,102 A | 11/1996 | Goodfellow |
| 5,580,475 A | 12/1996 | Sakai |
| 5,923,555 A | 7/1999 | Bailey |
| 5,932,123 A | 8/1999 | Marhofer |
| 5,978,090 A | 11/1999 | Burri |
| 6,122,042 A | 9/2000 | Wunderman et al. |
| 6,240,253 B1 | 5/2001 | Yamaguchi |
| 6,242,711 B1 | 6/2001 | Cooper |
| 6,572,379 B1* | 6/2003 | Sears ............... G09B 25/02 206/223 |
| 6,587,186 B2 | 7/2003 | Bamji |
| 6,734,393 B1 | 5/2004 | Friedl |
| 7,534,005 B1 | 5/2009 | Buckman |
| 7,926,118 B2 | 4/2011 | Becker |
| 7,962,967 B2 | 6/2011 | Becker |
| 7,987,492 B2 | 7/2011 | Liwerant et al. |
| 8,274,013 B2 | 9/2012 | Wallace |
| 8,275,201 B2 | 9/2012 | Rangwala |
| 8,316,462 B2 | 11/2012 | Becker |
| 8,502,866 B2 | 8/2013 | Becker et al. |
| 8,569,655 B2 | 10/2013 | Cole |
| 8,605,008 B1 | 12/2013 | Prest |
| 8,680,434 B2 | 3/2014 | Stoger |
| 8,808,164 B2 | 8/2014 | Hoffman |
| 8,826,357 B2 | 9/2014 | Fink et al. |
| 8,915,740 B2 | 12/2014 | Zboray |
| 8,934,029 B2 | 1/2015 | Nayar |
| 8,957,835 B2 | 2/2015 | Hoellwarth |
| 8,964,298 B2 | 2/2015 | Haddick |
| RE45,398 E | 3/2015 | Wallace |
| 8,992,226 B1 | 3/2015 | Leach |
| 9,056,365 B2 | 6/2015 | Hoertenhuber et al. |
| 9,097,891 B2 | 8/2015 | Border |
| 9,101,994 B2 | 8/2015 | Albrecht |
| 9,235,051 B2 | 1/2016 | Salter |
| 9,244,539 B2 | 1/2016 | Venable |
| 9,666,160 B2 | 5/2017 | Patel |
| 9,977,242 B2 | 5/2018 | Patel |
| 2002/0017752 A1* | 2/2002 | Levi ............... B25H 1/04 269/139 |
| 2004/0034608 A1 | 2/2004 | de Miranda et al. |
| 2004/0189675 A1 | 9/2004 | Pretlove |
| 2005/0001155 A1 | 1/2005 | Fergason |
| 2005/0099102 A1* | 5/2005 | Villarreal ............ A47B 3/10 312/237 |
| 2005/0103767 A1 | 5/2005 | Kainec |
| 2005/0161357 A1* | 7/2005 | Allan ............... B25B 1/103 206/373 |
| 2005/0199605 A1 | 9/2005 | Furman |
| 2006/0087502 A1 | 4/2006 | Karidis |
| 2006/0176467 A1 | 8/2006 | Rafii |
| 2006/0207980 A1 | 9/2006 | Jacovetty |
| 2006/0213892 A1 | 9/2006 | Ott |
| 2006/0281971 A1 | 12/2006 | Sauer |
| 2007/0187378 A1 | 8/2007 | Karakas |
| 2008/0083351 A1* | 4/2008 | Lippert ............... A47B 3/10 108/44 |
| 2008/0187235 A1 | 8/2008 | Wakazono |
| 2008/0314887 A1 | 12/2008 | Stoger et al. |
| 2009/0014500 A1 | 1/2009 | Cho et al. |
| 2009/0134203 A1 | 5/2009 | Domec et al. |
| 2009/0231423 A1 | 9/2009 | Becker |
| 2009/0276930 A1 | 11/2009 | Becker |
| 2009/0298024 A1 | 12/2009 | Batzler et al. |
| 2010/0206851 A1 | 8/2010 | Nakatate |
| 2010/0223706 A1 | 9/2010 | Becker |
| 2011/0091846 A1* | 4/2011 | Kreindl ............... B23K 9/00 434/234 |
| 2011/0108536 A1 | 5/2011 | Inada |
| 2011/0117527 A1 | 5/2011 | Conrardy |
| 2011/0187859 A1 | 8/2011 | Edelson |
| 2011/0220616 A1 | 9/2011 | Mehn |
| 2011/0220619 A1 | 9/2011 | Mehn |
| 2011/0227934 A1 | 9/2011 | Sharp |
| 2011/0309236 A1 | 12/2011 | Tian |
| 2012/0012561 A1 | 1/2012 | Wiryadinata |
| 2012/0074114 A1 | 3/2012 | Kawamoto |
| 2012/0176659 A1 | 7/2012 | Hsieh |
| 2012/0180180 A1 | 7/2012 | Steve |
| 2012/0189993 A1* | 7/2012 | Kindig ............... G09B 19/24 434/234 |
| 2012/0229632 A1 | 9/2012 | Hoertenhuber |
| 2012/0241429 A1 | 9/2012 | Knoener |
| 2012/0249400 A1 | 10/2012 | Demonchy |
| 2012/0262601 A1 | 10/2012 | Choi |
| 2012/0291172 A1 | 11/2012 | Wills |
| 2012/2298640 | 11/2012 | Conrardy |
| 2013/0050432 A1 | 2/2013 | Perez |
| 2013/0081293 A1 | 4/2013 | Delin |
| 2013/0189657 A1* | 7/2013 | Wallace ............... G09B 5/00 434/234 |
| 2013/0189658 A1 | 7/2013 | Peters et al. |
| 2013/0206740 A1 | 8/2013 | Pfeifer |
| 2013/0206741 A1 | 8/2013 | Pfeifer |
| 2013/0208569 A1 | 8/2013 | Pfeifer |
| 2013/0215281 A1 | 8/2013 | Hobby |
| 2013/0229485 A1 | 9/2013 | Rusanovskyy |
| 2013/0234935 A1 | 9/2013 | Griffith |
| 2013/0291271 A1 | 11/2013 | Becker |
| 2013/0321462 A1 | 12/2013 | Salter |
| 2013/0345868 A1 | 12/2013 | One |
| 2014/0014637 A1 | 1/2014 | Hunt |
| 2014/0020147 A1 | 1/2014 | Anderson |
| 2014/0059730 A1 | 3/2014 | Kim |
| 2014/0092015 A1 | 4/2014 | Xing |
| 2014/0134579 A1 | 5/2014 | Becker |
| 2014/0134580 A1 | 5/2014 | Becker |
| 2014/0144896 A1 | 5/2014 | Einav et al. |
| 2014/0159995 A1 | 6/2014 | Adams |
| 2014/0183176 A1 | 7/2014 | Hutchinson et al. |
| 2014/0184496 A1 | 7/2014 | Gribetz |
| 2014/0185282 A1 | 7/2014 | Hsu |
| 2014/0205976 A1 | 7/2014 | Peters |
| 2014/0232825 A1 | 8/2014 | Gotschlich |
| 2014/0263224 A1* | 9/2014 | Becker ............... B23K 9/0956 219/124.5 |
| 2014/0263249 A1 | 9/2014 | Miller |
| 2014/0272835 A1* | 9/2014 | Becker ............... G09B 19/24 434/234 |
| 2014/0272836 A1* | 9/2014 | Becker ............... G09B 19/24 434/234 |
| 2014/0272837 A1* | 9/2014 | Becker ............... G09B 19/24 434/234 |
| 2014/0272838 A1 | 9/2014 | Becker |
| 2014/0320529 A1 | 10/2014 | Roberts |
| 2014/0326705 A1 | 11/2014 | Kodama |

(56) References Cited

U.S. PATENT DOCUMENTS

| | | |
|---|---|---|
| 2015/0009316 A1 | 1/2015 | Baldwin |
| 2015/0056584 A1 | 2/2015 | Boulware |
| 2015/0072323 A1 | 3/2015 | Postlethwaite |
| 2015/0125836 A1 | 5/2015 | Daniel |
| 2015/0154884 A1 | 6/2015 | Salsich et al. |
| 2015/0190875 A1 | 7/2015 | Becker et al. |
| 2015/0190876 A1 | 7/2015 | Becker et al. |
| 2015/0190887 A1 | 7/2015 | Becker et al. |
| 2015/0190888 A1 | 7/2015 | Becker et al. |
| 2015/0194072 A1 | 7/2015 | Becker et al. |
| 2015/0194073 A1 | 7/2015 | Becker et al. |
| 2015/0209887 A1 | 7/2015 | DeLisio |
| 2015/0248845 A1 | 9/2015 | Postlethwaite |
| 2015/0304538 A1 | 10/2015 | Huang |
| 2015/0325153 A1* | 11/2015 | Albrecht ............... B23K 9/00 434/234 |
| 2015/0352653 A1* | 12/2015 | Albrecht ............ B23K 9/0026 219/124.22 |
| 2015/0375324 A1 | 12/2015 | Becker et al. |
| 2015/0375327 A1 | 12/2015 | Becker et al. |
| 2015/0379894 A1 | 12/2015 | Becker et al. |
| 2016/0027215 A1 | 1/2016 | Burns |
| 2016/0049085 A1* | 2/2016 | Beeson ............... B23K 9/0956 434/234 |
| 2016/0183677 A1* | 6/2016 | Achillopoulos ......... A45C 5/14 190/11 |
| 2016/0365004 A1 | 12/2016 | Matthews |
| 2017/0053557 A1 | 2/2017 | Daniel |
| 2017/0249858 A1 | 8/2017 | Boettcher |

FOREIGN PATENT DOCUMENTS

| | | |
|---|---|---|
| CN | 204013703 | 12/2014 |
| EP | 0165501 | 12/1985 |
| EP | 2082656 A1 | 7/2009 |
| JP | S52126656 | 10/1977 |
| JP | 2002178148 | 6/2002 |
| WO | 2008101379 A1 | 8/2008 |
| WO | 2009137379 A1 | 11/2009 |
| WO | 20130122805 A1 | 8/2013 |
| WO | 2014188244 | 11/2014 |
| WO | 2015121742 | 8/2015 |
| WO | 2016044680 | 3/2016 |

OTHER PUBLICATIONS

Hillers, Bernd, Iat Institut fur Automatislerungstechnik, doctoral thesis Selective Darkening Filer and Welding Arc Observation for the Manual Welding Process, Mar. 15, 2012,152 pgs.

"High Dynamic Range (HDR) Video Image Processing for Digital Glass, Wearable Cybernetic Eye Tap Helmet Prototype," Raymond Lo, https://www.youtube.com/watch?v=gtTdiqDqHc8, Sep. 12, 2012, YouTube screenshot Submitted in lieu of the video itself.

International Search Report and Written Opinion corresponding to International Patent Application No. PCT/US2016/020861, dated May 23, 2016.

Patent Cooperation Treaty, Notification of Transmittal of the International Search Report and the Written Opinion of the International Searching Authority, in PCT/US2016/020865, dated May 11, 2016, 12 pages.

Choi et al., Simulation of Dynamic Behavior in a GMAW System, Welding Research Supplement, 239-s thru 245-s (7 pages).

Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).

High Dynamic Range (HDR) Video Image Processing for Digital Glass, Augmented Reality in Quantigraphic Lightspace and Mediated Reality with Remote Expert, Raymond Lo, Sep. 12, 2012, https://www.youtube.com/watch?v=ygcm0AQXX9k, YouTube screenshot submitted in lieu of the video itself.

"ASH VR1-DIY Homebrew PC Virtual Reality Head Mounted Display HMD," alrons1972, hftps://www.youtube.com/watch?v=V0QboDZqguU, Mar. 3, 2013, YouTube screenshot submitted in lieu of the video itself.

"Soldamatic Augmented Training," Augmented Reality World, May 30, 2013, https://www.youtube.com/watch?v=Mn0O52Ow_qY, YouTube screenshot submitted in lieu of the video itself.

"Optical Head-Mounted Display," Wikipedia, Jun. 2, 2016, https://en.wikipedia.org/wiki/Optical_head-mounted_display, 14 pages.

"About Us." Weldobot.com. <http://weldobot.com/?page_id=6> Accessed Jun. 2, 2016. 1 page.

Int'l Search Report and Written Opinion for PCT/US2016/035473 dated Aug. 17, 2016 (15 pages).

G. Melton et al: "Laser diode based vision system for viewing arc welding (May 2009)", EUROJOIN 7, May 21, 2009 (May 21, 2009), XP055293872, Venice Lido, Italy, May 21-22, 2009.

Sergi Foix et al: "Exploitation of Time-of-Flight (ToF) Cameras IRI Technical Report", Oct. 1, 2007 (Oct. 1, 2007), pp. 1-22, XP055294087, Retrieved from the Internet: URL:http://digital.csic.es/bitstream/10261/30066/1 ltime-of-flight.pdf [retrieved on Aug. 8, 2016].

Intelligenter SchweiBbrenner, Intelligent Welding Torch, IP Bewertungs AG (IPB) (12 pages).

Intelligent Robotic Arc Sensing, Lincoln Electric, Oct. 20, 2014, http://www.lincolnelectric.com/en-us/support/process-and-theory/pages/intelligent-robotic-detail.aspx (3 pages).

LiveArc Welding Performance Management System, A reality-based recruiting, screening and training solution, MillerWelds.com 2014 (4 pages).

Handheld Welding Torch with Position Detection technology description, Sep. 21, 2011 (11 pages).

Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of robot_reference_frames_for enhanced_r obot_positioning_accuracy (19 pages).

Lutwak, Dr. Robert, Micro-Technology for Positioning, Navigation, and Timing Towards PNT Everywhere and Always Stanford PNT Symposium, Stanford, CA Oct. 29, 2014 (26 pages).

Lutwak, Dr. Robert, DARPA, Microsystems Tech. Office, Micro-Technology for Positioning, Navigation, and Timing Towards PNT Everywhere and Always, Feb. 2014 (4 pages).

Pamian, Neda et al., Integration of a Multi-Camera Vision System and Strapdown Inertial Naviation System (SDINS) with a Modified Kalman Filter, Sensors 2010,10, 5378-5394; doi: 10.3390/s100605378 (17 pages).

Pipe-Bug, Motorized & Manual Chain Driven Pipe Culling Machines From Bug-0 Systems (4 pages).

Electronic speckle pattern interferometry Wikipedia, the free encyclopedia (4 pages).

Rivers, et al., Position-Correcting Tools for 2D Digital Fabrication (7 pages).

Wavelength Selective Switching, http://en.wikipedia.org/wiki/wavelength_selective_switching, Mar. 4, 2015 (5 pages).

Cavilux HF, Laser Light for High-Speed Imaging, See What You Have Missed (2 pages).

Cavilux Smart, Laser Light for Monitoring and High Speed Imaging, Welcome to the Invisible World (2 pages).

Windows 10 to Get 'Holographic' Headset and Cortana, BBC News, www.bbc.cominewsitechnology-30924022, Feb. 26, 2015 (4 pages).

Daqri Smart Helmet, The World's First Wearable Human Machine Interface, Brochure (9 pages).

Li Larry, Time-of-Flight Camera—An Introduction, Technical White Paper, SLOA190B—Jan. 2014, revised May 2014 (10 pages).

Heston, Tim, Lights, camera, lean-recording manufacturing efficiency, The Fabricator, Aug. 2010 (4 pages).

Int'l Search Report and Written Opinion for PCT/US2015/067931 dated Jul. 26, 2016 (19 pages).

Cameron Series: "Why Weld Cameras Need Why High Dynamic Range Imaging", Apr. 10, 2013 (Apr. 10, 2013), XP055269605,

(56) References Cited

OTHER PUBLICATIONS

Retrieved from the Internet: URL:http://blog.xiris.com/blog/bid/258666/Why-Weld-Cameras-Need-High-Dynamic-Range-Imaging [retrieved on Apr. 29, 2016] the whole document (5 pages).
AD-081CL Digital 2CCD Progressive Scan HDR/High Frame Rate Camera User's Manual, Jul. 1, 2012 (Jul. 1, 2012) p. 27, XP055269758, Retrieved from the Internet: URL:http://www.stemmer-imaging.de/media/up loads/docmanager/53730_JAI_AD-081_CL_Manual.pdf [retrieved on Apr. 29, 2016] the whole document (55 pages).
Anonymous: "JAI introduces unique high-dynamic-range camera", Nov. 5, 2009 (Nov. 5, 2009), XP055269759, Retrieved from the Internet: URL:http://www.jai.com/en/newsevents/news/ad-081c1 [retrieved on Apr. 29, 2016] Typical HDR applications for the AD-081CL include inspection tasks where incident light or bright reflections are Oresent, such as . . . welding (2 pages).
Telops, Innovative Infrared Imaging, HDR-IR High Dynamic Range IR Camera, http://www.telops.com/en/infrared-Cameras/hdr-ir-high-dynamic-range-ir-camera, 2015 (2 pages).
OV10642:1.3-Megapixel OmniHDRTM, http://www.ovt.com/applications/application.php?id=7 (2 pages).
Altasens—Wide Dynamic Range (WDR), http://www.altasens.com/index.php/technology/wdr (1 page).
HDR Camera for Industrial and Commercial Use, Invisual E Inc., http://www.invisuale.com/hardware/hdr-camera.html (2 pages).
NIT, Magic Technology—White Paper, Scene Contrast Indexed Image Sensing with WDR (14 pages).
Ni, Yang, et al., A CMOS Log Image Sensor with On-Chip FPN Compensation (4 pages).
NIT, Application Note: Native WDRTM for your Industrial Welding Applications, www.new-imaging-technologies.com (2 pages).
Reverchon, J.L., et al. New InGaAs SWIR Imaging Solutions from III-VLab, New Imaging Technologies (10 pages).
Ni, Y. et al. A 768x576 Logarithmic Image Sensor with Photodiode in Solar Cell Mode, New Imaging Technologies (4 pges).
NIT, 8Care12004-02-B1 Datasheet, New Imaging Technologies (9 pages).
NIT, NSC1005, Datasheet, Revised Nov. 2012, NSC1005 HD ready Logarithmic CMOS Sensor (28 pages).
NIT Image Processing Pipeline for Lattice HDR-6-, NIP, Pipeline, IP_NIT_NSC1005C_HDR6O_V1_0 (23 pages).
NIT Image Processing Pipeline for Lattice HDR-60, NIP IP Pipeline, NIT_HDR6O_V1_0_Pipeline_Sample (48 pages).
NIT, WiDySwire, New Imaging Technologyies (7 pages).
NIT Image Processing Pipeline, R&D Report N RD1220-Rev B, May 14, 2012 (10 pages).
NIT Color Management, R&D Report N RD1113-Rev B, Apr. 11, 2011 (31 pages).
International Search Report and Written Opinion corresponding to International Patent Application No. PCT/US2016/012164, dated May 12, 2016.
Aiteanu, Darin, "Virtual and Augmented Reality Supervisor for a New Welding Helmet" Nov. 15, 2005, pp. 1-150.
Hillers, Bernd & Aiteanu, D & Tschirner, P & Park, M & Graeser, Axel & Balazs, B & Schmidt, L. (2004). TEREBES: Velding helmet with AR capabilities.
Patent Cooperation Treaty, Notification of Transmittal of the International Search Report and the Written Opinion of the International Searching Authority, in PCT/US2016/016107, dated May 17, 2016,11 pages.
Graser, Axel et al., "Virtual and Augmented Reality Supervisor for a New Welding Helmet" Nov. 15, 2005, pp. 1-150.
Mnich, Chris, et al., "In situ weld pool measurement using sterovision," Japan-UA Symposium on Flexible Automation, Denver, CO 2004.
Communication from European Patent Office Appln No. 18 150 120.6 dated Jul. 4, 2018 (9 pgs).
Larkin et al., "3D Mapping using a ToF Camera for Self Programming an Industrial Robot", Jul. 2013, IEEE, 2013 IEEE/ASME International Conference on Advanced Intelligent Mechatronics (AIM), pp. 494, 499.
European Office Action Appln No. 16713176.2 dated Oct. 17, 2018 (7 pgs).

* cited by examiner

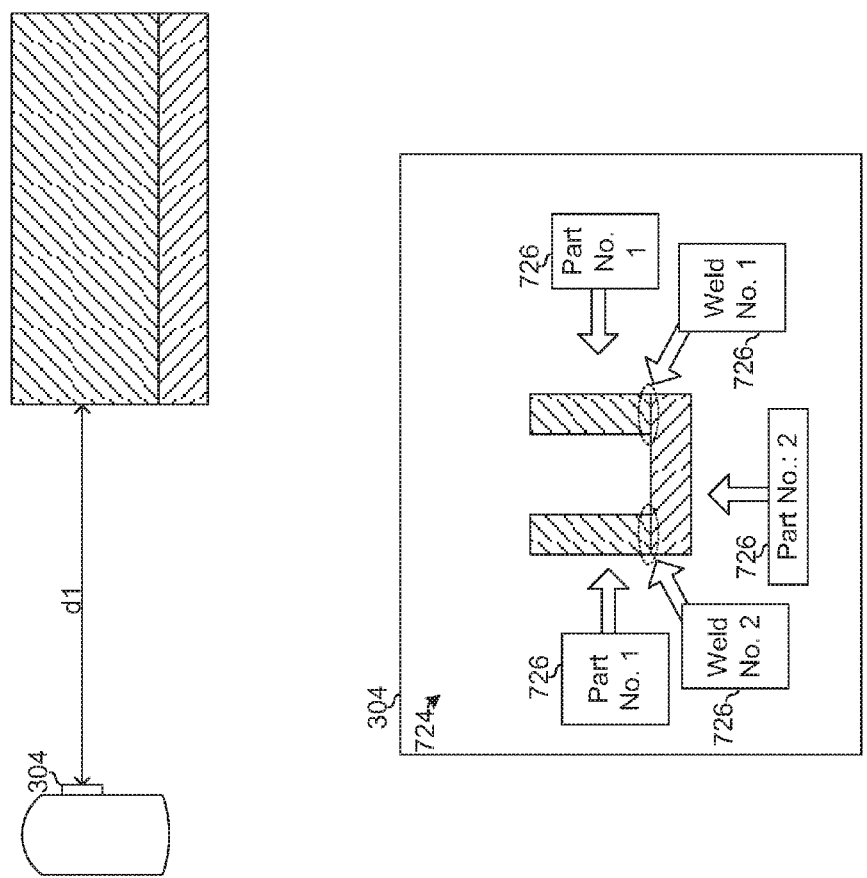

METHODS AND APPARATUS TO PROVIDE VISUAL INFORMATION ASSOCIATED WITH WELDING OPERATIONS

RELATED APPLICATIONS

This patent claims priority to U.S. Provisional Patent Application Ser. No. 62/130,340, filed Mar. 9, 2015, and to U.S. Provisional Patent Application Ser. No. 62/143,243, filed Apr. 6, 2015. The entireties of U.S. Provisional Patent Application Ser. No. 62/130,340 and U.S. Provisional Patent Application Ser. No. 62/143,243 are incorporated herein by reference.

BACKGROUND

Welding is a process that has increasingly become ubiquitous in all industries. While such processes may be automated in certain contexts, a large number of applications continue to exist for manual welding operations, the success of which relies heavily on the proper use of a welding gun or torch by a welding operator. For instance, improper torch angles (work and travel angles), contact tip-to-work distance, travel speed, and aim are parameters that may dictate the quality of a weld. Even experienced welding operators, however, often have difficulty monitoring and maintaining these important parameters throughout welding processes.

SUMMARY

Methods and systems are provided for networked high dynamic range welding vision system, substantially as illustrated by and described in connection with at least one of the figures, as set forth more completely in the claims.

BRIEF DESCRIPTION OF THE DRAWINGS

FIGS. 7B and 7C illustrate example interfaces that may be presented to a weld operator via a display to provide weld instructions to the operator.

DETAILED DESCRIPTION

Figure 1:
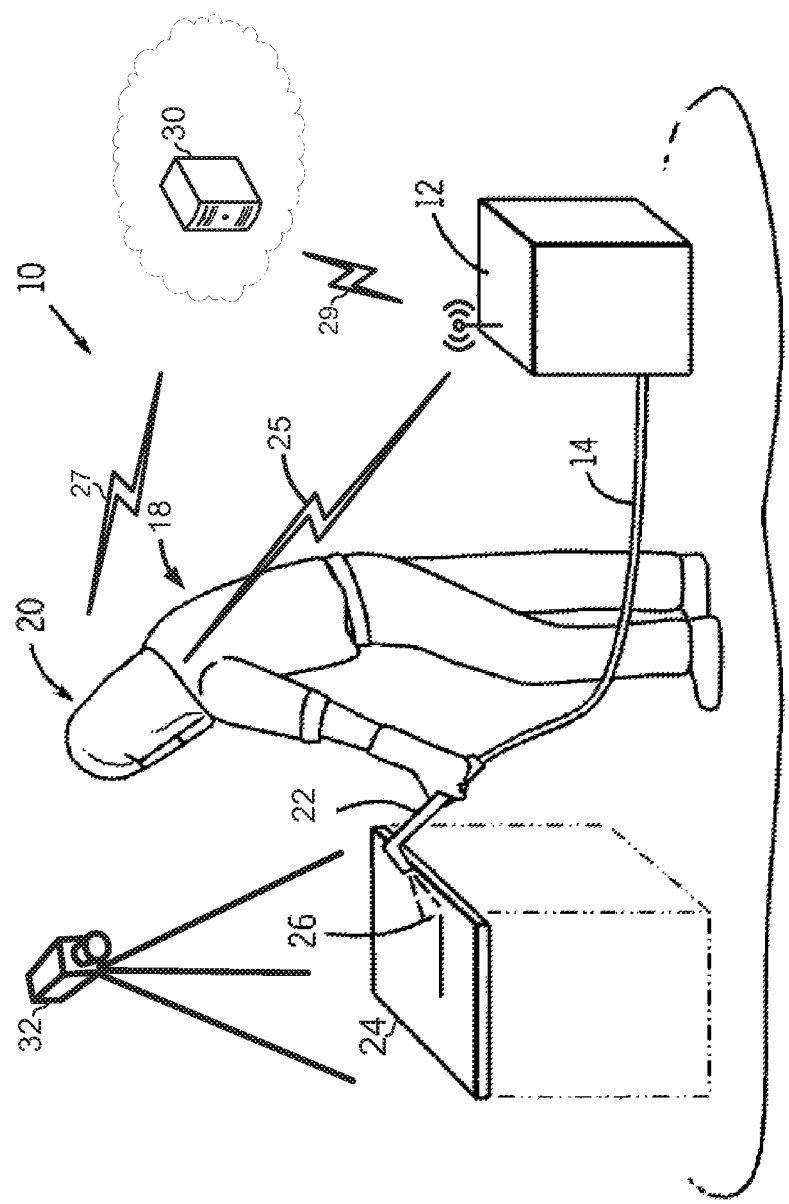
FIG. 1 shows an exemplary arc welding system in accordance with aspects of this disclosure.

Disclosed example methods to record a weld include capturing first images of a welding operation with an optical sensor, storing the first images in a memory in communication with the optical sensor and identifying a transmission event corresponding to the welding operation. Disclosed example methods further include, in response to the identifying of the transmission event: generating a record of the welding operation using the first images; and transmitting the record of the welding operation to a weld system controller and data storage.

As used herein, the term welding operation includes both actual welds (e.g., resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

As used herein, the term "wearable device" includes any form factor that is designed or intended to be worn by a person (e.g., personal protective equipment such as helmets, face guards, apparel, or the like; personal devices such as head-mounted electronic devices, wrist mounted devices, body-mounted devices, devices worn around the neck, or the like), any form factor that, while not necessarily designed or intended to be worn by a person, may be adapted to be worn by a person (e.g., smartphones, tablet computers, and/or other digital processing devices).

Motivation for aspects of this disclosure includes production weld data monitoring so that a production supervisor can monitor the productivity and quality of both automated and manual welding operations. Data monitoring may comprise collecting data in welding equipment, sending it to the cloud, and retrieving by web browser. Such data may include, for example, a video recording of welding operation which may be useful to fabrication shop supervisors, quality assurance (QA) or quality control (QC) personnel, maintenance personnel, training personnel, and/or the like. In manual welding quality control, video recordings may, for example, be valuable in Failure Mode and Effects Analysis (FMEA) in lean manufacturing. Motivation for aspects of this disclosure also include providing weld operator training using vision equipment to observe how a student positions and moves the torch while welding. Motivation for aspects of this disclosure also include provide support and service. If, for example, a welding expert is asked to help a human operator, it is a challenge to squeeze in two welding helmets for an observer to view the arc together with the operator due to physical constraints. It is also a challenge to view the arc at a remote location.

In some example methods, capturing the first images includes at least one of: recording high dynamic range images, recording high dynamic range video, recording wide dynamic resolution images, recording wide dynamic resolution video, recording time-of-flight images, recording three-dimensional images with a structured light camera having three-dimensional depth perception, or recording images at a high frame rate between 500 frames per second and 10,000 frames per second. In some such examples, capturing the first images includes using the optical sensor with a logarithmic response.

In some disclosed example methods, identifying the transmission event includes receiving a transmission request from the weld controller and/or detecting an end of the welding operation via the optical sensor or a second sensor. In some example methods, generating the record includes generating a video or set of images from the first images. Some example methods include receiving a synchronization signal, determining a time stamp based on the synchronization signal, and associating the time stamp with the record of the welding operation. In some examples, capturing the first images is in response to the synchronization signal.

Some example methods further include detecting a beginning of the welding operation using the optical sensor or a second sensor, where the capturing of the first images is in response to the detecting. In some examples, the method is implemented in at least one of a mobile communications device or a welding helmet.

Some disclosed example methods to record a weld include capturing first images of a welding operation with an optical sensor on a head mounted device, storing the first images in a memory, and monitoring a measurement of a welding parameter associated with the welding operation. Example methods also include, in response to identifying that the measurement of the welding parameter has satisfied a threshold parameter value: recording subsequent second images with the optical sensor, storing subsequent second images obtained via the optical sensor in the memory, and storing second measurements of the welding parameter in the memory, where the second measurements correspond to the second images, and generating a record of the welding operation by appending the first images to the second images and appending the second measurements to the second images.

In some examples, the recording of the first images includes at least one of: recording high dynamic range images, recording high dynamic range video, recording wide dynamic resolution images, recording wide dynamic resolution video, recording three-dimensional (3D) depth map images (e.g., by a time-of-flight (ToF) camera or structured light 3D scanner), recording three-dimensional images with a structured light camera having three-dimensional depth perception, or recording images at a frame rate between 500 frames per second and—10,000 frames per second. In some example methods, the recording of the first images includes using the optical sensor with a logarithmic response. In some examples, the memory includes a circular buffer (e.g., in a linked list), and storing the first images in the memory includes replacing a first one of the first images with a second one of the first images in a first in, first out scheme.

Some example methods further include receiving the measurement of the welding parameter via a communications interface. Some examples further include transmitting the record of the welding operation to a server. Some example methods include identifying that the welding operation has been initiated, the recording of the first images being in response to the identifying that the welding operation has been initiated. In some such examples, identifying that the welding operation has been initiated includes at least one of receiving a synchronization signal or identifying an arc via the optical sensor or a second sensor.

Some example methods further include performing digital image processing to extract an image feature representing a characteristic of a weld made during the welding operation, comparing the characteristic to a threshold and, when the characteristic satisfies the threshold, displaying an alert on a display device indicating that the characteristic satisfies the threshold. In some example methods, the head mounted device is a welding helmet including a wireless communications device. The wireless communications device, such as a smartphone or tablet computer, may be detachably mounted to the welding helmet.

Disclosed example methods to direct a weld operator using a weld operator personal protection equipment (PPE) include receiving instruction information associated with a welding operation and displaying the instruction information via a display device of the PPE. Some example methods also include, after displaying the instruction information, receiving weld parameter, displaying the weld parameter via the display device during the welding operation, detecting that the welding operation is completed and, in response to the detecting that the welding operation is completed, presenting performance information describing a characteristic of the welding operation via the display device.

Some example methods also include performing digital image processing to extract an image feature representing a characteristic of a weld made during the welding operation and displaying information representative of the characteristic via the display device. In some examples, performing the digital image processing and displaying the information representative of the characteristic is at least one of during the welding operation or after the welding operation. Some example methods further include requesting second instructions corresponding to a second welding operation in response to receiving a third instruction via a user interface of the PPE, and displaying the second instructions via the display device. In some example methods, receiving the instruction information includes receiving the instruction information from at least one of a wireless communication device or a system controller in response to transmitting a request for the instruction information via a communications interface of the PPE.

Disclosed example apparatus to record a weld include an optical sensor, a storage device, a controller, and a processor. The optical sensor captures first images of a welding operation. The storage device stores the first images. The processor identifies a transmission event corresponding to the welding operation, generates a record of the welding operation using the first images in response to the identifying of the transmission event, and transmits the record of the welding operation to a server.

In some example apparatus, the optical sensor is at least one of a high dynamic range image sensor, a wide dynamic range image sensor, a time-of-flight sensor, a structured light sensor, or an image sensor having a frame rate of at least 500-10,000 frames per second. Some example apparatus further include a communications interface, where the processor identifies the transmission event based on at least one of receiving a transmission request from the server or detecting an end of the welding operation via the optical sensor or a second sensor.

Some example apparatus include a communications interface to receive a synchronization signal, where the processor captures the first images in response to the synchronization signal, and the processor further determines a time stamp based on the synchronization signal and associates the time stamp with the record of the welding operation.

Disclosed head mounted devices include an optical sensor, a storage device, and a processor. The optical sensor captures first images of a welding operation. The storage device stores the first images. The processor is in communication with the storage device and executes instructions to: monitor a measurement of a welding parameter associated with the welding operation and, in response to identifying that the measurement of the welding parameter has satisfied a threshold parameter value, records subsequent second images with the optical sensor, stores subsequent second images obtained via the optical sensor in the storage device, and stores second measurements of the welding parameter in the storage device, the second measurements corresponding to the second images. The processor also generates a record of the welding operation by appending the first images to the second images and appending the second measurements to the second images.

In some example head mounted devices, the optical sensor is at least one of a high dynamic range image sensor, a wide dynamic range image sensor, a time-of-flight sensor, a structured light sensor, or an image sensor having a frame rate of at least 500-10,000 frames per second. In some examples, the storage device includes a circular buffer, where the storage device stores the first images in the memory by replacing a first one of the first images with a second one of the first images in a first in, first out scheme. Some example head mounted devices further include a communications interface to receive the measurement of the welding parameter.

Some example head mounted devices further include a communications interface to transmit the record of the welding operation to a server. In some examples, the processor identifies that the welding operation has been initiated, and the optical sensor records the first images in response to the identifying that the welding operation has been initiated. In some examples, the processor identifies that the welding operation has been initiated by receiving a synchronization signal and/or identifying an arc via the optical sensor or a second sensor.

In some examples, the head mounted device further includes a display device, and the processor performs digital image processing to extract an image feature representing a characteristic of a weld made during the welding operation and compares the characteristic to a threshold, display an alert on the display device when the characteristic satisfies the threshold.

Disclosed example PPEs include a display device, a communications interface, and a processor. The display device displays instruction information prior to a welding operation, displays the weld parameter measurements during the welding operation, and displays performance information describing a characteristic of the welding operation. The communications interface receives the instruction information and to receive the weld parameter measurements. The processor executes instructions to detect a start of the welding operation, and detects that the welding operation is completed, and calculates the performance information. The display device displays the weld parameter measurements after the start of the welding operation.

In some example PPEs, the processor performs digital image processing to extract an image feature representing a characteristic of a weld made during the welding operation, where the display device displays information representative of the characteristic. Some examples further include a user interface to receive a third instruction, where the processor requests second instructions corresponding to a second welding operation in response to receiving the third instruction, and the display device displays the second instructions.

To conserve power and/or reduce power consumption, disclosed examples place a video capture device in a sleep mode while the video capture device is not actively taking video. Photodiode sensitive to arc light or low-power wireless protocols such as Zigbee may be used to signal the video capture device to wake up and begin capturing video, such as in response to a stimulus. For example, when in the sleep or low power mode, the video capture device ceases operations except for monitoring the photodiode or Zigbee or other wireless radio to check for an incoming signal (e.g., from the welding equipment in communication with the video capture device). If a signal to start recording video is received, the wireless radio monitor generates an interrupt and/or otherwise wakes up the main control circuit. Example signals may indicate a trigger pull and/or a suspected weld anomaly (e.g., a suspected weld defect that is being formed).

In some examples, a wireless (e.g., Zigbee) coordinator inside the welding equipment receives a notification of a trigger pull event and sends the signal to a wireless (e.g., Zigbee) node in a radio module of the helmet. In response, the wireless node activates a WiFi radio to enable transmission of media (e.g., video and/or audio) via higher-bandwidth protocols such as UDP, TFTP, lwIP, HTTP, and/or any other protocol.

In some examples, the helmet provides the media to one or more cloud servers to store and/or process the media. In some examples, the helmet accesses a fog network to store, process, measure and control the image data. The fog network may be implemented by one or more devices external to the helmet via edge and/or peer-to-peer networking. In some examples, the helmet stores the media (e.g., video and/or audio) in a local flash memory and/or other nonvolatile memory inside the helmet. The helmet further implements HTTP and/or FTP servers. In some examples, a smart phone within wireless communication proximity serves as an edge resource fog network by executing an application, an HTTP client, and/or an FTP client. The example smart phone accesses the media stored in the storage device of the helmet. In some examples, the smart phone provides storage, processing, and/or analysis capacities. The weld equipment and/or the smart phone can be edge resources for configuration, pooling, caching and security of videos and audios captured by the helmet.

In some examples, the helmet transmits live video captured by a recording device on the helmet to a smart phone and/or computing device within wireless communication proximity using peer-to-peer networking (also referred to as point-to-point networking). The transmission of video enables others to view the welding scene even when those people do not have the ability to directly view the weld scene (e.g., the weld arc) due to physical constraints in and/or surrounding the weld scene. In some examples, the helmet includes an RTSP server, and a smart phone app and/or computing device in communication with the helmet includes an RTSP client. The helmet RTSP server uses the Real-time Transport Protocol (RTP) in conjunction with Real-time Control Protocol (RTCP) for media stream delivery.

In some examples, the helmet includes an EMI shield between a wireless antenna and the helmet wearer's head to reduce exposure of the wearer's head to the RF radiation.

In some examples, the helmet includes a camera to capture images and an image recognition processor to perform operator identification and/or authorization. In some examples, the operator faces the helmet camera, and the welding system logs in the operator. For example, the welding system may execute a facial recognition process to analyze the facial features of the operator and compare the features with a database of authorized operators. In some examples, the database includes credentials for each operator to identify whether the operator is authorized (e.g., qualified according to a current welder qualification test record (WQTR), and/or approved by a supervisor of the work) to operate using the corresponding weld equipment and/or to operate a specified weld task and/or type of weld task. Additionally or alternatively, the welding system may include image recognition features that recognize a code on an identification card belonging to the welder. In response to identifying a welder in the database, the welding system checks the qualification record of the identified welder for presence and/or expiration information.

In some examples, while wearing the camera equipped helmet, the operator may look at the welding consumables such as gas and wire with marker such as QR code in very large font for computer viewing at the distance (e.g., by positioning the helmet so that the item to be viewed by the camera falls within the field of view of the helmet lens). The welding system may perform image processing to identify and log in the consumables for the weld job and/or check the identified consumables against a weld procedure specification (WPS) for inconsistencies that could lead to weld defects. If such inconsistencies are identified, the welding system may alert the operator and/or other people, and/or disable the trigger on the weld torch.

In some examples, the camera on the helmet has auto-focuses on an active weld operation. The camera may auto-focus by identifying locations of features representative of an arc (e.g., a brightest area in the scene) and focus on the area(s) immediately surrounding and/or adjacent the features, which in some cases most likely include the joint and/or the electrode. In some examples, the camera also may have optics providing a large depth of field so that the camera is easily achieves focus on the desired area(s).

In some examples, camera performs optical and/or digital image stabilization. The helmet may include one or more inertial measurement units (IMUs) such as multi-axis gyroscopes, multi-axis accelerometers, and/or multi-axis magnetometers to detect, encode, and/or measure movement of the helmet (e.g., turning, vibration, traveling and shaking of the helmet as the wearer's head moves to follow the arc). Based on the measured movement, the welding system compensates for the motion by moving the lens and/or the imager using, for example, micro actuators and/or microelectromechanical systems (MEMS) such as piezoelectric crystals. Additionally or alternatively, the welding system may implement electronic image stabilization (EIS). By using image stabilization techniques, a welder training system, such as LiveArc® sold by Miller Electric™, can use helmet mounted cameras instead of or in addition to fixed-location cameras to extract torch motion data and/or torch angularity data with respect to a welded joint. Such data is potentially beneficial for subsequent training of welders to weld on joints that are difficult or impossible for cameras at a fixed location, such as 360 degree 5G position and/or 6G position pipe welding. Additionally or alternatively, a welding helmet may include sensors for a fixed-mount camera to track the motion of the helmet and use the helmet position and/or orientation to transform the images captured by the camera in the helmet.

Some example welding systems include a high dynamic range imager or image sensor array (e.g., at least 120 dB of dynamic range) and/or native wide dynamic range imager (e.g., at least 140 dB of dynamic range) on the welding helmet. In other examples, a welding system includes a medium dynamic range (MDR) imager with at least 100 dB of dynamic range to decrease the component costs of the helmet. One example MDR imager that may be used is model MT9V024, sold by ON Semiconductor®.

In some examples, a welding helmet further includes a light source oriented to illuminate the weld scene. The lighting can be an active light source such as an LED array. To conserve battery power of the helmet, the light source can be activated automatically when the camera is taking images and determines that additional lighting is beneficial (e.g., luminance received at the camera is less than a threshold). Additionally or alternatively, the active light source can be activated and/or deactivated by an operator interface, such as a voice command. Additionally or alternatively, the helmet may be provided with passive light sources such as a reflective exterior surface. Such a passive light source may reflect light from the arc to illuminate the welding scene.

Some example helmets further include an energy harvester such as solar cells that capture arc light photon energy. The energy harvester may charge a battery for the controls circuit to operate the camera circuitry, image processing, wireless devices and IMUs.

In some examples, the processor uses automatic gain control (AGC) to control brightness based on the arc signals when processing captured images. AGC is also referred to as automatic exposure control or automatic brightness control. When viewing a welding arc, sudden changes in scene brightness can create difficult viewing conditions. An AGC algorithm chooses a brightness or exposure value between the brightest and darkest areas (e.g., approximately splitting the difference in brightness) to attempt to enable visualization of the entire scene. However, AGC may not provide appropriate results when viewing a welding scene where overexposure of the arc area may be tolerable but underexposure of the joint and wire is not acceptable. Another problem with AGC in welding is that the brightness changes rapidly, for example, from little light to extremely bright light during arc start and during the transition from short circuit to breaking out an arc. While conventional algorithms use an averaging scheme and/or gradual changes in the gain over dozens of frames, such algorithms result in a latency in the digitally rendered images to the actual event of arc ignition and re-ignition.

Some disclosed example exposure controllers use arc signals from a power supply or wire feeder (e.g., via a wired or wireless data connection) as a feed forward signal to adapt the exposure time for an optical sensor and/or image processing. Specifically, some examples use arc voltage to determine the presence and absence of an arc in the scene. If the sensed arc voltage (e.g., excluding the welding cable voltage and electrode stickout voltage and contact voltage between wire and contact tip, etc.) is greater than 14V, the exposure controller determines that an arc is present and, in response, reduces the exposure to reveal the details of the dark areas such as joint and wire extension. The exposure controller may also use more aggressive image compression ratios and/or digital image filters for the comparatively brighter scenes. In contrast, when the sensed arc voltage is less than 14V, the exposure controller determines that the arc is absent and the scene is dark. In response to determining that the arc is not present, the exposure controller uses longer exposures and less aggressive image compression ratios and/or digital image filters.

In some examples, the exposure controller uses arc power in addition to or instead of the arc signal as a proxy for the brightness of the arc. For example, the exposure controller may use level of arc voltage or arc current (or the product of voltage and current which is the arc power) to predict the brightness of the scene, thus adjusting exposure and selecting corresponding image processing algorithms and their parameters. Thus, example exposure controllers more effectively adapt to arc starts and/or stops, and/or when using welding processes where the arc brightness changes quickly (e.g., frequencies of 20 Hz to 250 Hz), such as in pulse welding and short circuiting welding.

Disclosed example weld training systems include a display, a camera, a communications device to communicate with welding equipment, and a welding helmet having a view port. In disclosed example weld training systems, the welding helmet holds the camera, the communications device, and the display such that, when the welding helmet is worn by a wearer, the display is viewable by the wearer, the camera has a view through the view port such that the display displays to the wearer images taken by the camera through the view port and displays a simulated object generated based on information received from the welding equipment via the communications device. In some examples, the communications device transmits a command to welding equipment to cause the welding equipment to operate in a training or simulation mode.

In some examples, the communications device receives a trigger signal identifying a start of a simulated weld, the display to display the simulated object in response to receiving the trigger signal. In some example weld training systems the display, the camera, and the communications device are in a smartphone or tablet computer integral to the welding helmet. In some examples, the display, the camera, and the communications device are in a smartphone or tablet computer integral to the welding helmet. In some examples, the smartphone or tablet computer comprises a microphone and a processor. The processor recognizes a first audio command received via the microphone, begins a weld training operation in response to receiving the audio command, including displaying the images and the simulated object to the wearer via the display. The processor recognizes a second audio command received via the microphone and ends the weld training operation in response to the second audio command.

Some example weld training systems further include a processor to execute software to provide weld training to the wearer. In some examples, the processor renders at least one of a simulated weld arc, a simulated weld bead, or a simulated weld puddle as the simulated object. In some example weld training systems, the communications device receives welding parameters from the welding equipment. Some examples further include a processor to process the images to extract a plurality of welding conditions and render the simulated object based on the welding parameters and based on the plurality of welding conditions, where the display superimposes the simulated object on the images with a position and a perspective based on the images. In some such examples, the welding conditions include at least one of a contact-tip-to-work distance, a workpiece gauge thickness, a workpiece fit-up, a torch aim with respect to a joint seam, a torch travel angle, a torch work angle, or a torch travel speed. In some such examples, the simulated object includes at least one of a simulated weld arc, a simulated weld puddle, simulated spatter, simulated fumes, or a simulated weld bead. Some examples further include a speaker to output at least one of a simulated arc sound or a simulated gas flow sound. In some examples, the weld parameters comprise at least one of a voltage setpoint, an arc length setpoint, a current setpoint, or a wire feed speed setpoint, or a weld program preset.

In some example weld training systems, the processor processes the images to extract a characteristic of a weld scene and renders the simulated object based further on the characteristic, where the characteristic includes at least one of a welding process type, a torch type, a torch condition, a welding consumable type, a weld joint type, a tack weld presence, a workpiece surface cleanliness, a weld fixture state, or a weld clamp state.

In some example weld training systems, the communications device is configured to communicate with the weld equipment via wireless communications. Some example weld training systems include a processor to measure a first characteristic of a weld scene by extracting and analyzing features of the images, determine whether a difference between the first characteristic and a second characteristic corresponds to an unacceptable weld condition and, when the difference corresponds to the unacceptable weld condition, output an alert via the display indicating that the weld scene has the unacceptable weld condition.

Some example weld training systems include a processor to analyze the images to identify objects in the images and spatial relationships between the objects, render a graphic representative of the spatial relationships, and superimpose the graphic over the images on the display. In some examples, the communications device communicates with the welding equipment to detect a start of a simulated weld operation or an end of the simulated weld operation, and the display to present the simulated object in response to the start of the simulated welding operation or remove the simulated object in response to the end of the simulated welding operation.

In some examples, the camera is a high dynamic range camera and the images are high dynamic range images. In some examples, the camera is a medium dynamic range camera and the images are medium dynamic range images. In some examples, the camera is a wide dynamic range camera and the images are wide dynamic range images. In some examples, the images are video and/or still images.

Some example weld training systems further include a processor to calibrate distance measurements for the images using a distance reference and measure a physical characteristic of an object present in the images using the calibrated distance measurements. In some examples, the communications device transmits the images to an external computing device. In some examples, the display is to displays weld instruction information overlaid on the images.

Referring to FIG. 1, there is shown an example welding system 10 in which an operator 18 is wearing welding headwear 20 and welding a workpiece 24 using a torch 22 to which power or fuel is delivered by equipment 12 via a conduit 14. The equipment 12 may comprise a power or fuel source, optionally a source of a shield gas and, where wire/filler material is to be provided automatically, a wire feeder. The welding or cutting system 10 of FIG. 1 may be configured to form a weld joint by any known technique, including flame welding techniques such as oxy-fuel welding and electric welding techniques such as shielded metal arc welding (i.e., stick welding), metal inert gas welding (MIG), tungsten inert gas welding (TIG), and plasma cutting.

Optionally in any embodiment, the welding equipment 12 may be arc welding equipment that provides a direct current (DC) or alternating current (AC) to a consumable or non-consumable electrode 16 (better shown, for example, in FIG. 5C) of the torch 22. The electrode 16 delivers the current to the point of welding on the workpiece 24. In the welding system 10, the operator 18 controls the location and operation of the electrode 16 by manipulating the torch 22 and triggering the starting and stopping of the current flow. When current is flowing, an arc 26 is developed between the electrode and the workpiece 24. The conduit 14 and the electrode 16 thus deliver current and voltage sufficient to create the electric arc 26 between the electrode 16 and the workpiece. The arc 26 locally melts the workpiece 24 and welding wire or rod supplied to the weld joint 512 (the electrode 16 in the case of a consumable electrode or an optionally separate wire or rod in the case of a non-consumable electrode) at the point of welding between electrode 16 and the workpiece 24, thereby forming a weld joint 512 when the metal cools.

As shown, and described more fully below, the equipment 12 and headwear 20 may communicate via a link 25. Such communications may enable the headwear 20 to control settings of the equipment 12 and/or the equipment 12 to provide information about its settings to the headwear 20. Although a wireless link is shown, the link may be wireless, wired, or optical.

The server 30 and headwear 20 may communicate directly or indirectly. For the former, the server 30 and headwear 20 may communicate via a link 27. Indirect communications may comprise, for example, the headwear 20 sending time-stamped images and/or other data to the equipment 12 via link 25, where the equipment 12 combines the images and/or data with data of its own and then relays the combined data to server 30 via link 29. Similarly, the server 30 and equipment 12 may communicate directly or indirectly. For the former, the server 30 and equipment 12 may communicate via a link 25. Indirect communications may comprise, for example, the equipment 12 sending time-stamped data to the headwear 20 via link 25, and the headwear 20 combining the data with images and/or data it captures and then relaying the combined data to server 30 via link 27. Another example is to reduce the real time data traffic on link 25 during welding while maintaining the synchronization of video captured by the headwear 20 and the equipment 12. For example, upon a trigger pull by operator at 22, the equipment 12 sends a start sync command to headwear 20 via link 25. Thereafter, the headwear 20 records video or images with timestamp initiated by the start sync command, and the equipment 12 also records welding data initiated by the same start sync command independently of the headwear 20. Upon trigger release or completion of welding, the headwear 20 uploads the time-stamped video or images to the server 30 via the communication link 27, and the equipment uploads the time-stamped weld data to the server 30 via the communication link 29. The server 30 combines the video data and weld data together with a common timestamp that allows playback of both data in synchronization.

The links 25, 27, and 29 may use any suitable protocols such as Bluetooth, Bluetooth Low Energy, WiFi, Zigbee, and/or the like.

The server 30 may be, for example, a local or remote/cloud workstation(s) or server(s) in a data center. For example, the headwear 20 may transmit images and/or other data (e.g., arc length, temperature, etc.) captured by the headwear 20 to the server 30 for real-time interaction (e.g., viewing, annotating etc.) and/or analysis (e.g., parameters of the torch, workpiece, and/or arc). As another example, the headwear 20 may transmit images and/or other data captured by the headwear 20 to the server 30 for recording/storing for later interaction and/or analysis. As another example, the server 30 may transmit information (e.g., visual and/or audio instructions to adjust various parameters) to the headwear 20 based on analysis of the image and/or other data received from the headwear 20. In an example implementation the server 30 is a component of a welder training system where the welding operator 18 motion is tracked by one or more externally-mounted cameras 32. During a training exercise, the operator 18 motion can be captured together with the video captured by camera(s) of the headwear 20 (e.g., camera(s) 414 of FIG. 4) for synchronized playback at the server 30. One example use of server 30 is for the purpose of quality control. During production welding, the equipment 12 captures the welding signals data while the headwear 20 captures video data representative of what the operator sees. Both data are transmitted to server 30. Due to the large storage demand of video data, server 30 may be a remote server which may more conveniently provide large amounts of storage than a local server. When a defect is found, both the welding signal data and video data are retrieved from the remote server 30 for playback and failure analysis. Although a wireless link is shown, the link may be wireless, wired, or optical.

Figure 2:
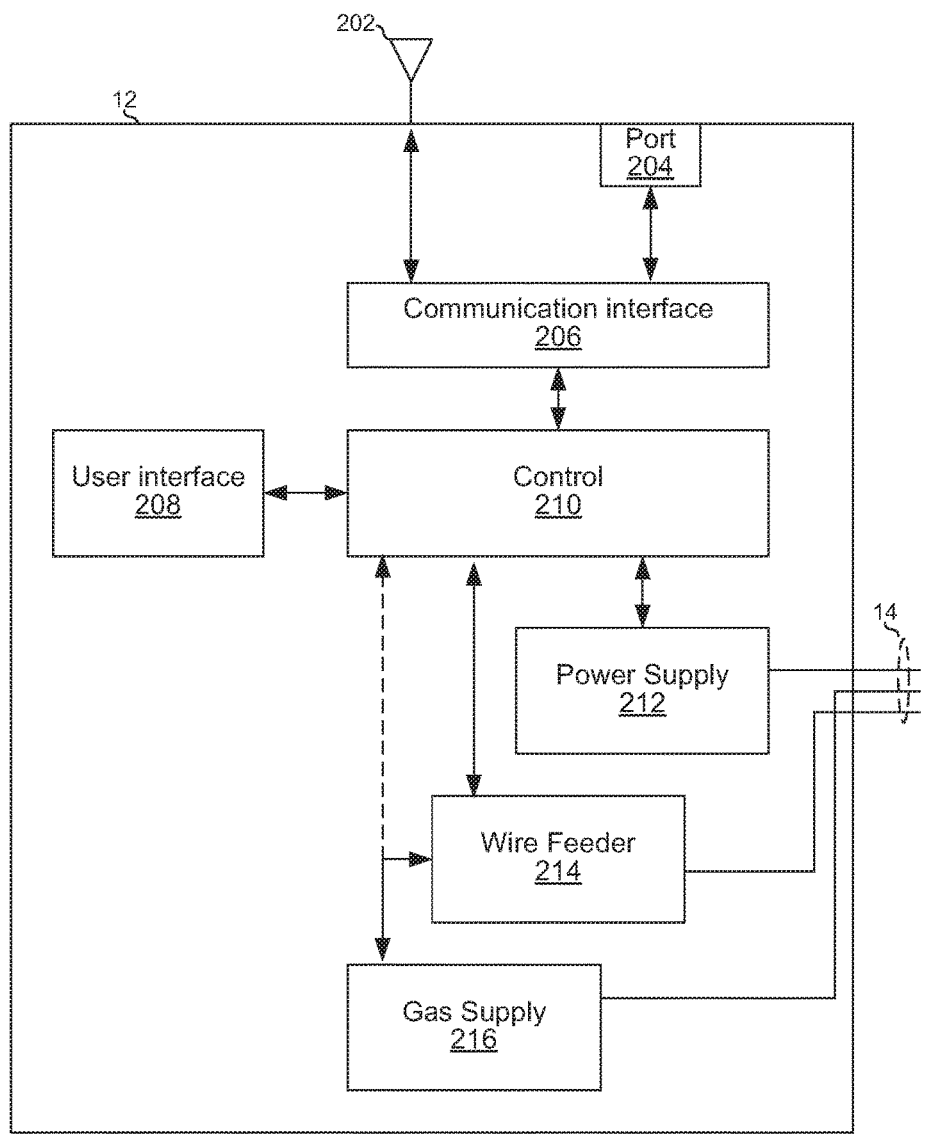
FIG. 2 shows example welding equipment in accordance with aspects of this disclosure.

FIG. 2 shows example welding equipment in accordance with aspects of this disclosure. The equipment 12 of FIG. 2 comprises an antenna 202, a communication port 204, communication interface circuitry 206, user interface module 208, control circuitry 210, power supply circuitry 212, wire feeder module 214, and gas supply module 216.

The antenna 202 may be any type of antenna suited for the radio frequencies, power levels, etc. used by the communication link 25.

The communication port 204 may comprise, for example, an Ethernet port, a USB port, an HDMI port, a fiber-optic communications port, and/or any other suitable port for interfacing with a wired or optical cable.

The communication interface circuitry 206 is operable to interface the control circuitry 210 to the antenna 202 and/or port 204 for transmit and receive operations. For transmit, the communication interface 206 may receive data from the control circuitry 210 and packetize the data and convert the data to physical layer signals in accordance with protocols in use on the communication link 25. For receive, the communication interface may receive physical layer signals via the antenna 202 or port 204, recover data from the received physical layer signals (demodulate, decode, etc.), and provide the data to control circuitry 210.

The user interface module 208 may comprise electromechanical interface components (e.g., screen, speakers, microphone, buttons, touchscreen, gesture recognition etc.) and associated drive circuitry. The user interface 208 may generate electrical signals in response to user input (e.g., screen touches, button presses, voice commands, gesture recognition etc.). Driver circuitry of the user interface module 208 may condition (e.g., amplify, digitize, etc.) the signals and provide them to the control circuitry 210. The user interface 208 may generate audible, visual, and/or tactile output (e.g., via speakers, a display, and/or motors/actuators/servos/etc.) in response to signals from the control circuitry 210.

The control circuitry 210 comprises circuitry (e.g., a microcontroller and memory) operable to process data from the communication interface 206, from the user interface 208, from the power supply 212, from the wire feeder 214, and/or from the gas supply 216. The control circuitry 210 comprises circuitry (e.g., a microcontroller and memory) operable to output data and/or control signals to the communication interface 206, to the user interface 208, to the power supply 212, to the wire feeder 214, and/or to the gas supply 216.

The power supply circuitry 212 comprises circuitry for generating power to be delivered to a welding electrode via conduit 14. The power supply circuitry 212 may comprise, for example, one or more switch mode power supplies, buck converters, inverters, and/or the like. The voltage and/or current output by the power supply circuitry 212 may be controlled by a control signal from the control circuitry 210. The power supply circuitry 212 may also comprise circuitry for sensing and reporting the actual current and/or voltage feedback to the control circuitry 210. In an example implementation, the power supply circuitry 212 may comprise circuitry for measuring the voltage and/or current on the conduit 14 (at either or both ends of the conduit 14) such that reported voltage and/or current is actual and not simply an expected value based on calibration.

The wire feeder module 214 is configured to deliver a consumable wire electrode 16 to the weld joint 512. The wire feeder 214 may comprise, for example, a spool for holding the wire, an wire feeder for pulling wire off the spool to deliver to the weld joint 512, and circuitry for controlling the rate at which the wire feeder delivers the wire. The wire feeder may be controlled based on a control signal from the control circuitry 210. The wire feeder module 214 may also comprise circuitry for reporting the actual wire speed and/or amount of wire remaining to the control circuitry 210. In an example implementation, the wire feeder module 214 may comprise circuitry and/or mechanical components for measuring the wire speed, such that reported speed is actual speed and not simply an expected value based on calibration.

The gas supply module 216 is configured to provide shielding gas via conduit 14 for use during the welding process. The gas supply module 216 may comprise an electrically controlled valve for controlling the gas on/off. The valve may be controlled by a control signal from control circuitry 210 (which may be routed through the wire feeder 214 or come directly from the control circuitry 210 as indicated by the dashed line). The gas supply module 216 may also comprise circuitry for reporting the present gas flow rate to the control circuitry 210. In an example implementation, the gas supply module 216 may comprise circuitry and/or mechanical components for measuring the gas flow rate such that reported flow rate is actual and not simply an expected value based on calibration.

FIGS. 3A, 3B, 3C, 4A, 4B, and 4C show example welding headwear 20 in accordance with aspects of this disclosure. The example headwear 20 is a helmet comprising a shell 306 in or to which are mounted: one or more cameras 414 comprising optical components 302, one or more display(s) 304, 305, electromechanical user interface components 308, an antenna 402, a communication port 404, a communication interface 406, user interface driver circuitry 408, a central processing unit (CPU) 410, speaker driver circuitry 412, an image processor 416, graphics processing unit (GPU) 418, display driver circuitry 420, sensor(s) 422, a power source 424, and a memory 426. The example memory 426 of FIG. 4 stores machine-readable instructions 428 which may be executed by the processor 410 to implement the examples disclosed herein. In other embodiments, rather than a helmet, the headwear may be, for example, a mask, glasses, goggles, attachment for a mask, attachment for glasses, or attachment for goggles, etc. In other example implementations, the camera(s) 414 may be mounted to a welding fixture, to a robot (e.g., a drone), welding torch (possibly with fiber optic delivered images) and/or any other place suited for capturing images and/or data information about a welding operation. The components of the headwear 20 may reside on one or more printed circuit boards (PCBs) or flex circuits. In the example shown merely as one illustration, the power source 424, camera(s) 414, antenna 402, Port 404, display 304, controls 308 are realized as subsystems (possibly comprising their own PCBs) apart from/coupled to the PCB 430 while the communications interface 406, the user interface driver 408, the processor 410, the speaker driver 412, the GPU 418, the display driver 420, and/or the memory 426 reside on PCB 430.

Each set of optics 302 may comprise, for example, one or more lenses, filters, and/or other optical components for capturing electromagnetic waves in the spectrum ranging from, for example, infrared to ultraviolet. In an example implementation, optics 302a and 302b for two cameras may be positioned approximately centered with the eyes of a wearer of the headwear 20 to capture images (at any suitable frame rate ranging from still photos to video at 30 fps, 100 fps, or higher) of the field of view that a wearer of the headwear 20 would have if looking through a lens. In some examples, multiple cameras capture stereoscopic images. Stereoscopic systems calculate the dimensions of the field of view based on the four corners of the image. For example, a stereoscopic system calculates the real-world coordinates of the image points based on a pre-determined spacing between the cameras or optical sensors, and calculates the real-world distance between the points.

In one example, the optical sensor 414 has a high dynamic range (HDR), a medium dynamic range, or a wide dynamic range (WDR) imaging array that has logarithmic response at each pixel in a single frame time, with a dynamic range exceeding 120 dB to >140 dB. Example techniques to capture images of a weld scene using high dynamic range, wide dynamic range, and the like, are disclosed in U.S. patent application Ser. No. 14/978,141, filed Dec. 22, 2015, and entitled "Automated Welding Translation Platform." The entirety of U.S. patent application Ser. No. 14/978,141 is incorporated herein by reference. The log response imager allows viewing a typical arc high contrast welding scene with a mix of high intensity arc light and low light surroundings such as joint, weld puddle, electrode extension etc. without saturating the sensor, and suppresses the spatial-temporal light accommodation. The log response imager is effective to auto-balance the exposure and view details such as weld pool surface and a joint seam near the bright arc. The sensors can be CMOS for visible wavelengths for example light reflected by the joint, the contact tip, the electrode etc., or InGaAs for short wave infrared wavelength for example emitted by solidifying weld pool. The imager can be monochrome or color.

In yet another example, the optical sensor 414 can have imaging array that has multiple responses or exposure times at each pixel in a single frame time to extend dynamic range for the high contrast problem of viewing a welding scene. For example, the pixels associated with the bright arc could have a fraction of the exposure time than the pixels in the surrounding scene so that the charging of the pixels is slowed down to avoid saturation.

In yet another example, the optical sensor 414 is a high speed camera with frame rate exceeding 500 to 1000 frames per second or substantially faster than the metal transfer and weld pool oscillation dynamics to avoid aliasing. In a preferred implementation, the camera has CMOS pixel array with high photoresponsivity achieved by short picosecond integration time, synchronous exposure, and high speed parallel read out, and other techniques. The preferred frame rate is at least 10× of the weld physics dynamics which is typically between 50 Hz to 250 Hz. To reduce video file size, high frame rate image acquisition (such as 2 KHz, 10 KHz or higher) can be done in burst mode at fixed intervals or upon sync trigger from the equipment 12 to capture specific metal droplet transfer or weld pool oscillation event.

In yet another example, the optical sensor 414 is a ToF ranging depth camera for 3D depth perception and to overcome the light intensity contrast between bright arc light and dark surroundings. In preferred implementation, the pulse-modulated illumination has a near infrared wavelength that is out of phase with the arc spectrum or to avoid the spectrum peaks of the arc light.

In yet another example, the optical sensor 414 is a structured light 3D scanning camera with 3D depth perception and to overcome the light intensity contrast between bright arc light and dark surroundings. Typically the frame rate is slow but could be sufficient for tasks such as seam tracking with the operator's head being relatively still and/or with motion sensors tracking and accounting for head movement.

In yet another example, the optical sensor 414 contains a combined technology of the ones above, for example, a combined high dynamic range and high frame rate imaging, a stereo vision with two HDR imaging, a combined HDR imaging, and a ToF imaging.

Figure 3A:
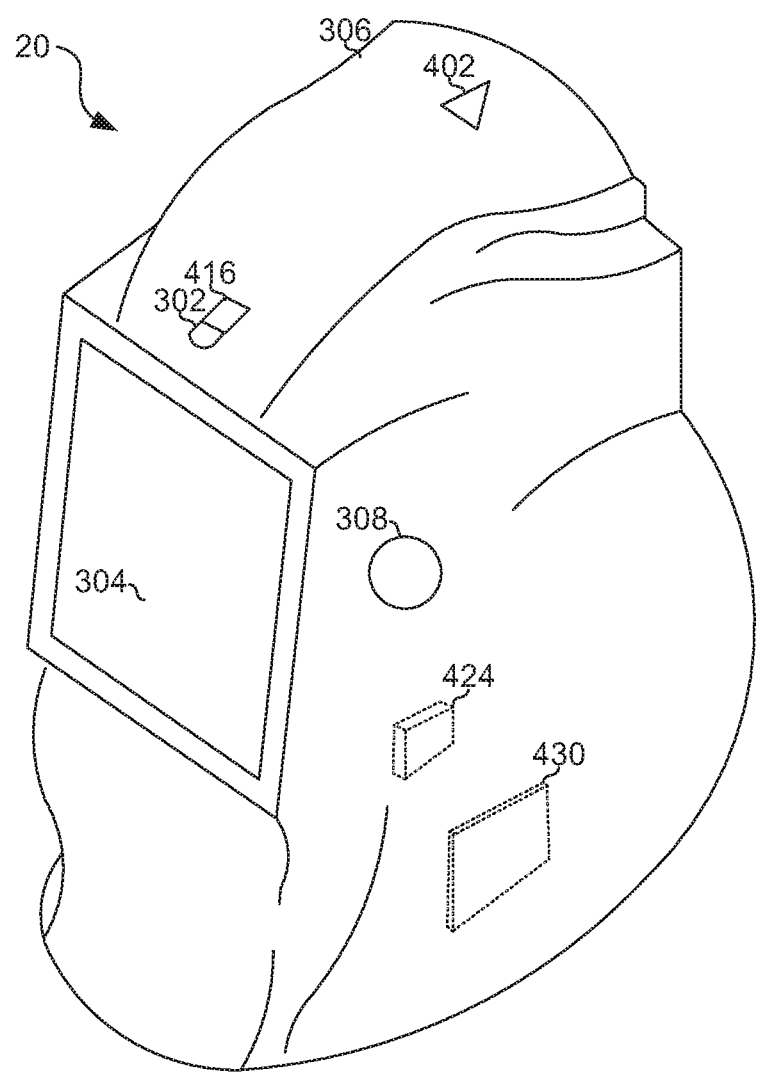
FIGS. 3A, 3B, and 3C show example welding headwear and circuitry in accordance with aspects of this disclosure.
Figure 3B:
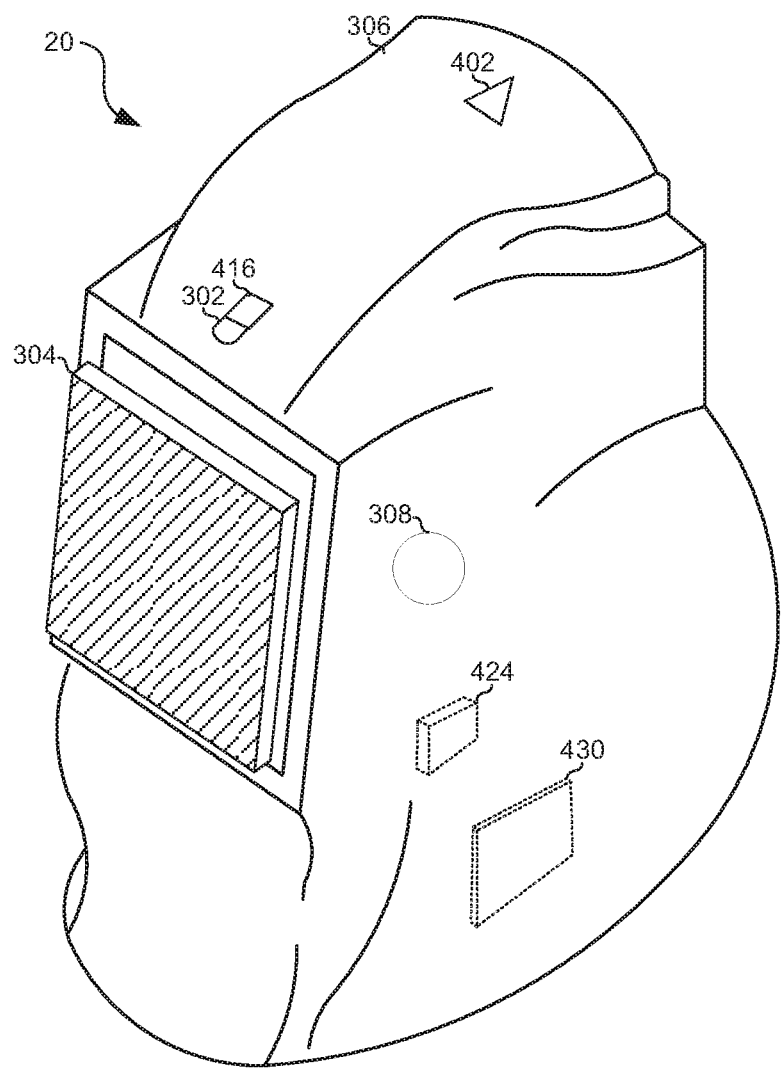
Figure 3C:
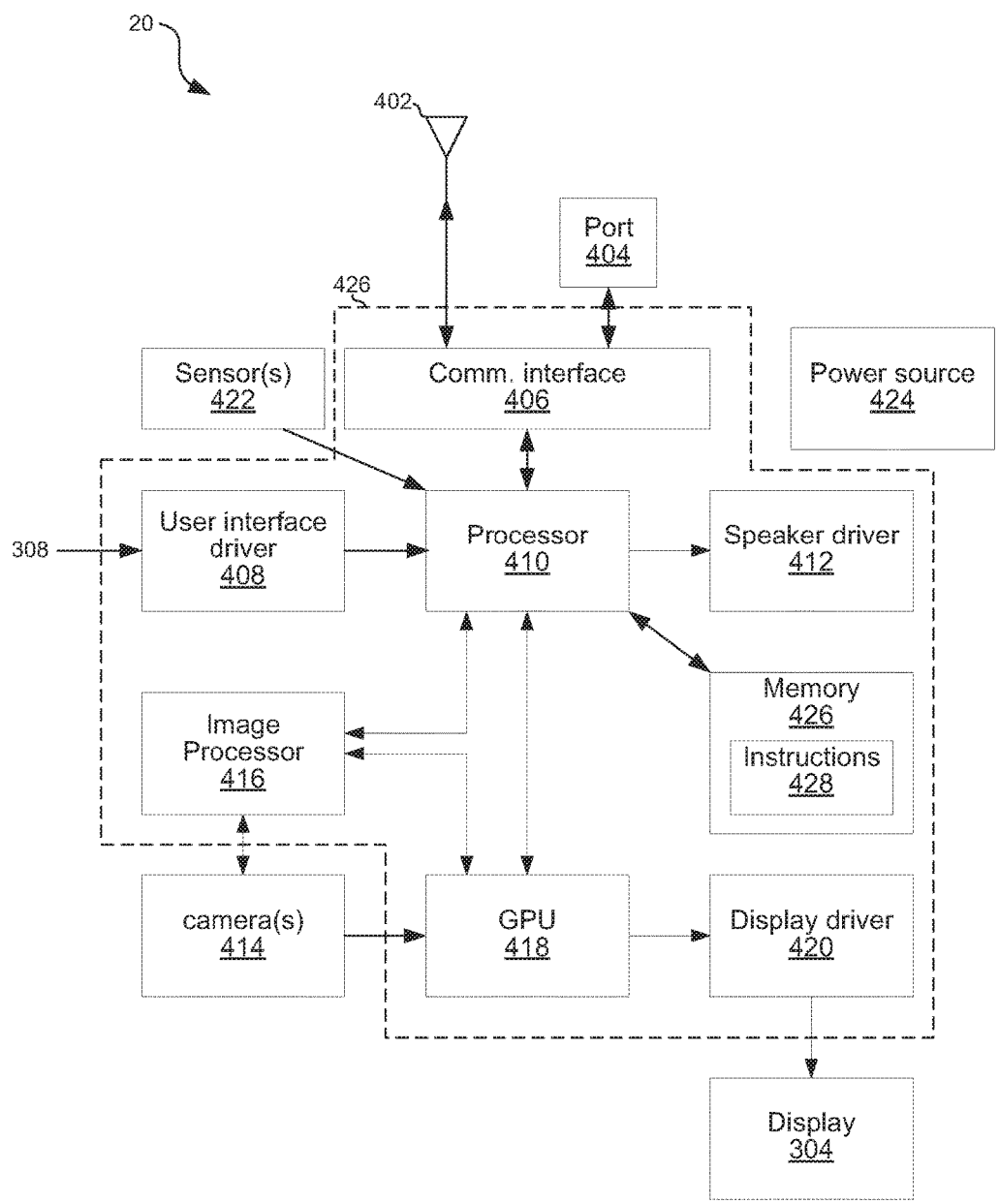
Figure 4A:
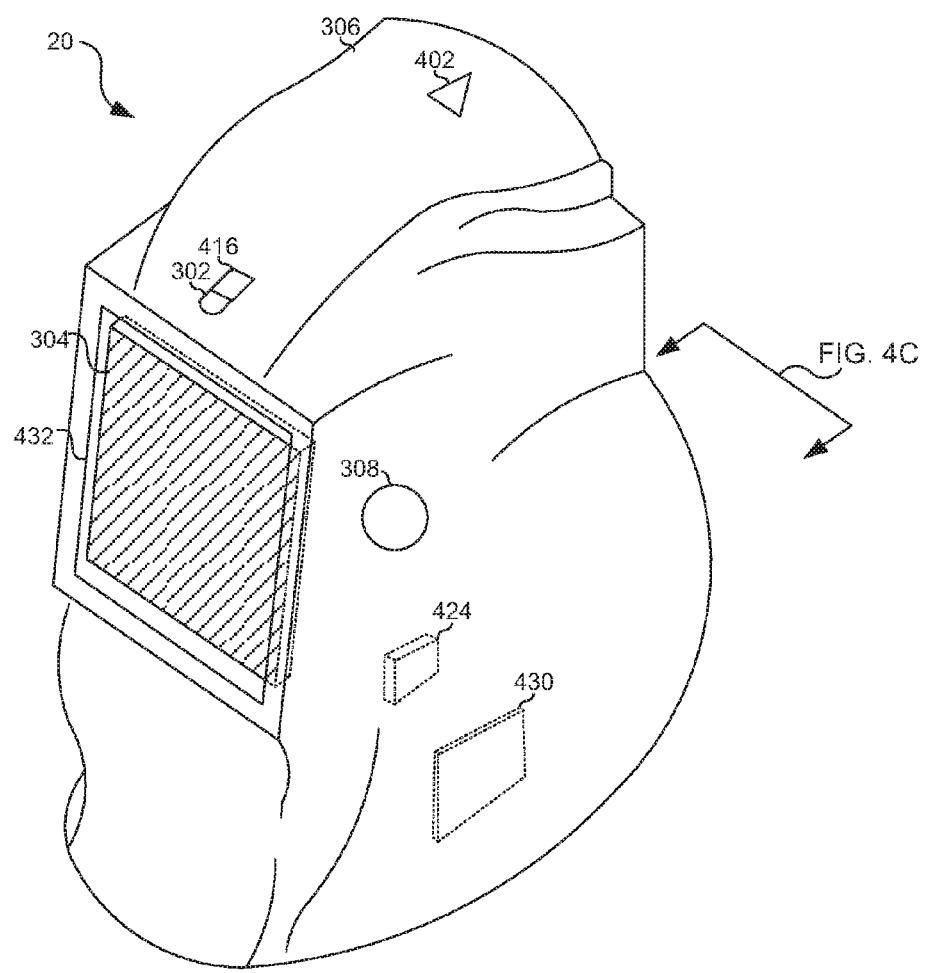
FIGS. 4A,4B, and 4C show another example welding headwear and circuitry of the in accordance with aspects of this disclosure.
Figure 4B:
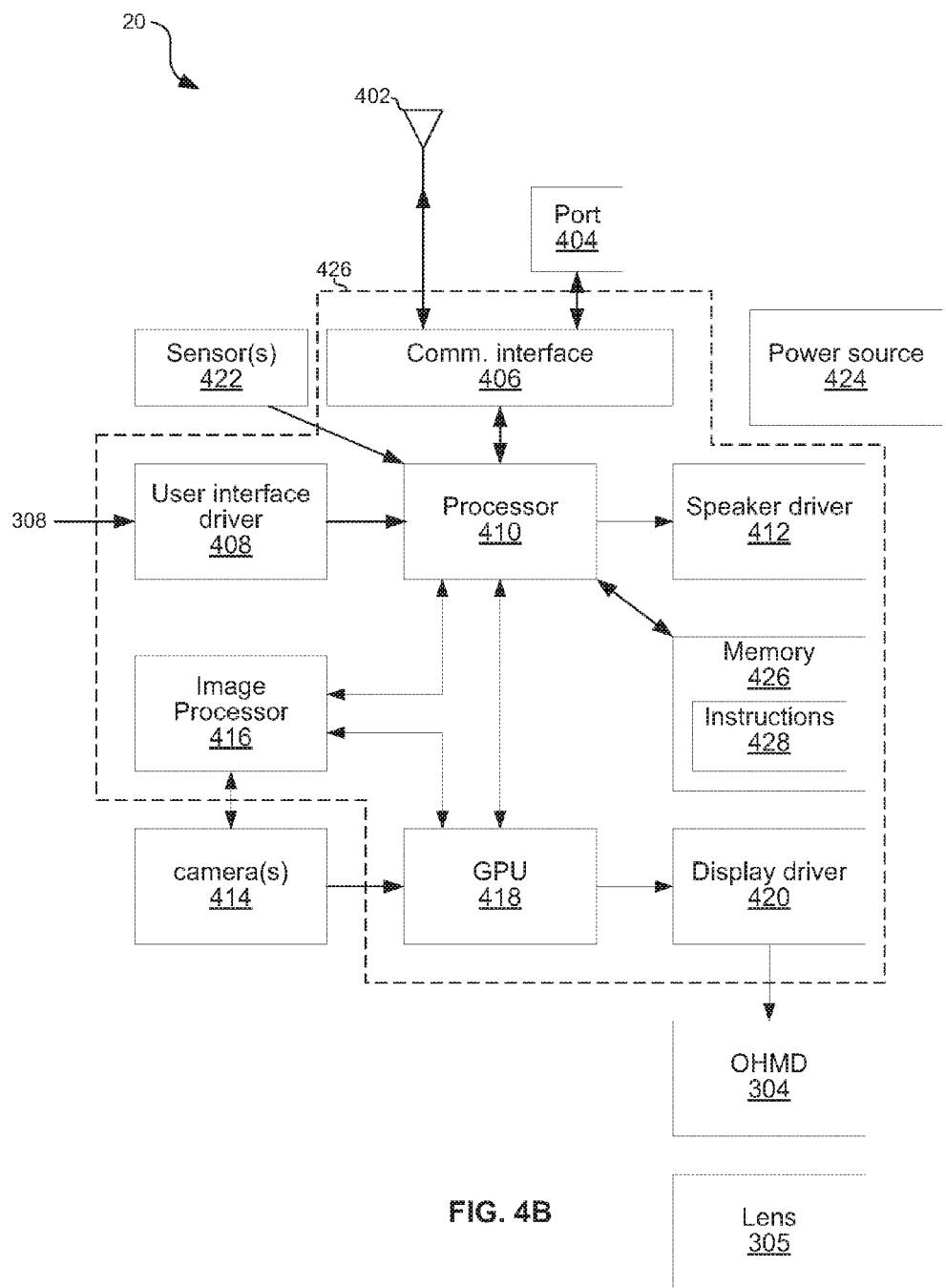

The display 304 may comprise, for example, a LCD, LED, OLED, E-ink, near-eye light field display, and/or any other suitable type of display operable to convert electrical signals into optical signals viewable by a wearer of the headwear 20 and in some cases producing mediated reality including virtual reality and augmented reality. In the example of FIG. 3A, the display 304 is integral to the headwear 20. In the example of FIG. 3B, the display 304 is part of a mobile device (e.g., a smartphone, a tablet computer, etc.) that is mounted to an exterior or interior of the headwear 20, such as outside or inside of a lens 432 of the headwear 20. In the example of FIG. 4A, the display 304 is a separate device than the headwear 20, and is worn underneath the headwear 20 such that the display 304 is within the field of view of the headwear 20 (e.g., the field of view of the lens 432 of the headwear 20).

The electromechanical user interface components 308 may comprise, for example, one or more touchscreen elements, speakers, microphones, physical buttons, gesture control, EEG mind control, etc. that generate electric signals in response to user input. For example, electromechanical user interface components 308 may comprise capacity, inductive, or resistive touchscreen sensors mounted on the back of the display 304 (i.e., on the outside of the headwear 20) that enable a wearer of the headwear 20 to interact with user graphics displayed on the front of the display 304 (i.e., on the inside of the headwear 20).

The antenna 402 may be any type of antenna suited for the radio frequencies, power levels, etc. used by the communication link 25.

The communication port 404 may comprise, for example, an Ethernet, a USB port, an HDMI port, a fiber-optic communications port, and/or any other suitable port for interfacing with a wired or optical cable.

The communication interface circuitry 406 is operable to interface the processor 410 to the antenna 202 and port 204 for transmit and receive operations. For transmit operations, the communication interface 406 may receive data from the processor 410 and packetize the data and convert the data to physical layer signals in accordance with protocols in use on the communication link 25. The data to be transmitted may comprise, for example, control signals for controlling the equipment 12. For receive operations, the communication interface may receive physical layer signals via the antenna 202 or port 204, recover data from the received physical layer signals (demodulate, decode, etc.), and provide the data to processor 410. The received data may comprise, for example, indications of present settings and/or actual measured output of the equipment 12. For electric welding this may comprise, for example, voltage, amperage, and/or wire speed settings and/or measurements. For flame welding this may comprise, for example, gas flow rate and/or gas mixture ratio settings and/or measurements.

In some examples, the communications interface 406 includes a wireless (e.g., Zigbee) coordinator that receives a notification of a trigger pull event and sends the signal to the processor 410 (e.g., a wireless node). In response, the processor 410 enables a WiFi radio of the communications interface to enable transmission of media (e.g., video and/or audio) via higher-bandwidth protocols such as FTP, HTTP, and/or any other protocol.

In some examples, the headwear 20 (e.g., via the processor 410 and the communications interface 406) provide media (e.g., video, audio, welding data) to one or more cloud servers to store and/or process the media. In some examples, the headwear 20 accesses a fog network to store, process, measure and control the image data. The fog network may be implemented by one or more devices external to the headwear 20 via edge and/or peer-to-peer networking. In some examples, the headwear 20 stores the media in a local flash memory and/or other nonvolatile memory inside the helmet (e.g., in the memory 426). The headwear 20 may implement HTTP and/or FTP servers to enable data transfer. In some examples, a smart phone within wireless communication proximity serves as an edge resource fog network by executing an application, an HTTP client, and/or an FTP client. The example smart phone accesses the media stored in the storage device of the headwear 20. In some examples, the smart phone provides storage, processing, and/or analysis capacities. The weld equipment and/or the smart phone can be edge resources for configuration, pooling, caching and security of videos and audios captured by the headwear 20.

In some examples, the headwear 20 transmits live video captured by the camera 414 on the headwear 20 to a smart phone and/or computing device within wireless communication proximity using peer-to-peer networking (also referred to as point-to-point networking). The transmission of video enables others to view the welding scene even when those people do not have the ability to directly view the weld scene (e.g., the weld arc) due to physical constraints in and/or surrounding the weld scene. In some examples, the headwear 20 includes an RTSP server, and a smart phone app and/or computing device in communication with the helmet includes an RTSP client. The headwear 20 RTSP server uses the Real-time Transport Protocol (RTP) in conjunction with Real-time Control Protocol (RTCP) for media stream delivery.

The user interface driver circuitry 408 is operable to condition (e.g., amplify, digitize, etc.) signals from the user interface component(s) 308.

The processor 410 is operable to process data from the communication interface 406, the user interface driver 408, the image processor 416, and the GPU 418, and to generate control and/or data signals to be output to the speaker driver circuitry 412, the GPU 418, and the communication interface 406. Signals output to the communication interface 406 may comprise, for example, signals to control settings of equipment 12. Such signals may be generated based on signals from the GPU 418 and/or the user interface driver 408. Signals from the communication interface 406 may comprise, for example, indications (received via link 25) of present settings and/or actual measured output of the equipment 12. Signals to the GPU 418 may comprise, for example, signals to control graphical elements of a user interface presented on display 304. Signals from the GPU 418 may comprise, for example, information determined based on analysis of pixel data captured by cameras 414.

The speaker driver circuitry 412 is operable to condition (e.g., convert to analog, amplify, etc.) signals from the processor 410 for output to one or more speakers of the user interface components 308. Such signals may, for example, carry audio to alert a wearer of the headwear 20 that a welding parameter is out of tolerance, that a weld is being performed out of sequence, to provide audio instructions to the wearer of the headwear 20, etc.

The one or more cameras 414 are operable to capture images of the physical environment surrounding the headwear 20. The camera(s) 414 may be operable to capture electromagnetic waves of any suitable wavelength(s) from, for example, infrared to ultraviolet. In an example implementation, there may be two cameras 414 for capturing stereoscopic images from which 3D positioning information can be obtained through processing of the captured images. In an example implementation, the camera(s) 414 may each comprise one or more high dynamic range image sensors (e.g., ~140 dB or more of dynamic range) such that a viewer of the image can simultaneously see the weld arc and the workpiece. In another example implementation, images from multiple image sensors may be combined (e.g., by the GPU 418 as discussed below) to generate composite image having higher dynamic range than is supported by any of the image sensors alone. In one example, the optical sensor 414 and optics 302 assembly is mounted behind the display 304. In another example, the optical sensor 414 and optical components 302 assembly is mounted outside the display 304.

In some examples, the image processor 416 includes an image recognition processor to perform operator identification and/or authorization. To perform operator identification/authorization, the operator faces the helmet camera, the image processor 416 executes a facial recognition process to analyze the facial features of the operator and compare the features with a database of authorized operators. In some examples, the database includes credentials for each operator to identify whether the operator is authorized (e.g., qualified, approved) to operate using the corresponding weld equipment and/or to operate a specified weld task and/or type of weld task. Additionally or alternatively, the image processor 416 may include image recognition features that recognize a code on an identification card belonging to the welder. In response to identifying a welder in the database, the welding system checks the qualification record of the identified welder for presence and/or expiration information.

In some examples, while wearing the camera equipped helmet, the operator may look at the welding consumables such as gas and wire (e.g., by positioning the helmet so that the item to be viewed by the camera falls within the field of view of the helmet lens). The image processor 416 may perform image processing to identify and log in the consumables for the weld job and/or check the identified consumables against a WPS for inconsistencies that could lead to weld defects. If such inconsistencies are identified, the headwear 20 alerts the operator (e.g., via the display 304 and/or the speaker driver 412) and/or other people (e.g., via the communications interface 406), and/or disable the trigger on the weld torch.

In some examples, the image processor 416 causes the camera(s) 414 to auto-focus on an active weld operation. The image processor 416 may control the auto-focus by identifying locations of features representative of an arc (e.g., a brightest area in the scene) and instructing the camera 414 to focus on the area(s) immediately surrounding and/or adjacent the features, which in some cases most likely include the joint and/or the electrode. In some examples, the camera 414 also may have optics providing a large depth of field so that the camera is easily achieves focus on the desired area(s).

In some examples, the image processor 416 controls the camera 414 to perform optical and/or digital image stabilization. The sensors 422 may include one or more inertial measurement units (IMUs) such as multi-axis gyroscopes, multi-axis accelerometers, and/or multi-axis magnetometers to detect, encode, and/or measure movement of the helmet (e.g., turning, vibration, traveling and shaking of the helmet as the wearer's head moves to follow the arc). Based on the measured movement, the image processor 416 compensates for the motion by moving the lens and/or the imager using, for example, micro actuators and/or microelectromechanical systems (MEMS) such as piezoelectric crystals. Additionally or alternatively, the image processor 416 may implement electronic image stabilization (EIS). By using image stabilization techniques, a welder training system, such as LiveArc® sold by Miller Electric™, can use helmet mounted cameras instead of or in addition to fixed-location cameras to extract torch motion data and/or torch angularity data with respect to a welded joint. Such data is potentially beneficial for subsequent training of welders to weld on joints that are difficult or impossible for cameras at a fixed location, such as 360 degree 5G position and/or 6G position pipe welding. Additionally or alternatively, the sensors 422 may include sensors for a fixed-mount camera to track the motion of the helmet and use the helmet position and/or orientation to transform the images captured by the camera 414 in the helmet.

Some example cameras 414 include a high dynamic range imager or image sensor array (e.g., at least 120 dB of dynamic range) and/or native wide dynamic range imager (e.g., at least 140 dB of dynamic range) on the headwear 20. In other examples, a welding system includes a medium dynamic range (MDR) imager with at least 100 dB of dynamic range to decrease the component costs of the helmet. One example MDR imager that may be used is model MT9V024, sold by ON Semiconductor®.

In some examples, the headwear 20 further includes a light source oriented to illuminate the weld scene. The lighting can be an active light source such as an LED array. To conserve battery power of the headwear 20, the light source can be activated automatically when the camera 414 is taking images and determines that additional lighting is beneficial (e.g., luminance received at the camera 414 is less than a threshold). Additionally or alternatively, the active light source can be activated and/or deactivated by an operator interface, such as a voice command. Additionally or alternatively, the headwear 20 may be provided with passive light sources such as a reflective exterior surface. Such a passive light source may reflect energy from the arc to illuminate the welding scene.

The image processor 416 includes an exposure controller that receives arc signals from a power supply or wire feeder (e.g., via a wired or wireless data connection such as the communications interface 406) as a feed forward signal to adapt the exposure time for an optical sensor and/or image processing. Specifically, the image processor 416 may use arc voltage to determine the presence and absence of an arc in the scene. If the sensed arc voltage (e.g., excluding the welding cable voltage and/or electrode stickout voltage) is greater than 14V, the image processor 416 determines that an arc is present and, in response, reduces the exposure to reveal the details of the dark areas such as joint and wire extension. The image processor 416 may also use more aggressive image compression ratios and/or digital image filters for the comparatively brighter scenes. In contrast, when the sensed arc voltage is less than 14V, the image processor 416 determines that the arc is absent and the scene is dark. In response to determining that the arc is not present, the image processor 416 uses longer exposures and less aggressive image compression ratios and/or digital image filters.

In some examples, the image processor 416 uses arc power in addition to or instead of the arc signal as a proxy for the brightness of the arc. For example, the image processor 416 may use level of arc voltage or arc current (or the product of voltage and current which is the arc power) to predict the brightness of the scene, thus adjusting exposure and selecting corresponding image processing algorithms and their parameters. Thus, the image processor 416 more effectively adapts to arc starts and/or stops, and/or when using welding processes where the arc brightness changes quickly (e.g., frequencies of 20 Hz to 250 Hz), such as in pulse welding and short circuiting welding.

The graphics processing unit (GPU) 418 is operable to receive and process pixel data (e.g., of stereoscopic or two-dimensional images) from the camera(s) 414, to output one or more signals to the processor 410, and to output pixel data to the display 304. As mentioned above, processing of the pixel data from camera(s) 414 may comprise combining an image from a first optical sensor 414 or image sensor with an image from a second optical sensor 414 or image sensor to obtain a resulting composite image which has higher dynamic range than either the of the first second images alone. The processing performed by GPU 418 may comprise compressing images to reduce the necessary bandwidth for transmitting them and/or the necessary memory for storing them.

The processing of pixel data by the GPU 418 may comprise, for example, analyzing the pixel data to determine, in real-time (e.g., with latency less than 100 milliseconds or, more preferably, less than 20 milliseconds, or more preferably still, less than 5 milliseconds), one or more of the following: name, size, part number, type of metal, or other characteristics of the workpiece 24; name, size, part number, type of metal, or other characteristics of the electrode 16 and/or filler material; type or geometry of joint 512 to be welded; 2-D or 3-D position of items (e.g., electrode, workpiece, etc.) in the captured field of view, one or more weld parameters (e.g., such as those described below with reference to FIG. 5) for an in-progress weld in the field of view; measurements of one or more items in the field of view (e.g., size of a joint or workpiece being welded, size of a bead formed during the weld, size of a weld puddle formed during the weld, and/or the like); and/or any other information which may be gleaned from the pixel data and which may be helpful in achieving a better weld, training the operator, calibrating the system 10, etc.

In one example, the components in FIG. 4A are contained in a smartphone, such as an iPhone or Android phone, including the optical sensor 414. In such an example, headwear 20 has a holder to secure and house a smartphone or a tablet with camera and WIFI, with (for example) one smartphone camera facing the same direction as the wearer of the helmet with transparent opening in helmet to allow smartphone camera to view the welding scene. The phone may be positioned such that the lens 432 is in front of the smartphone camera (could be the same one used for the wearer's eyes). In some examples, the lens 432 may be omitted because the smartphone protects the wearer's eyes from the arc.

In an example implementation, the processor 410 receives synchronizing signal(s) which trigger the optical sensor 414 to start and/or stop video recording. In some examples, the optical sensor 414 is in a smartphone, and an "app" (application) may be running on the smartphone to receive the synchronizing signal and control the optical sensor 414. The synchronizing signal may be generated by circuitry of the headwear 20 or by circuitry external to the headwear 20. The synchronizing signal may, for example, be: generated by circuitry of the equipment 12 and received via antenna 402; generated by sensor(s) 422 (e.g., a passive IR sensor or photodiode) and communicated to the optical sensor 414 via a wired or wireless interface between the optical sensor 414 and sensor(s) 422; be generated by a smartphone (which may be mounted to/within the helmet); or the like. The synchronizing signal may, for example, be in response to: the pull of the gun trigger; a change in the output of a photodiode which captures light intensity of the environment; detection, using image processing algorithms, of a welding arc in an image captured by optical sensor 414; and/or any other suitable stimulus.

The synchronizing signal may be, for example, arc data (volts, amps, wire speed etc.) associated welding video that can be superimposed/overlaid to the video recorded by the app textually or graphically. The welding equipment 12 can be a welding power source, a welding torch, a wire feeder, a communications module in the welding cell, a robot, a user interface module, etc. The video can be automatically uploaded to the cloud after the weld is complete. Or the video is transmitted live using a peer-to-peer video service, a hosted video service, and/or a livestream service to be viewed at a remote location and/or locally via a tablet/smartphone connected to the same service as a viewer. The signal can also be instructions from another person viewing the streaming video, either audio command or visual instructions. The remote server or app does digital image processing and makes some measurement of the welding process (arc length, wire placement, weld pool size, etc.) and/or weld results (weld size, weld pattern, weld length, etc.). The smartphone could have split screen, such as one screen positioned in front of each of the operator's eyes, to create a stereoscopic vision effect. The smartphone could also have near-eye augmented reality display technology disclosed such as in the U.S. Pat. No. 8,957,835. The app can automatically detect the brightness and adjusts accordingly when using the filter. The app can have variable set points for darkness, recording, still shots, audible feedback. The app can receive inputs, such as from an accelerometer and/or a gyroscope, to sense head motion and compensate for motion, audible input, or other remote input. The app and filter can be used independently of a helmet or headset (hand-held, bench mount, stands, etc.). In virtual reality mode, the smartphone app can simulate arc and weld. When used with other sensors, the virtual reality app may be used for operator training as described below.

In an example implementation, a VR training app executes on a smartphone or a tablet housed inside or outside a helmet, providing a software operator training system using their existing welding equipment and a smartphone or tablet device. As a result, specialized weld training equipment is not needed, and any welding equipment can be converted into a training tool.

In some examples, the app can enable an operator to practice welding on a real workpiece to be welded instead of on a simulated or laboratory setting. The operator puts down a calibration or marker tape or strip with computer-readable glyph symbols onto the weld scene (e.g., on the workpiece or weldment and/or torch body). The markers could be a high contrast glyph symbols of localization code or pattern. Alternatively speckle patterns can be etched into the workpiece for localization. The app identifies the localization codes with a camera equipped on the device executing the app to calibrate the scene objects in the images/videos against real world unit of distance. Using the calibrated distance determined from the markers, the app measures the weld tool (torch) movement such as travel speed.

In an example sequence, the operator configures real welding equipment (e.g., sets parameters) and prepares the welding equipment for actual welding, without configuring the welding equipment in simulation mode. The operator pulls the trigger. The VR app in the smartphone or tablet takes real-time images, performs image processing including object recognition and renders reconstructed scene images based on the captured images, and superimposes virtual objects into the scene images. Example virtual objects include a virtual arc, a virtual weld pool, virtual spatter and/or splatter, a virtual wire feed, and/or a virtual weld bead. As the weld parameters are changed or the torch manipulation is changed, and/or head pose, helmet position, and/or helmet orientation are changed, the corresponding reconstructed objects in the real scene, together with virtual arc, virtual pool, and/or virtual weld bead animation also change accordingly based on models of behavior of the arc physics and thermodynamic models. In some cases, the app is equipped with simpler versions of such models to enable adequate performance such as response time. Additionally or alternatively, the app transmits data to a remote server for execution of the models and receives the results via the communications interface.

Instead of using localization markers, in some examples an IMU inside the torch provides position data, which the app uses to determine the torch travel speed and to render the virtual pool and weld bead shape. Example techniques to determine the torch travel speed using an IMU are described in U.S. patent application Ser. No. 15/004,801, filed Jan. 22, 2016, entitled "Manual Tool Tracking and Guidance with Inertial Measurement Unit." The entirety of U.S. patent application Ser. No. 15/004,801 is incorporated herein by reference. In some other examples, the smartphone may be equipped with an infrared accessory, such as an infrared (IR) sensing camera to measure torch travel speed. The IR sensing camera may receive IR light from an IR illuminator and/or IR reflectors arranged on the torch body to capture torch motion. To compensate for head movement, IR reflectors may be placed on one or more stationary objects, such as weld fixtures, to calibrate and/or transform the images captured from a moving camera. The stationary IR reflectors may have a different shape than the reflectors on the torch or different wavelength may be used to distinguish torch from stationary markers or scene anchors. While some examples use a smartphone/tablet to identify torch speed, in some other examples IR detection and processing circuit(s) are separately packaged (e.g., on a circuit board containing IR cameras, optics, sensors and computing hardware and software) to track torch movement, orientation and/or speed. The example IR detection and processing circuit(s) provide the movement, orientation and/or speed information to the smartphone or tablet for use in generating weld records and/or displaying data to the operator. Example markers (e.g., IR reflectors) are described below with reference to FIG. 6F.

The smartphone or tablet may receive wireless (e.g., Bluetooth) synchronization signals from the welding equipment to start and/or end the VR simulation and welding parameters set by operators on the physical weld equipment. Additionally or alternatively, the smartphone may receive and process voice commands from the operator to perform operations while the smartphone is mounted inside a helmet or otherwise unreachable by the finger touch. The smartphone/tablet may display welding results or a summary ( ) of torch movement (e.g., heat input, bead width, penetration, travel speed, torch angles, etc.) after the welding is complete.

Parameters determined from the image processing may be compared against a weld procedure specification WPS for the weld being performed. If there is a deviation from the WPS beyond a determined tolerance window, an alert (e.g., visual, audible, and/or tactile) may be generated. For example, the image processing may measure the weld width and length which the processor 410 may then compare with the WPS. As another example, the image processing may perform seam tracking to track the joint and measure wire placement relative to the joint and the processor 410 may compare this measurement to the WPS and alert the operator if the wire is departing from the joint more than a determined tolerance. The image processing to determine the various parameters may take into account, and be aided by, a priori knowledge of the welding job such as the dimensions of the workpiece, wire size, type of gas, etc.

The information output from the GPU 418 to the processor 410 may comprise the information determined from the pixel analysis.

The pixel data output from the GPU 418 to the display 304 may provide a mediated reality view for the wearer of the headwear 20. In such a view, the wearer experiences the video presented on the display 304 as if s/he is looking through a lens, but with the image enhanced and/or supplemented by an on-screen display. The enhancements (e.g., adjust contrast, brightness, saturation, sharpness, etc.) may enable the wearer of the headwear 20 to see things s/he could not see with simply a lens. The on-screen display may comprise text, graphics, etc. overlaid on the video to provide visualizations of equipment settings received from the processor 410 and/or visualizations of information determined from the analysis of the pixel data.

The display driver circuitry 420 is operable to generate control signals (e.g., bias and timing signals) for the display 304 and to condition (e.g., level control synchronize, packetize, format, etc.) pixel data from the GPU 418 for conveyance to the display 304.

The sensor(s) 422 may comprise, for example, infrared and/or ultrasonic sensors, accelerometers, gyroscopes, and/or the like. The sensor(s) 422 may, for example, be operable to track head movement of the weld operator.

The power source 224 may comprise, for example, a battery (e.g., a lithium ion or sodium ion or lithium polymer or dual carbon battery), circuitry for charging the battery from an AC and/or DC power source, and circuitry for conditioning/delivering energy from the battery to the other circuitry of the headwear 20.

Figure 4C:
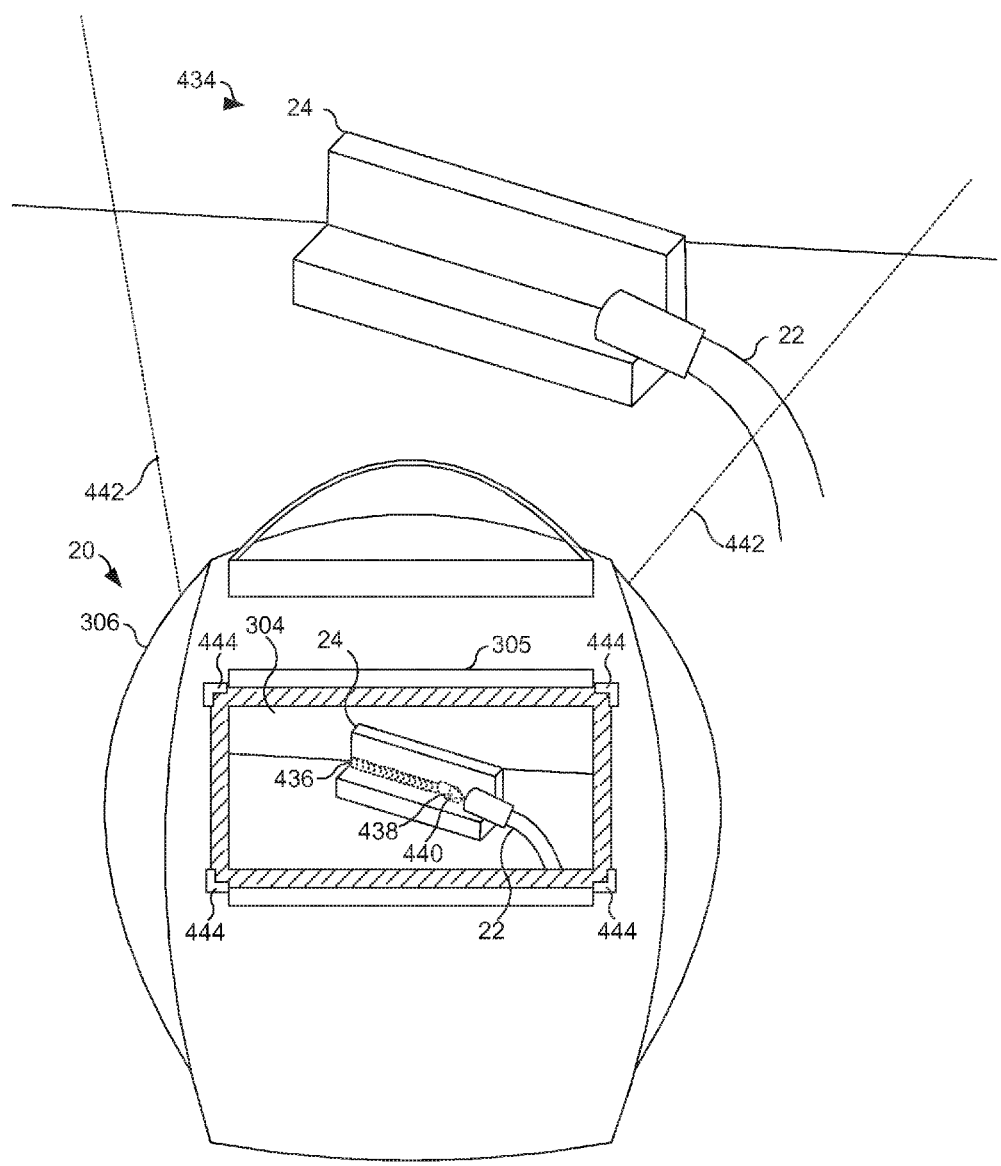

FIG. 4C is another example perspective of the headwear 20. The perspective illustrated in FIG. 4C shows a viewpoint from inside the shell 306 (e.g., from an wearer's perspective). As shown in FIG. 4C, the display 304 (e.g., a smartphone) is mounted in a field of view of the shell 306 such that a camera on the rear of the smartphone has a view of a weld scene 434.

The example weld scene 434 of FIG. 4C includes the workpiece 24 and the torch 22. In the weld scene 434, the torch 22 is not operating (e.g., no weld is occurring in the weld scene 434). As described in more detail below, the display 304 may be controlled to display the weld scene 434 with one or more simulated objects overlaid on the scene observed by the camera 414. As illustrated in FIG. 4C, the display 304 may show a simulated weld bead 436, a simulated weld puddle 438, and/or a simulated arc 440 in addition to the workpiece 24 and the torch 22 that are actually present in the weld scene 434. The field of view is illustrated by view lines 442 that show the outside of the field of view of the camera 414 of the smartphone mounted in the shell 306.

The example smartphone of FIG. 4C is mounted inside the welding helmet (e.g., the shell 306) using clips 444 that hold the smartphone such that, when the mobile device is held by the welding helmet and the welding helmet is worn by a wearer, the display 304 of the smartphone is viewable by the wearer, the camera of the smartphone has a view through the view port (e.g., through the lens 432) such that the display 304 of the smartphone provides a field of view of the wearer that corresponds to a field of view of the wearer through the view port. While 4 clips 444 are shown in FIG. 4C, more or fewer clips may be used. Additionally or alternatively, any other structure may be used to detachably mount the smartphone inside of the welding helmet, such as one or more of: arm(s), band(s), belt(s), case(s), slot(s), container(s), cover(s), enclosure(s), frame(s), jacket(s), member(s), platform(s), rib(s), ring(s), compression device(s), friction device(s), cable(s), hook(s), nut/bolt(s), adhesive(s), bracket(s), and/or any other type of structure, fastener, and/or mounting device.

While example implementations of the headwear 20 are described with reference to FIGS. 3A, 3B, 3C, 4A, 4B, and 4C other implementations may be used. For example, any of the example antenna 402, the example port 404, the example communications interface 406, the example user interface driver 408, the example processor 410, the example speaker driver 412, the example camera(s) 414, the example image processor 416, the example GPU 418, the example display driver 420, the example sensor(s) 422, the example power source 424, the example memory 426, and/or the example instructions 428 may be implemented using hardware, software, firmware, and/or any combination of hardware, software, and/or firmware. For example, the example antenna 402, the example port 404, the example communications interface 406, the example user interface driver 408, the example processor 410, the example speaker driver 412, the example camera(s) 414, the example image processor 416, the example GPU 418, the example display driver 420, the example sensor(s) 422, the example power source 424, the example memory 426, and/or the example instructions 428 may be implemented using one or more integrated circuits and/or discrete circuits, such as general purpose processors, special purpose processors (e.g., digital signal processors), programmable logic devices. Furthermore, implementations may include combinations of components and/or functions into single integrated circuit packages and/or divisions of components and/or functions into multiple integrated circuit packages.

Figure 5A:
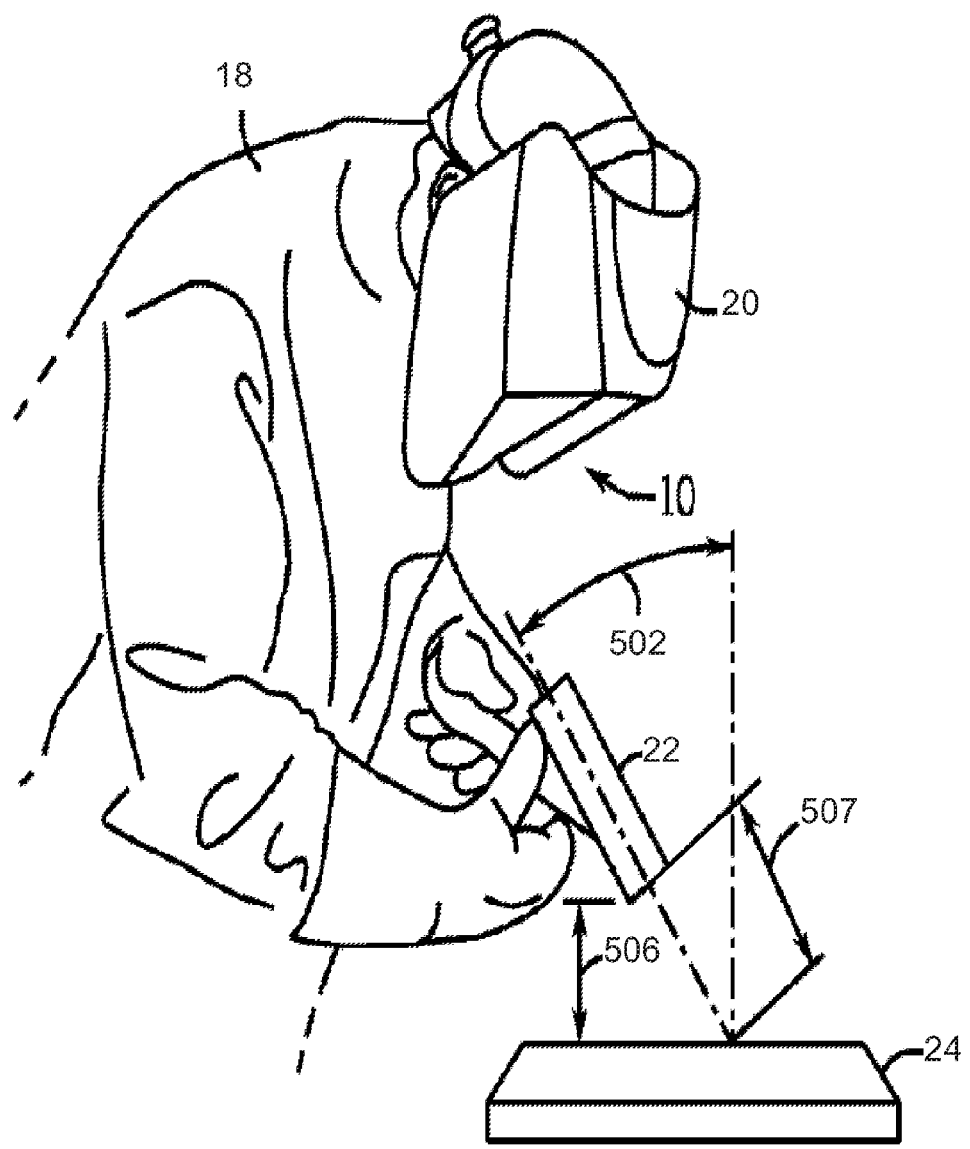
FIGS. 5A-5C illustrate various parameters which may be determined from images of a weld in progress.
Figure 5B:
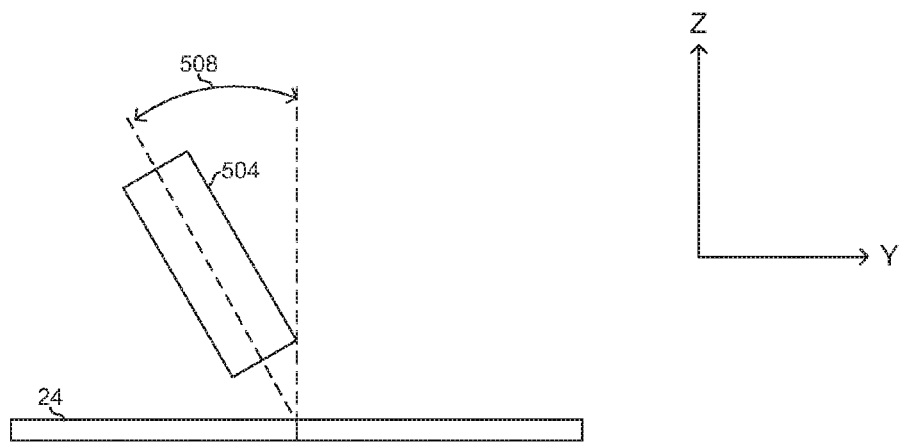
Figure 5C:
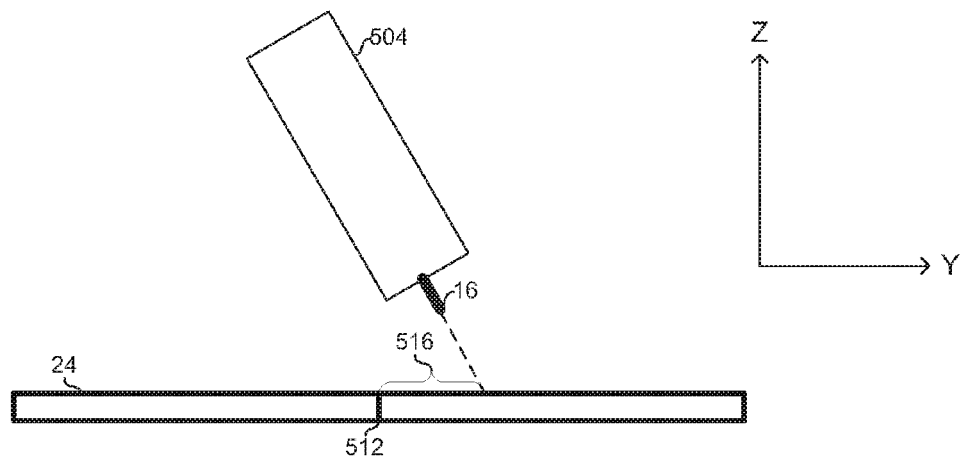

FIGS. 5A-5C illustrate various parameters which may be determined from images of a weld in progress. Coordinate axes are shown for reference. In FIG. 5A, the Z axis points to the top of the paper, the X axis points to the right, and the Y axis points into the paper. In FIGS. 5B and 5C, the Z axis points to the top of the paper, the Y axis points to the right, and the X axis points into the paper.

In FIGS. 5A-5C, the equipment 12 comprises a MIG gun 504 (e.g., an implementation of the torch 22 of FIG. 1) that feeds a consumable electrode 16 to a weld joint 512 of the workpiece 24. During the welding operation, a position of the MIG gun 504 may be defined by parameters including: contact tip-to-work distance 506 or 507, a travel angle 502, a work angle 508, a travel speed 510, and aim.

Contact tip-to-work distance may include the vertical distance 506 from a tip of the torch 22 to the workpiece 24 as illustrated in FIG. 5A. In other embodiments, the contact tip-to-work distance may be the distance 507 from the tip of the torch 22 to the workpiece 24 at the angle of the torch 22 to the workpiece 24).

The travel angle 502 is the angle of the gun 504 and/or electrode 16 along the axis of travel (X axis in the example shown in FIGS. 5A-5C).

The work angle 508 is the angle of the gun 504 and/or electrode 16 perpendicular to the axis of travel (Y axis in the example shown in FIGS. 5A-5C).

The travel speed is the speed at which the gun 504 and/or electrode 16 moves along the joint 512 being welded. In an example implementation, image processing may be used to determine travel speed. For example, weld pool size and shape (e.g., tear, oval, etc.) and/or other stationary features in the welding scene (e.g., a bump or scratch on the workpiece) may be used in image processing algorithms to infer the travel speed (similar to an optical mouse). In an example implementation, weld bead striation of Miller Electric's Profile Pulse (e.g., altering wire speed and/or power and heat input) may be used along with image processing algorithms to infer travel speed in the welding scene.

The aim is a measure of the position of the electrode 16 with respect to the joint 512 to be welded. Aim may be measured, for example, as distance from the center of the joint 512 in a direction perpendicular to the direction of travel. FIG. 5C, for example, depicts an example aim measurement 516.

FIGS. 6A-6E illustrate an example welding process using headwear embodying aspects of this disclosure.

The process begins with block 652, in which one or more welds to be performed are determined by the headwear 20. The determination may be based on an identifier (e.g., a work order number, a part number, etc.) entered by a wearer of the headwear 20 through, for example, voice recognition and/or tactile input. Alternatively, or additionally, the wearer of the headwear 20 may view the workpiece to be welded from a distance and/or angle that permit(s) the camera(s) 302 to capture an image of the workpiece from which an image processing algorithm can detect welds to be performed. For example, unique shapes, markings, and/or other features of a workpiece in the captured image view may be detected and used to retrieve an identifier associated with the workpiece.

In block 654, instructions for the weld(s) to be performed are retrieved from memory (e.g., local memory in the 20 and/or network-based memory). For example, the identifier determined in block 652 may be used as an index to retrieve a corresponding entry in a database residing in server 30 (FIG. 1). The retrieved instructions may comprise, for example, text and/or images (still images, video, and/or CAD drawings) of any format suitable for presentation on the display 304. Information contained in the instructions may include, for example: number of welds to be performed on the workpiece, sequence in which a plurality of welds are to be performed, target welding parameters for each weld to be performed, nominal equipment settings to be used for each weld to be performed, identification of welding materials (electrode, filler material, etc.) to be used for each weld to be performed, how to prepare a workpiece for each weld to be performed (e.g., paint or oxide removal, tack welds, how to put parts in jigs, closing the clamps, screwing/bolting torque values, prepping/cleaning of tools, inspection and measurement of the joint fit-up, etc.), and/or the like. A code scanner function may be used by a smartphone app to recognize objects (e.g., checking the wire type against WPS to flag mistakes, inconsistency, and/or noncompliance. When the trigger is pulled, the app checks a list of requirements and, if an error is identified, flags the identified anomaly and disables the trigger.

Figure 6A:
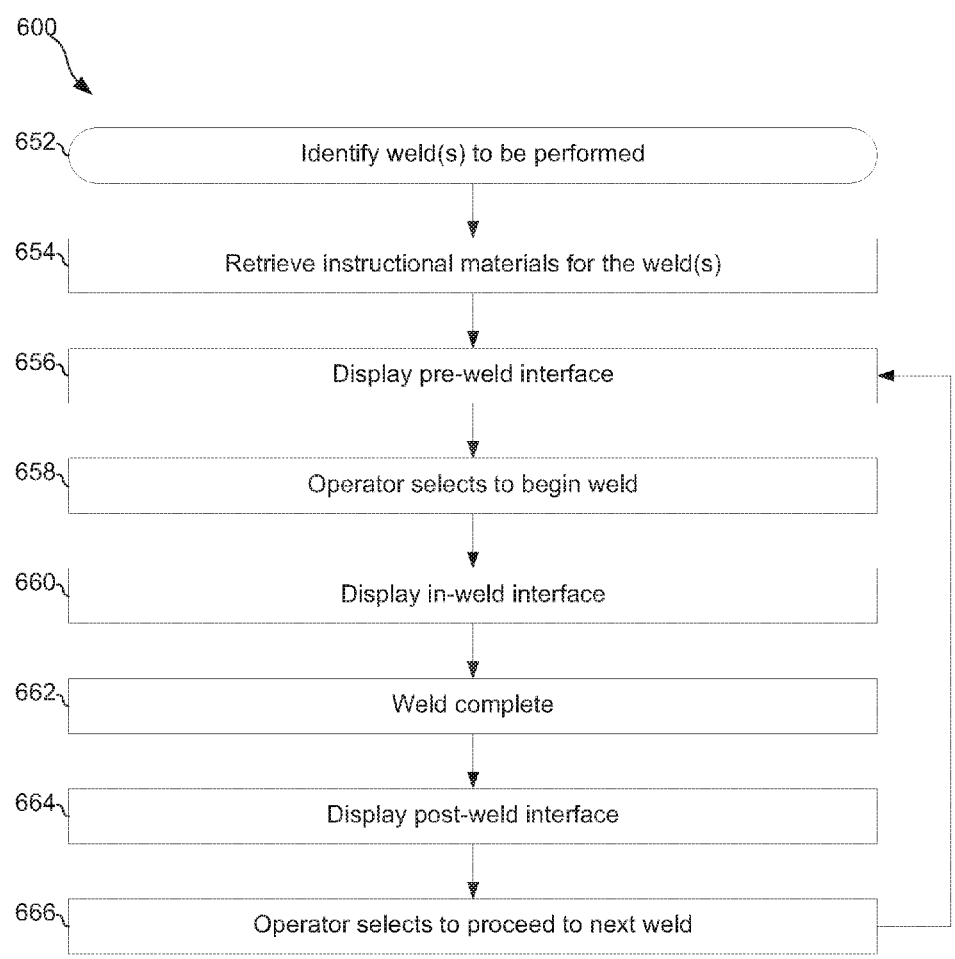
FIG. 6A is a flowchart illustrating an example welding process using headwear embodying aspects of this disclosure.
Figure 6B:
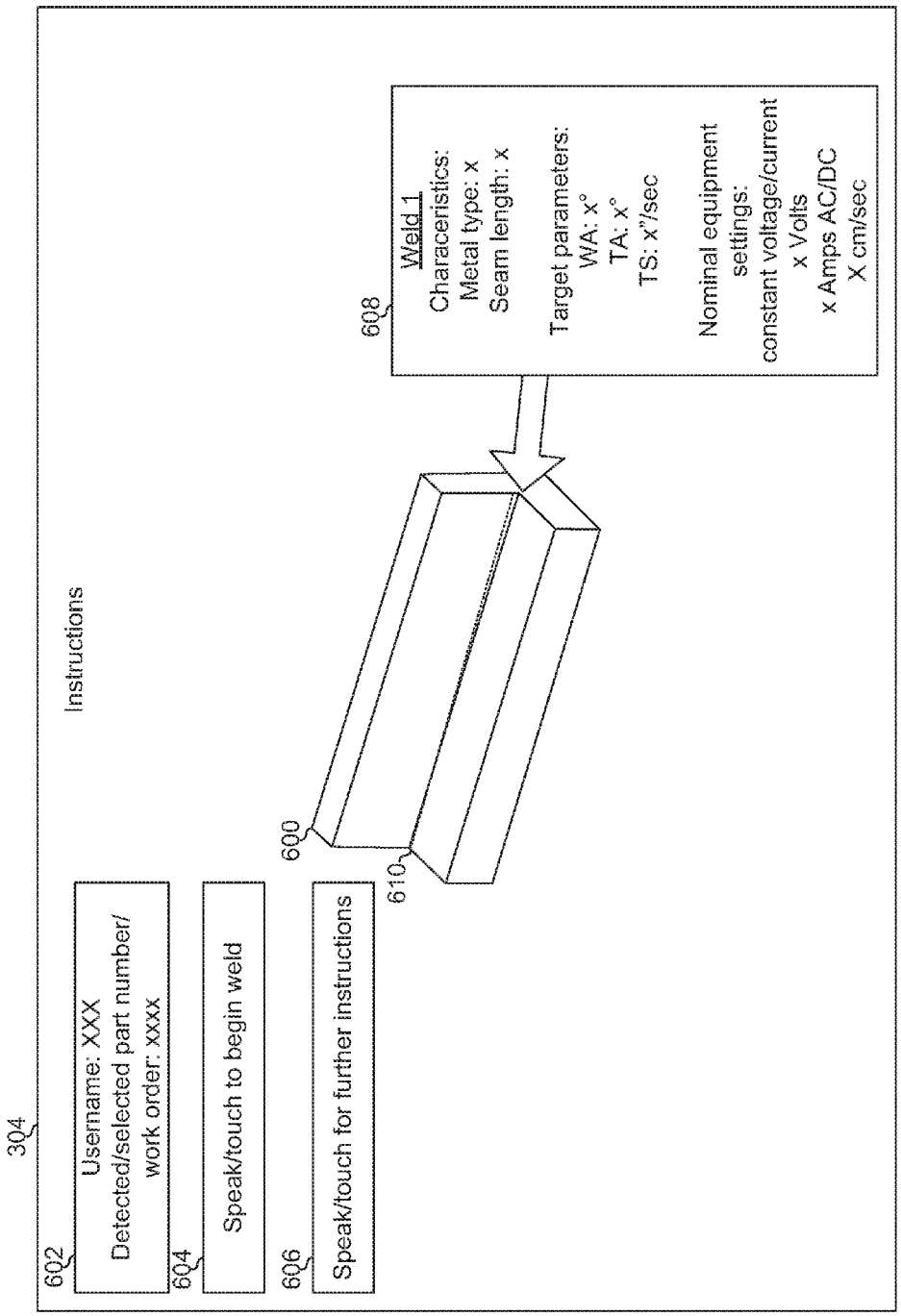
FIGS. 6B-6G illustrate example interfaces that may be presented to a weld operator via a display to provide weld information to an operator.

In block 656, a pre-weld interface is presented on display 304. The pre-weld interface may provide instructions on setting up for a next weld to be performed and/or for actually performing the weld. Referring to FIG. 6B, an example pre-weld interface is shown. The example pre-weld interface comprises graphical elements 602, 604, 606, 608, and 610 overlaid on an image of the workpiece identified in block 652. The image of the workpiece may be a photo or drawing received along with the instructions or may be an image of the actual workpiece captured (e.g., in block 652) by the camera(s) 302.

The graphic 602 (e.g., a text box) provides the wearer of the headwear 20 with information about the workpiece (e.g., the part number(s) of workpiece(s) to be welded, a work order number for the welds to be performed, and/or the like). The graphic 602 may also display the username of the wearer of the headwear 20, for purposes of storing data to an appropriate user profile. The wearer of the headwear may interact with the graphic 604 via the user interface 208 (e.g., using gesture, tactile or voice controls). Activation of the graphic 604 may cause the headwear 20 to close the pre-weld interface and bring up the in-weld interface described below. The wearer of the headwear 20 may interact with the graphic 606 via the user interface 208. Activation of the graphic 606 may cause the headwear 20 to bring up additional instructions (e.g., to show a previously-recorded video of the weld(s) to be performed). The graphics 608 and 610 identify the next weld to be performed and provide information about performing the weld. In the example shown, the graphic 608 identifies: characteristics of the workpiece such as the type of metal of which it is made; characteristics of the seam to be welded such as its length and width; target parameters for welding the seam such as target work angle, target travel angle, target travel speed, target weave pattern, target multi-pass stack up sequence, and/or the like; and nominal equipment settings such as whether a constant current or constant voltage mode should be used, the nominal voltage that should be used, the nominal current that should be used, the type/size of electrode and/or filler material that should be used, the nominal wire speed that should be used, etc.

Figure 6C:
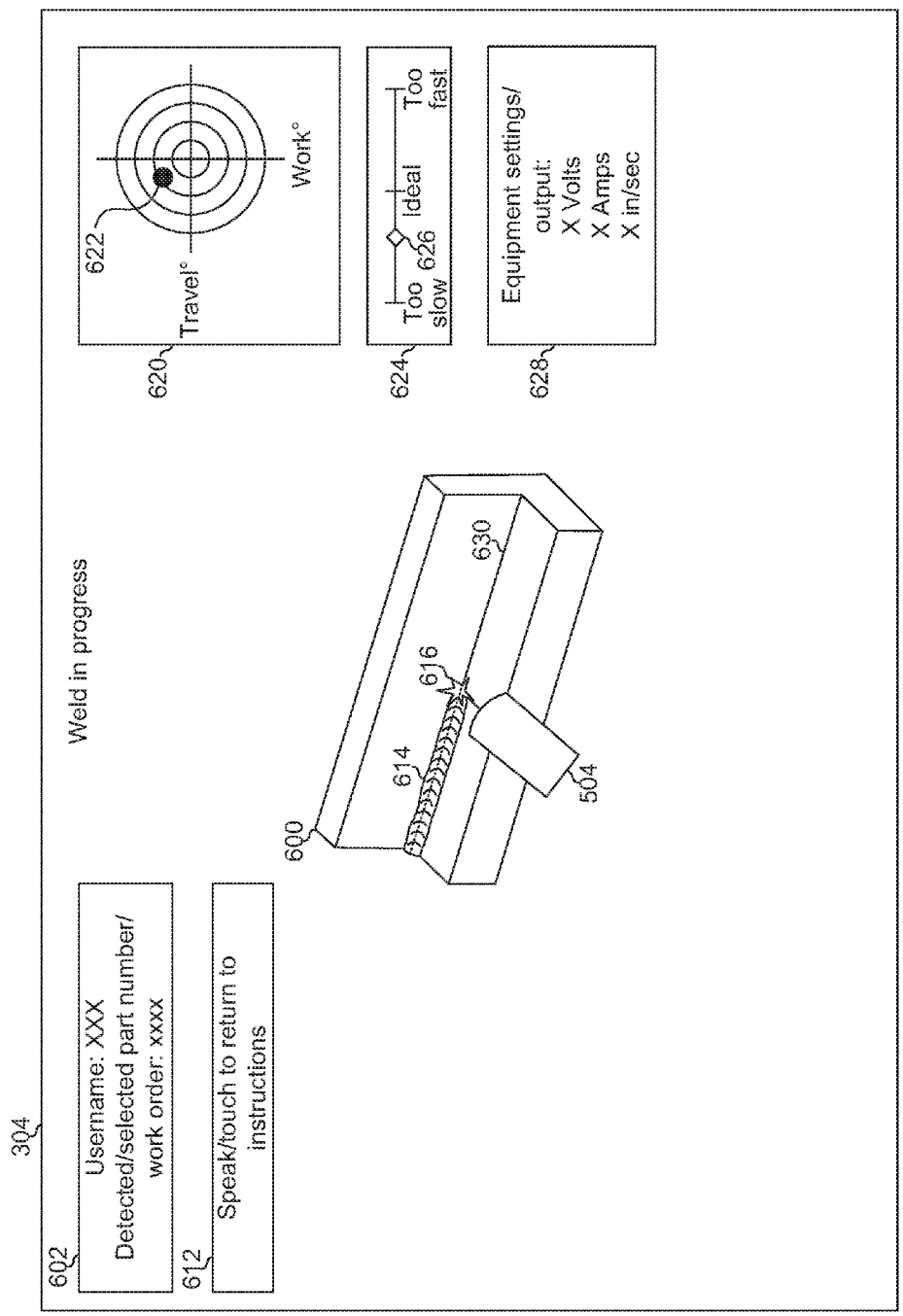

Returning to FIG. 6A, in block 658 the wearer of the headwear 20 triggers (e.g., by activating graphic 604) a transition from the pre-weld interface to an in-weld interface. In block 660, the in-weld interface is presented. The in-weld interface provides instructions for performing a particular weld. Referring briefly to FIG. 6C, an example in-weld interface is shown. The example in-weld interface comprises graphical elements 602, 612, 620, 624, 628, and 630 overlaid on real-time video frames captured by the camera(s) 302. The real-time video frames may be presented on the display 304 within, for example, 20 milliseconds or, more preferably, 5 milliseconds, of having been captured by the camera(s) 302. The overlaid graphics may be opaque or partially transparent. The graphic 602 (e.g., a text box) provides the wearer of the headwear 20 information about the welds to be performed (e.g., the part number of the workpiece, a work order number for the welds to be performed, and/or the like). The wearer of the headwear 20 may interact with the graphic 612 via the user interface 208 (e.g., using tactile or voice or gesture controls). Activation of the graphic 612 may cause the headwear 20 to transition from the in-weld interface back to the pre-weld interface for the current weld. In this manner, the operator is enabled to quickly switch back and forth between the pre-weld interface and the in-weld interface. In an example implementation, both interfaces may be viewed simultaneously (e.g., in a side-by-side or picture-in-picture type view).

The graphics 620, 624, 628, and 630 provide feedback to the wearer of the headwear 20 as to one or more welding parameters measured for a weld in progress. In the example shown, the graphic 620 comprises positional coordinate axes representing work angle and travel angle. The center of the coordinate system indicates the optimal orientation of the welding torch 618 during the weld. An actual orientation of the torch is indicated by dot 622. Based on this feedback, the operator can re-position the torch in an attempt to bring the dot 622 back to center. Other graphical representations of torch angle to provide feedback may be used instead of the "bull's-eye" shown in FIG. 6C. Some examples are described in United States Patent Application Publication 2009/0298024, which is hereby incorporated herein by reference. In the example shown, the graphic 624 comprises a graphical speedometer extending between a "too slow" marker and a "too fast" marker. A marker 626 indicating the actual speed is provided on the graphical speedometer as a feedback to the wearer of the headwear 20. Other graphical representations of travels speed to provide feedback may be used instead of the linear speedometer shown in FIG. 6C. Some examples are described in United States Patent Application Publication 2009/0298024, which is hereby incorporated herein by reference. The graphic 628 provides the wearer of the headwear 20 with feedback as to settings and/or actual measured output of the welding equipment 12. The measured output may, for example, present real-time readings from arc monitoring equipment (e.g., presented along a time axis as on an oscilloscope display). The graphic 630 provides a reference path to aid the operator in aiming the electrode at s/he performs the weld. The graphic 630 may, for example, coincide with the centerline of the seam and/or may set forth a weaving pattern. Any images and/or other data captured during the weld may be stored to local memory and/or to remote memory such as memory of server 30. The stored images and/or other data may thus be made available for later playback, analysis, and/or other interaction. For example, the server 30 may be configured to enable streaming, 2D Fourier transform, sampling and filtering, motion estimation such as phase correlation, block matching and spatiotemporal gradient analysis, noise smoothing, sharpening, homomorphic filtering, pseudo coloring, segmentation, compression, annotation, sharing, etc. using cloud and web technologies such that computer novices may be provided with tools for viewing, interacting, learning from, and educating with the use of the captured images and/or other data. In another example, the aforementioned image processing can be done in the equipment 12 before sending on to server 30 via the communication link 29.

Figure 6D:
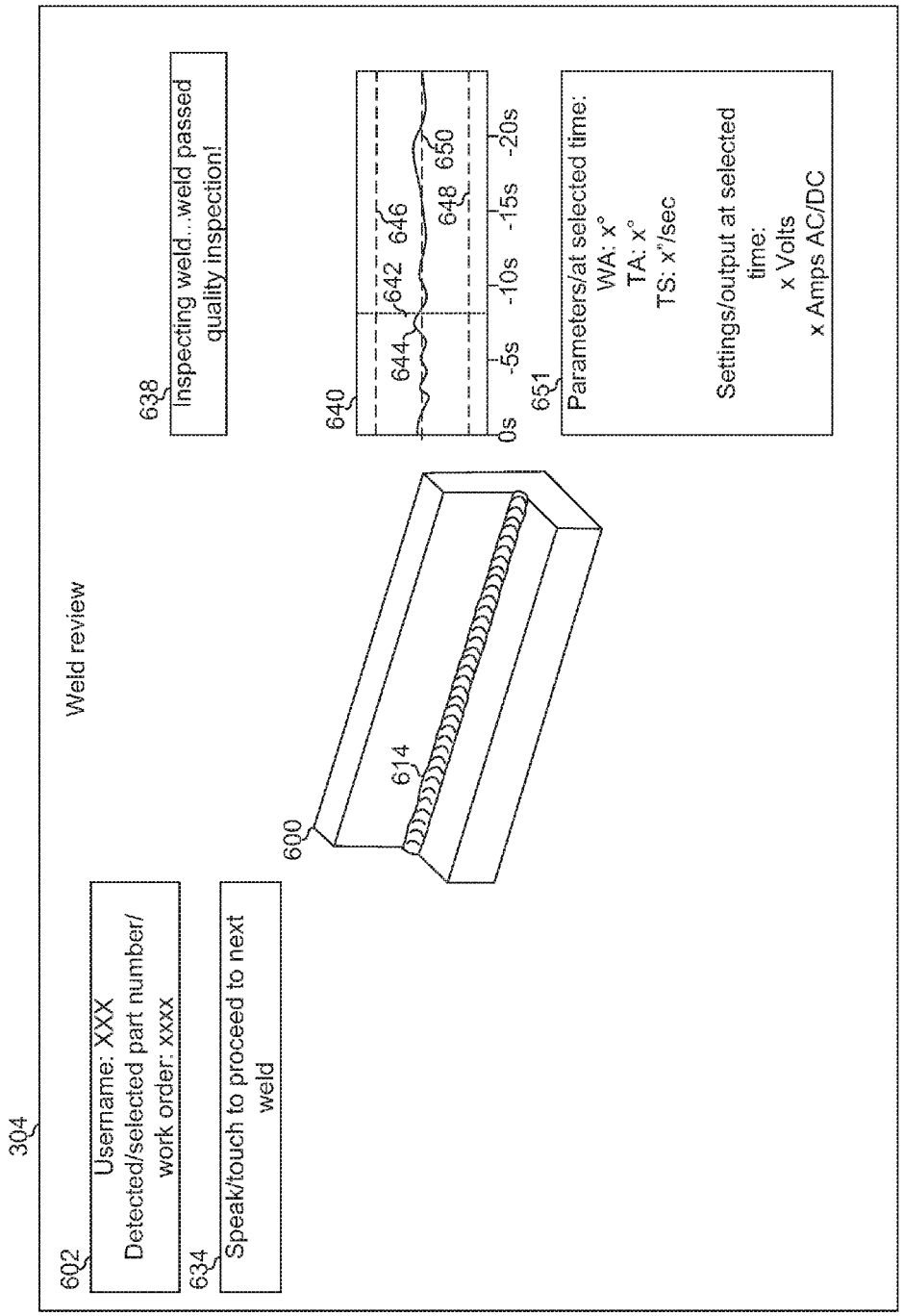

Returning to FIG. 6A, in block 662 the operator completes the weld. In block 664, upon detecting the completion of the weld (e.g., automatically through an image processing algorithm or through input from the operator), the headwear 20 presents a post-weld interface. The post-weld interface presents a summary of the completed weld (e.g., for training and/or quality control purposes). Referring briefly to FIG. 6D, an example post-weld interface is shown. The example post-weld interface comprises graphical elements 602, 634, 638, 640, and 651 overlaid on a video frame captured by the camera(s) 302. The graphic 602 (e.g., a text box) provides the wearer of the headwear 20 with information about the welds to be performed (e.g., part number of a workpiece involved, a work order number for the welds to be performed, and/or the like). The wearer of the headwear 20 may interact with graphic 634 via the user interface 208 (e.g., using tactile or voice controls). Activation of the graphic 634 may cause the headwear 20 to transition from the post-weld interface to the pre-weld interface a next weld to be performed while an audio command instruct operation to look at the finished weld thru pointing the camera to go over the entire weld.

The graphics 638, 640, and 651 provide a review of the completed weld to the wearer of the headwear 20. The graphic 638 (e.g., a textbox) provides results of an assessment of the completed weld. Such an assessment may comprise a determination of whether welding parameters and/or equipment settings measured and stored during the weld are within determined tolerances (e.g., set forth in the instructions). Such an assessment may include implementing an image processing algorithm for inspecting shape, length, width, height, smut, oxide cleaning track, reflectivity, color, visible discontinuities and defect (e.g. crack, undercut, burn thru, bead humping, concavity, lack of fusion, surface porosity, leftover wire protrusion, spatter and splatter, distortion, deformations, and/or other visual characteristics of the bead 614 and/or the workpiece). Such assessment may include checking the brightness of the images captured during the weld. For example, dark frames during the weld may indicate places along the weld where the arc was lost, and such locations may be deserving of additional inspection (either through image processing and/or by directing the operator to perform further inspection or testing). Similarly, such an assessment may include checking the equipment settings/outputs shown in graphic 640 for discontinuities which may correspond to places where the arc was lost, for example.

The graphic 640 provides a histogram of a parameter and/or setting measured during the weld. Although only a single graphic 640 is shown, any number of them corresponding to any number of parameters and/or settings may be shown. The line 650 corresponds to a target value for the parameter. The lines 646 and 648 correspond to upper and lower tolerances for the parameter. The line 644 corresponds to the measurements of the parameter for the completed weld. The marker 642 allows the operator to select any time instant during the weld. The graphic 651 displays additional information for the time instant selected by the marker 642. In an example implementation, the video frame on which the graphic elements 602, 634, 638, 640, and 651 are overlaid is the frame captured at the time instant selected by the marker 642. In this manner, by scrolling the marker 642 or triggering playback (i.e., auto-scrolling of the marker 642) a recording of the weld may be viewed on the display 304. The data presented in the post-weld interface may be associated in memory with a user profile of the operator who performed the weld. Such user profile information may be used for evaluating/certifying/etc. the operator.

In an example implementation, the graphic 640 may be analyzed to detect potential problems with the weld (e.g., a time graph of the current delivered to the weld may be analyzed for sharp spikes or discontinuities which may be indicative of stubbing, open circuit voltage (OCV), or arc outage, for example). Such a spike, instability or anomalies may then be called out with interface elements (e.g., an alternate marker 642, for example) on the post-weld interface. Interaction with such interface elements by the operator may then bring up a recording of the in-weld interface from the time period surrounding the detected spike or instability.

Figure 6E:
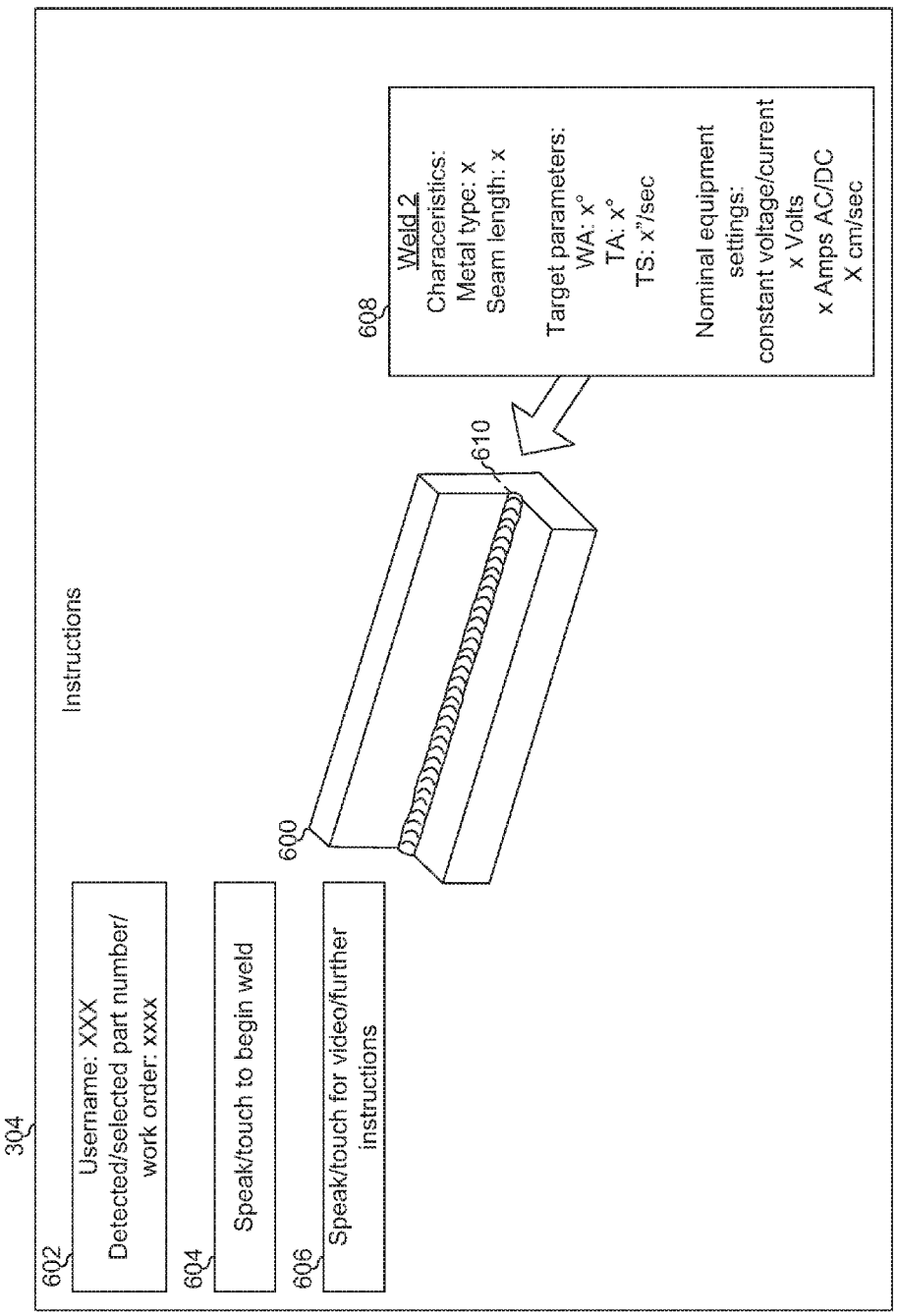

Returning to FIG. 6A, in block 666 the wearer of the headwear 20 triggers (e.g., by activating graphic 634) a transition from the post-weld interface to the pre-weld interface for the next weld to be completed. FIG. 6E shows an example of such an interface, which is similar to the interface shown in FIG. 6B, but for the next weld on the workpiece 600.

Figure 6F:
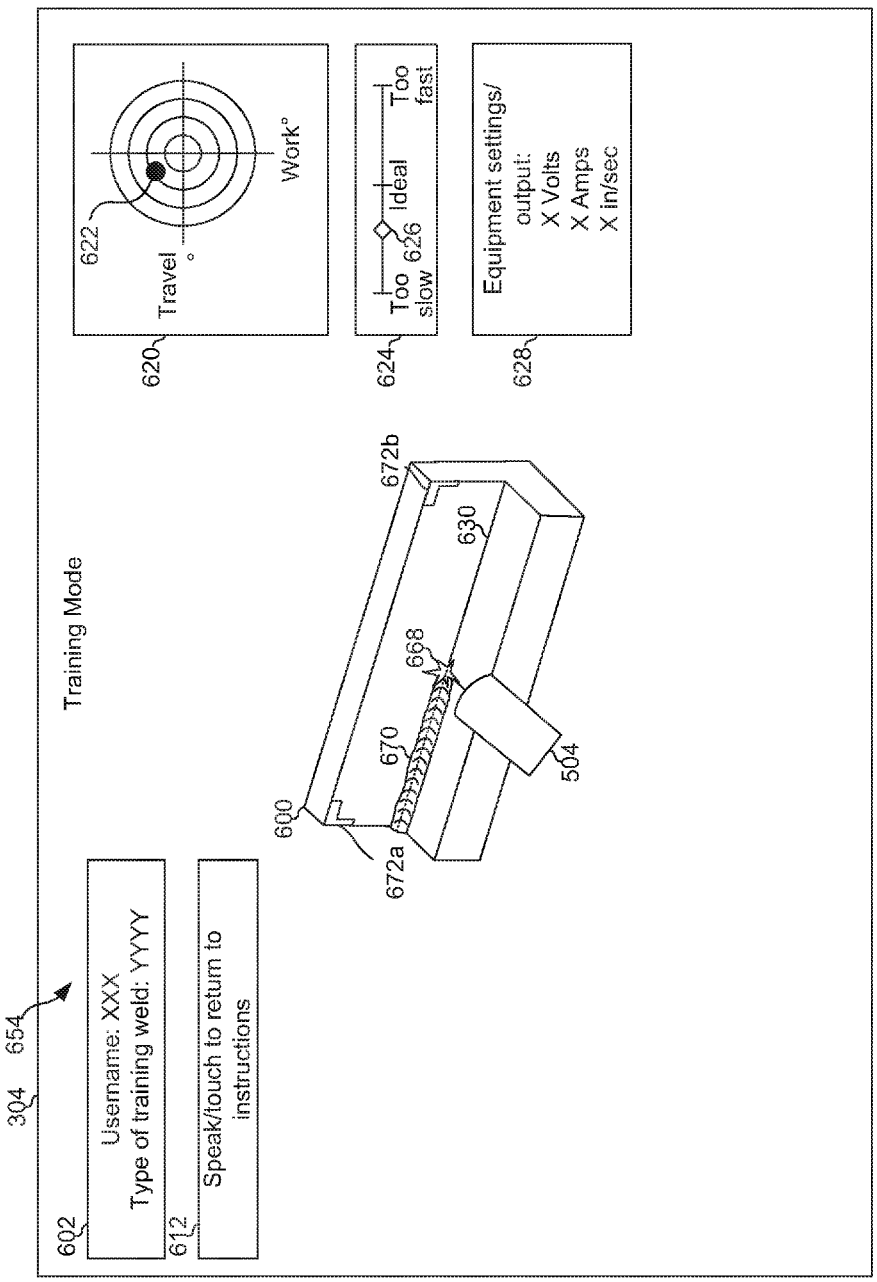

FIG. 6F illustrates an example training graphic 653 that may be presented to an operator to perform operator training. The example graphic 653 may be presented on the display 304, and illustrates a weld environment with a workpiece 600. The workpiece 600 in the graphic may be obtained from images of the environment taken with the camera 414. In the training mode, the image processor 416 and the processor 410 generate and overlay virtualized versions of the electrical arc 668 and the resulting weld bead 670 based on weld signal feedback received from the power supply (which is also in a training mode and does not output current).

In the example of FIG. 6F, the image processor 416 determines an orientation of the workpiece 600 and/or any other objects in the image based on one or more localization markers 672a, 672b. The localization markers are recognized in the image captured by the camera 414 and, with knowledge of the size and arrangement of the markers 672a, 672b, the image processor 416 can determine an appropriate size and/or orientation of objects generated for display. The markers 672a, 672b may be a bar code, a quick response (QR) code, or any other one, two, and/or three-dimensional indicia and/or glyph that is readable by processing an image of the markers 672a, 672b. Additionally or alternatively, the markers 672a, 672b may be implemented using infrared (IR)-frequency reflectors.

Figure 6G:
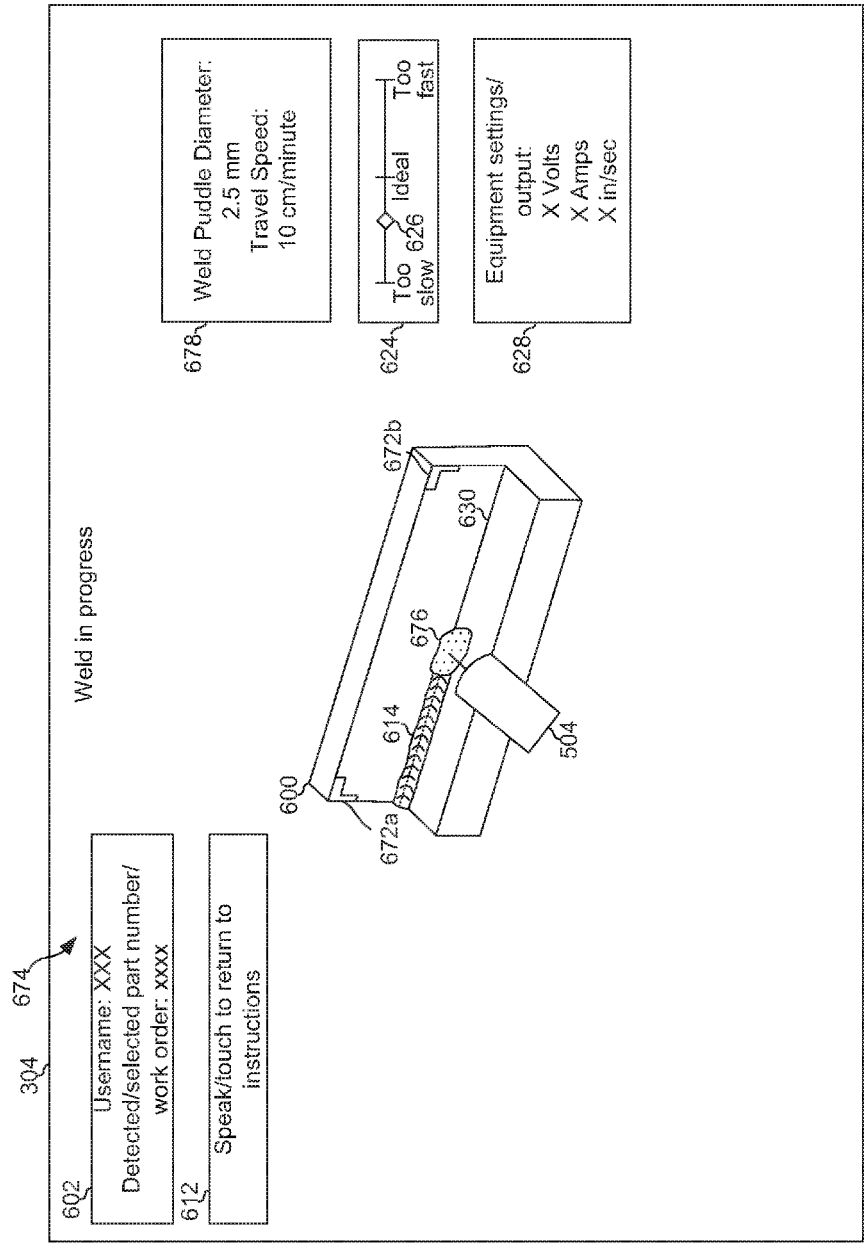

FIG. 6G illustrates another example weld interface 674 in which the headwear 20 measures and/or displays the size of a weld puddle 676 during a welding operation. To measure the size of the weld puddle 676, the headwear 20 may use one or more camera(s) 414. Using one camera, the example processor 410 identifies and calibrates dimension information using one or more known objects in the weld scene. For example, the processor 410 may identify (from the images captured by the camera 414), a welding wire diameter and/or the localization markers 672a, 672b, which have a predetermined size. To obtain an image of the weld puddle 676 (e.g., without interference by the electrical arc), the processor 410 may request a short circuit to be performed by the equipment 12. In a stable GMAW process, the short circuit events happen at regular intervals, e.g. at 80-250 Hz. When the arc is extinguished during the short circuit, the camera 414 captures an image of the weld puddle, which can then be measured by the processor 410 by processing the image with reference to the known reference objects. For example, because the electrode wire is touching the weld pool 676 (or is at least in close proximity), the processor 410 may estimate the weld pool dimension(s) from the electrode wire size in the same image. Weld size is usually very close to the weld pool size (proportional or with an offset) if weave is not used. Alternatively, in non-short circuit weld processes such as GTAW (e.g., the electrode is not consumable but has a known diameter), the camera 414 is an HDR camera that can view the weld pool despite the intense arc light.

Additionally or alternatively, the cameras may include 1) stereoscopic HDR optical sensors, which may provide depth perception and dimensional measurement to measure the weld pool 676; 2) stereoscopic infrared sensors, which identifies the weld pool 676 as the highest-temperature object in the infrared image and filters out other objects; 3) a laser scanner; 4) a time of flight camera; 5) a single camera with a laser ranging device for distance; 6) a single camera with an object that has known dimensions mounted on the torch for reference in front of the weld pool 676; and/or 7) a single camera with gas nozzle geometric features that have known dimensions, measuring stick-out and arc length through the arc (e.g., via HDR optical sensors) to determine the size of the weld pool 676.

Using consecutive images, the processor 410 can identify the weld pool travel direction (e.g., the direction in which the weld pool develops, opposite the direction in which the weld pool cools to the weld bead). From the weld pool travel direction, the processor 410 measures the width of weld pool 676 (e.g., perpendicular to the travel direction). After determining the size of the weld pool 676, the processor 410 determines a weld size, which may be a delta offset or proportional to the weld pool 676. From the weld size, the processor 410 further determines the travel speed of the torch 504 (e.g., using a model or algorithm), heat input (e.g., proportional to the square of the fillet), and/or a weld leg size. The processor 410 may determine the travel speed as proportional to the welding power divided by the heat input.

The example interface 674 displays the calculated weld puddle diameter and the travel speed in a graphic 678 that is displayed with the welding scene. In some examples, the processor alerts the operator based on travel speed conformance. Additionally or alternatively, the processor 410 may request a change to the wire feed rate for weld size closed loop control or heat input per unit length closed loop control (e.g., for constant penetration).

Figure 7A:
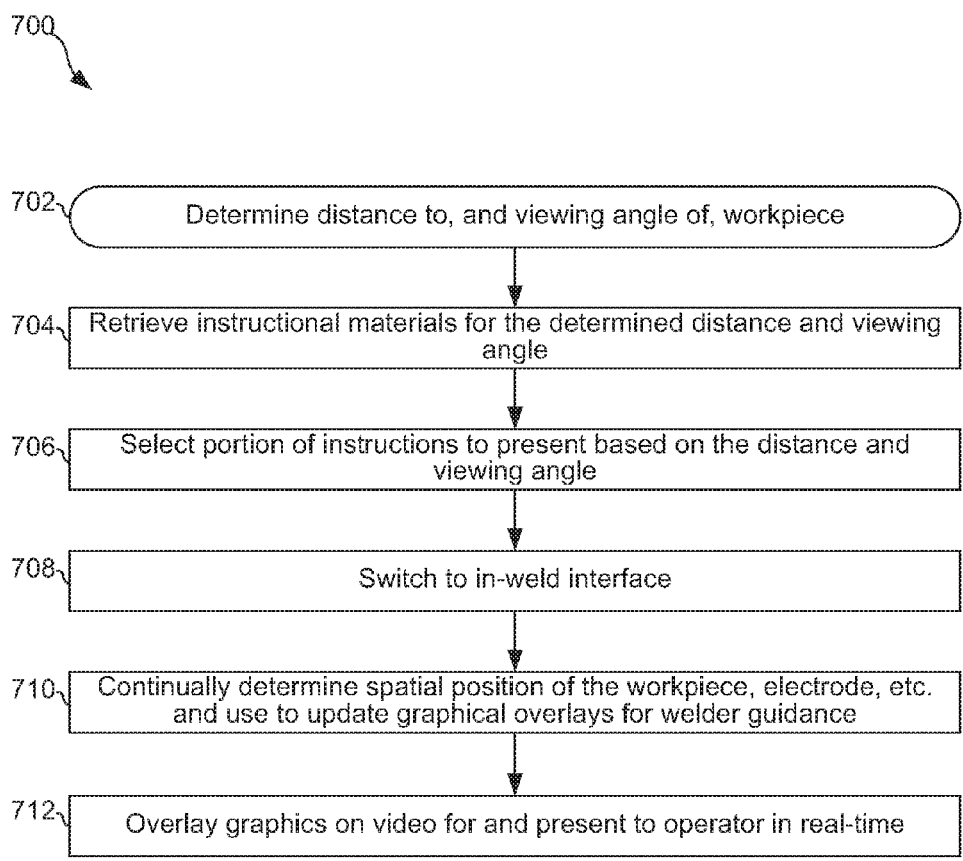
FIG. 7A is a flowchart illustrating an example welding process using headwear embodying aspects of this disclosure.
Figure 7C:
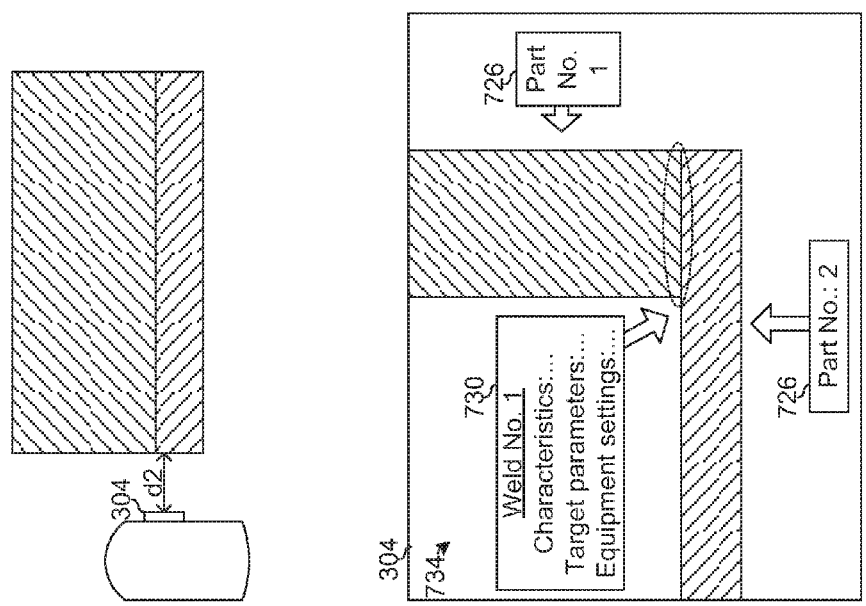

FIGS. 7A-7C illustrate an example welding process 700 using headwear embodying aspects of this disclosure.

The process begins at block 702 in which a distance and viewing angle between the headwear 20 and a workpiece is determined. The distance may, for example, be determined based using an ultrasonic or infrared sensor integrated into the headwear 20. Alternatively, the distance may be determined through image processing algorithms performed by GPU 418. In such an embodiment, the captured images of the workpiece may be analyzed to detect characteristics (size, position, etc.) of distinguishing features of the workpiece as they appear in the images. The characteristics may then be used in combination with stored data about the workpiece (e.g., actual dimensions of the features of the workpiece) to determine the viewing distance and angle. For example, the size of the visible markings on the workpiece, the fact that some markings on the workpiece are visible while others are not, the known actual size of the markings, and the known positioning of the markings on the workpiece may be used to determine viewing distance and angle.

In block 704, instructions for welding the workpiece are retrieved from memory (e.g., from a networked database that the headwear 20 reaches via a LAN or the Internet).

In block 706, a portion of the instructions are selected for presentation on the display 304 based on the determined distance to and/or viewing angle of the workpiece. When the workpiece is viewed from relatively far, the selected portion of the instructions may comprise high-level pictures and instructions that orient the operator to the overall work to assist the operator in planning a sequence of welds to be performed on the workpiece. For example, referring briefly to FIG. 7B, when the workpiece is viewed at a relatively far distance d1, instruction portion 724 is selected for presentation. Instruction portion 724 is a zoomed-out view of the workpiece comprising graphics 726 which identify part numbers for the workpiece, and two welds to be performed on the workpiece, and the sequence in which the welds are to be performed. Conversely, when the workpiece is viewed from relatively close, the selected portion of the instructions may comprise low-level pictures and instructions to guide the operator for performing a specific weld. For example, referring to FIG. 7C, when the workpiece is viewed at a close distance d2, instruction portion 734 is selected for presentation. Instruction portion 734 is a zoomed-out view comprising a portion of the graphics 726 which are still pertinent to the zoomed-in view, and graphic 730 which provides more in-depth information for welding the seam at which that the operator is looking. Although two distances and corresponding instruction portions are described, any number of instruction portions corresponding to different view distances and/or angles may be available. Similarly, switching between different instruction portions need not be based entirely, or even at all, on measured distances. Rather, the operator may select (e.g., via voice and/or tactile input, for example) which instruction portions s/he desires to view at any given time. Furthermore, multiple instruction portions may be viewed simultaneously (e.g., in a side-by-side or picture-in-picture type view). For example, instruction portion 724 may be presented in the corner of the display while instruction portion 734 is presented on the remainder of the display.

Returning to FIG. 7A, in block 708 the wearer of the headwear 20 triggers (e.g., by activating graphic 604) a transition to an in-weld interface, such as the interface of FIG. 6C. In block 710, during welding, the headwear 20 determines the spatial position of the seam being welded, the welding torch, the electrode, and/or other objects in the field of view of camera(s) 302. The headwear 20 uses this determined spatial position information to update one or more graphical overlays in real time. The spatial position information may, for example, be determined using image processing algorithms that determine 3-D position based on pixel data of stereoscopic images captured by the camera(s) 302. The spatial position information may, for example, be used for rendering a graphic, such as 630, that overlays a real-time video of the workpiece such that the graphic is maintained in proper alignment with the workpiece (i.e., to track and compensate for the changing position of the welder's head as s/he performs the weld).

Figure 8B:
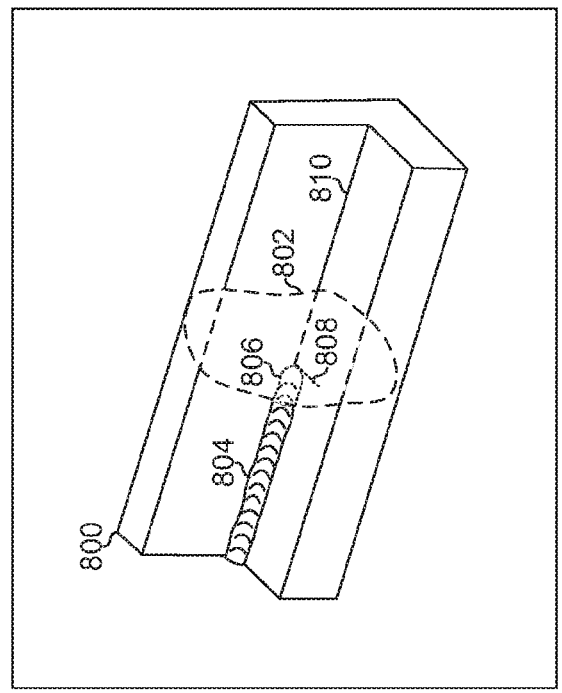
FIGS. 8A and 8B illustrate the use of a 3-D rendering generated by welding headwear for enhancing an operator's view of a workpiece to be welded.
Figure 8A:
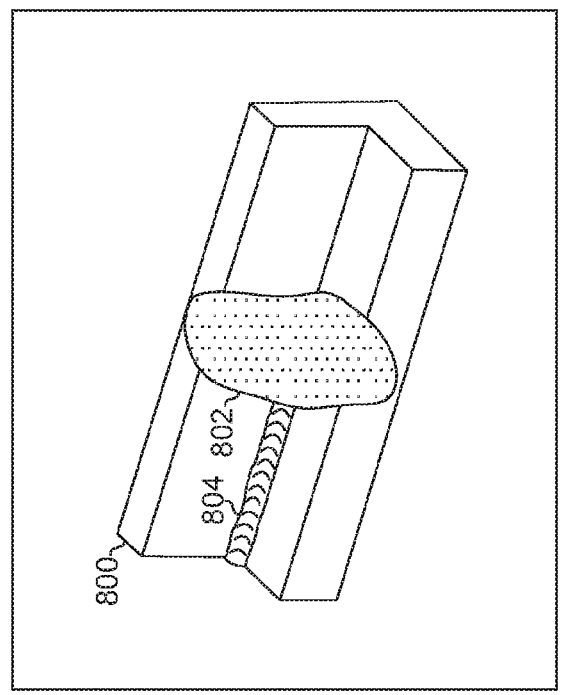

FIGS. 8A and 8B illustrate the use of a 3-D rendering generated by welding headwear for enhancing an operator's view of a workpiece to be welded. In FIG. 8A, a portion of a workpiece 800 to be welded is blocked by obstruction 802. Obstruction 802 may be, for example, the welding torch and/or hand of the operator performing the weld. In FIG. 8B, the 3-D rendering is used to digitally erase the obstruction 802 such that the wearer of the headwear 20 can "see through" the obstruction 802. For example, a virtual extension of the weld bead 804, a virtual electrode 808, and virtual extension of the seam 810 are presented in place of the obstruction 802. The rendering may be based on: current position of the workpiece (determined from most-recent images captured by the camera(s) 302), known information about the workpiece (e.g., from previously captured images when the obstruction 802 was not blocking the view of the workpiece), and chroma keying (e.g., the torch and welders gloves may be painted green or some other color).

Figure 9A:
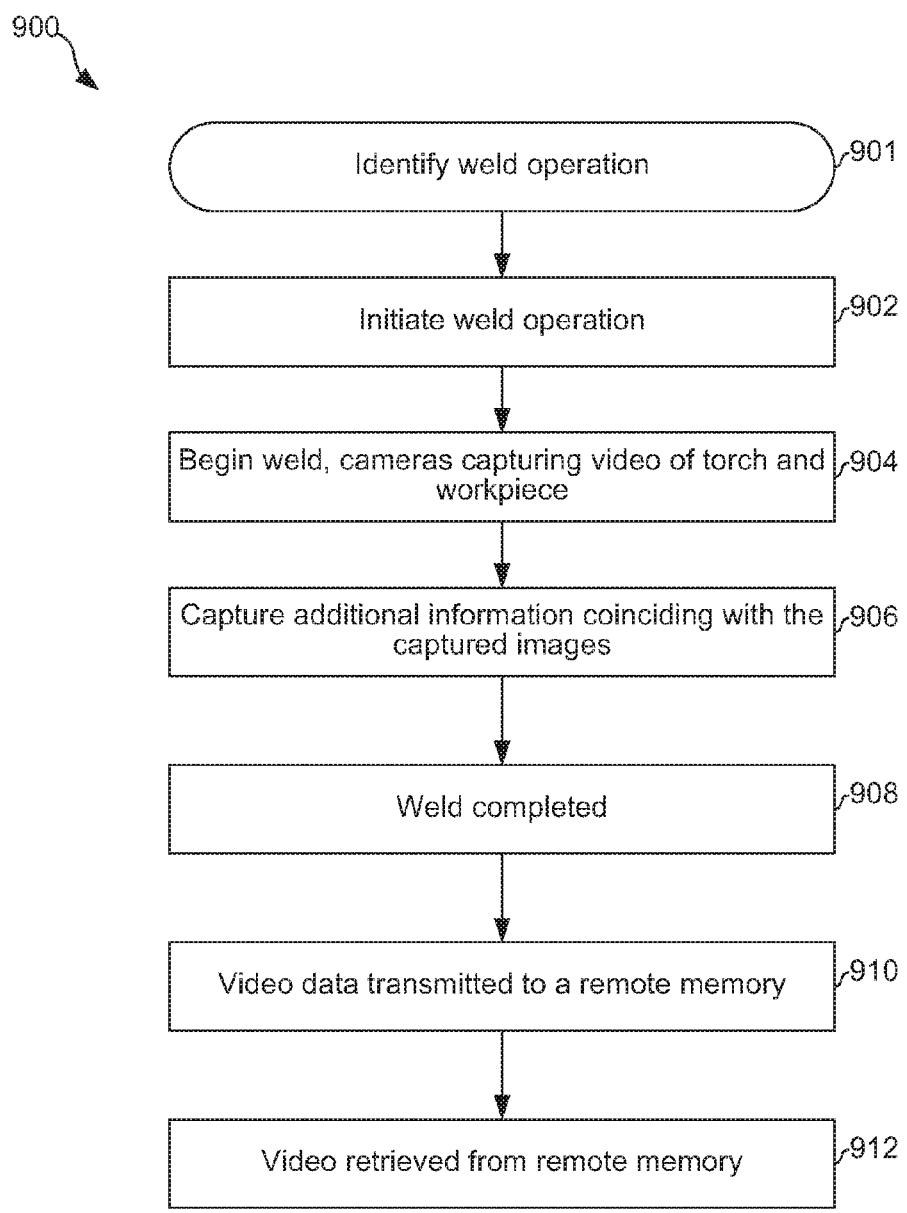
FIG. 9A is a flowchart illustrating an example welding process to identify a weld operation embodying aspects of this disclosure.

Referring to FIG. 9A, a flowchart illustrates an example process 900 for welding a workpiece 24 while causing remote storage of image data based on such welding.

The process begins with block 901, in which one or more welds to be performed are determined by the headwear 20. The determination may be based on an identifier (e.g., a work order number, a part number, etc.) entered by the welder 18 through, for example, voice recognition and/or tactile input. Alternatively, or additionally, the welder 18 may view the workpiece to be welded from a distance and/or angle that permit the camera(s) 302 to capture an image of the workpiece from which an image processing algorithm can detect welds to be performed. For example, unique shapes, markings, and/or other features of a workpiece in the captured image view may be detected and used to retrieve an identifier associated with the workpiece.

In block 902, welder 18 initiates a welding operation. For example, welder 18 may give a voice command for welding system 10 to enter a weld mode, which voice command is responded to by user interface of headwear 20. The processor 410 configures the components of headwear 20 according to the voice command in order to display, on display 304, the live welding operation for viewing by the welder. The welder views the weld on display 304 and controls operation and positioning of electrode 16. The processor 410 may respond to the voice command and send a signal to equipment 12 to trigger the weld mode in equipment 12. For example, the processor 410 disables a lock out so that power is delivered to electrode 16 via power supply 212 when a trigger on the torch is pulled by the welder. Wire feeder 214 and gas supply 216 may also be activated accordingly. Block 902 thus represents the step of the welder placing the welding system in a weld mode so that the workpiece may be welded. Equipment 12 is configured by the welder 18 using a user interface of the headwear 20 based on the determined characteristics of the weld to be performed. For example, a constant current or constant voltage mode may be selected, a nominal voltage and/or nominal current may be set, a voltage limit and/or current limit may be set, and/or the like. Camera(s) 414 may be configured via a user interface of the headwear 20. For example, expected brightness of the arc may be predicted (based on the equipment configuration and the characteristics of the weld to be made). The electric signals from user interface 308 may configure the darkness of a lens filter, an exposure time of the camera(s) 414, and/or the like.

In block 904, the operator begins welding. Workpiece 24 is placed into position, together with the electrode, relative to the field of view of optics 302a, 302b. The trigger is activated by the welder, and a multimedia file is created/opened in memory and images of the weld operation begin to be captured by the camera(s) 414 and stored to the multimedia file. The images may be stored as raw unprocessed pixel data coming from camera(s) 414. Alternatively (or additionally), the images may be compressed and stored as processed pixel data from GPU 418. In an example implementation, these events may be sequenced such that image capture starts first and allows a few frames during which the cameras 414 and/or display 304 are calibrated (adjusting focus, brightness, contrast, saturation, sharpness, etc.) before current begins flowing to the electrode, this may ensure sufficient image quality even at the very beginning of the welding operation. The multimedia file may be stored in memory 411 of headwear 20. Alternatively (or additionally), the processor 410 may transmit the images (unprocessed or processed) to the communication interface 406 for transmission to a remote memory such as memory in equipment 12 and/or memory in server 30.

Still in block 904, in addition to storing the captured images, the images may be displayed in real-time on the display 304 and/or on one or more remote displays to which the captured images are transmitted in real-time via link(s) 25, 27, and/or 29. In an example implementation, different amounts of image processing may be performed on one video stream output to the display 304 and another video stream output via communication interface 406. In this regard, higher latency may be tolerable to the remote viewer such that additional processing may be performed on the images prior to presentation on the remote display.

In block 906, as the welding operation proceeds, the captured image data is processed and may be used to determine, in real-time (e.g., with latency less than 100 ms or, more preferably, less than 5 ms), present welding parameters such as those described above with reference to FIGS. 5A-5C. The determined welding parameters may be stored to memory along with the processed and/or unprocessed image data. For example, graphical representations of the welding parameters may be synchronized with the captured images and converted to text/graphics which are overlaid on the captured images prior to storing the images. Alternatively (or additionally), the determined welding parameters may be stored as metadata along with the captured image data.

Still referring to block 906, as the welding operation proceeds, settings and/or measured output of the equipment 12 may be received via link 25. The processor 410 may adjust the settings based on the parameters determined. In this manner, equipment settings such as voltage, current, wire speed, and/or others may be adjusted in an attempt to compensate for deviations of the parameters from their ideal values. The equipment settings and/or measured output may be stored along with the captured image data. For example, the settings and/or measured output may be synchronized with the captured images and converted to text/graphics which are overlaid on the image data by GPU 418 prior to storing the image data and/or the identifier may be stored in metadata of the multimedia file in which the image data is stored.

Still referring to block 906, as the welding operation proceeds, other information may be captured (by the camera(s) 414 and/or other sensors 422) and stored along with the captured images. This other data may then be synchronized to the captured images and stored with the captured images (e.g., as metadata and/or converted to text/graphics and overlaid on the images). Such data may include, for example, an overall identifier of the weld operation determined in block 901, individual part numbers of the parts being welded (e.g., barcoded such that they can be automatically detected from the captured images), timestamps, climate (temperature, humidity, etc.), and/or the like. The multimedia file containing the may be indexed by any of this information for later searching and retrieval.

In block 908, the first weld operation on workpiece 24 is completed. In block 908 the multimedia file to which the images and other data were written during blocks 904 and 906 may be closed (e.g., file headers added, checksums calculated, etc.). In some instances, the file may be transferred for long term storage (e.g., from memory 411 of the headwear 20 to a database residing in memory of server 30).

Where the captured image data is stored as raw unprocessed pixel data, such raw unprocessed pixel data may be processed externally of headwear 20. In block 910, the processor 410 transmits the pixel data to, for example, a memory at server 30 via antenna 402 or port 404. A processor at server 30 processes the raw unprocessed data and stores the processed data in memory at server 30. There may be more compute power at the server 30 and greater latency may be tolerated as compared to processing in headwear 20 prior to presentation on display 304. If there is too much latency inside the helmet, the welder may become disoriented. Similarly, pixel data already processed in headwear 20 under latency constraints (e.g., to condition it for real-time presentation on the display 304) may be further processed by the headwear 20 and/or by an external processor (such as in server 30). Such additional processing may enable determining additional and/or more-detailed information about the weld that there wasn't time and/or compute power to determine prior to real-time presentation of the captured images.

In block 912, the images captured during block 904 are transmitted from the memory of server 30 to a second remote location such as a cloud server. For example, the images on the cloud may be retrieved (e.g., using a web-based application accessed through a browser or other web client or a non-web app) by an instructor or supervisor to review the work of a student or employee. As another example, the images may be reviewed by a quality control auditor as part of random quality inspections and/or as part of an investigation into a failed weld (e.g., if the welded part later fails in the quality assurance (QA) department of a fabricator or in the field, the captured images and the information stored along with the images may be viewed to see if the weld process was the likely cause of the failure).

In another example implementation, the headwear 20 may comprise a see-through or transparent optical display mounted behind the conventional auto-darkening lens, operable to perform wavelength selective switching (WSS) to prevent peak arc spectral wavelengths to reach wearer's eyes. The WSS may be controlled based on output of a photodiode sensor which detects presence or absence of the welding arc similar to the sensor used by an auto-darkening lens. When the welding arc is present, the WSS is configured such that the display enables notch filters with wavelengths corresponding to the peaks in the power spectral density of the welding arc. When the welding arc is absent, the WSS is configured such that the display passes all (or most) of the visible spectrum (i.e., the display is substantially transparent when the welding arc is not present). The display may comprise, for example one or more Liquid Crystal on Silicon (LCoS) displays. In an example implementation, the WSS display notch filter wavelengths may be determined based on characteristics of the weld being performed (e.g., depending on welding shielding gas composition, welding materials, etc., which may affect the wavelengths emitted by the arc) so that the WSS display wavelengths are programmed to reject the peaks in the arc spectrum of specific known gas or parent material being used in welding.

Figure 9B:
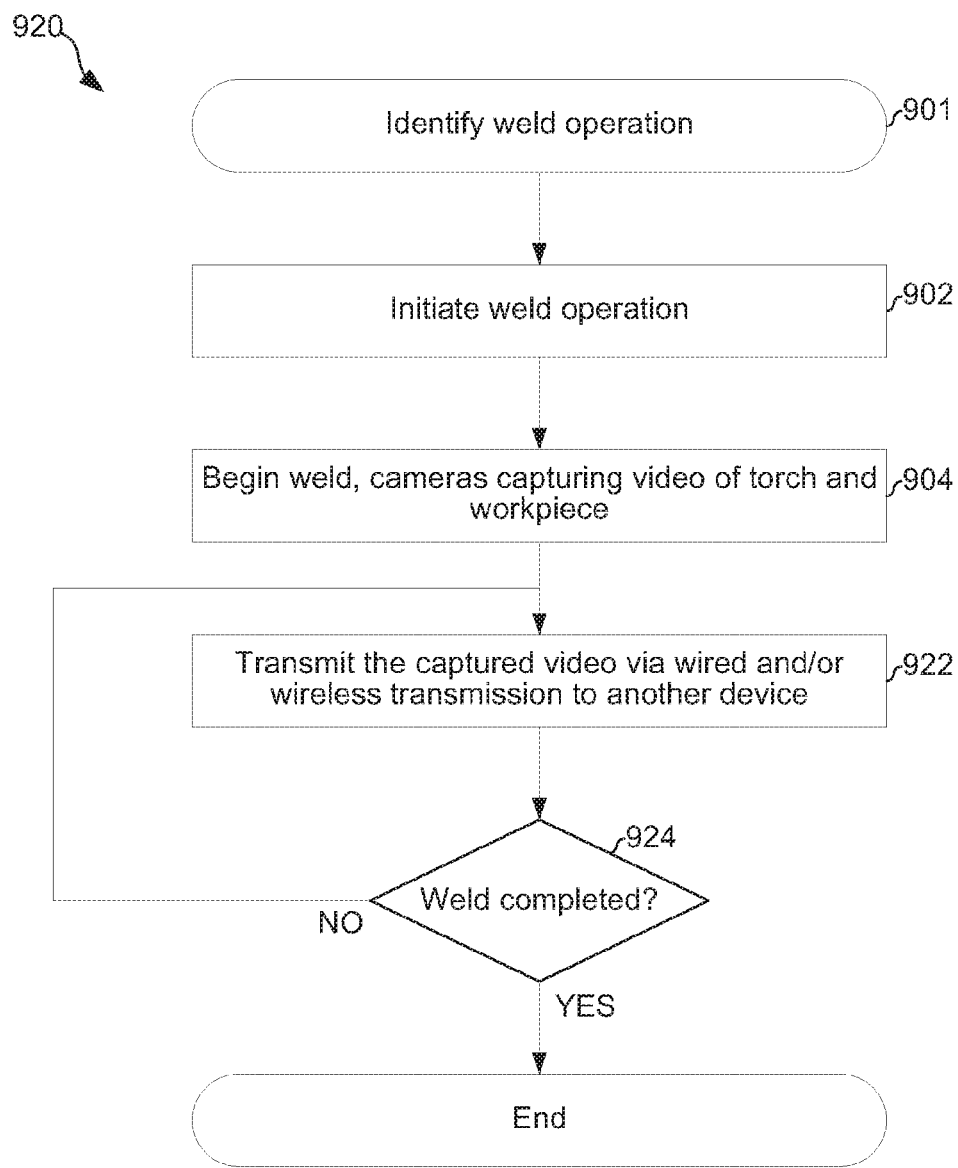
FIG. 9B is a flowchart illustrating an example welding process to transmit images during a weld operation.

FIG. 9B is a flowchart illustrating an example welding process 920 to transmit images during a weld operation. The example process 920 may be performed to capture images (e.g., video) of an ongoing weld operation and transmit the images to an observation computer for others to view and/or for storage of the images. Blocks 901, 902, and 904 are implemented as described above with reference to FIG. 9A.

In block 922, the processor 410 transmits the captured video via the communications interface 406 (e.g., via wired and/or wireless communications) to another device. For example, the processor 410 may transmit the video to the server 30 of FIG. 1, which may include a display for viewing by an instructor or supervisor of the weld operator.

In block 924, the processor 410 determines whether the weld is completed. If the weld is not completed (block 924). For example, the processor 410 may receive a trigger release signal from the weld equipment 12 via the communications interface 406 and/or detect a reduction in brightness via the camera(s) 414. If the end of the weld is not detected (block 924), control returns to block 922 to continue transmitting the captured video. When the end of the weld is detected (block 924), the example instructions 900 end.

Figure 10:
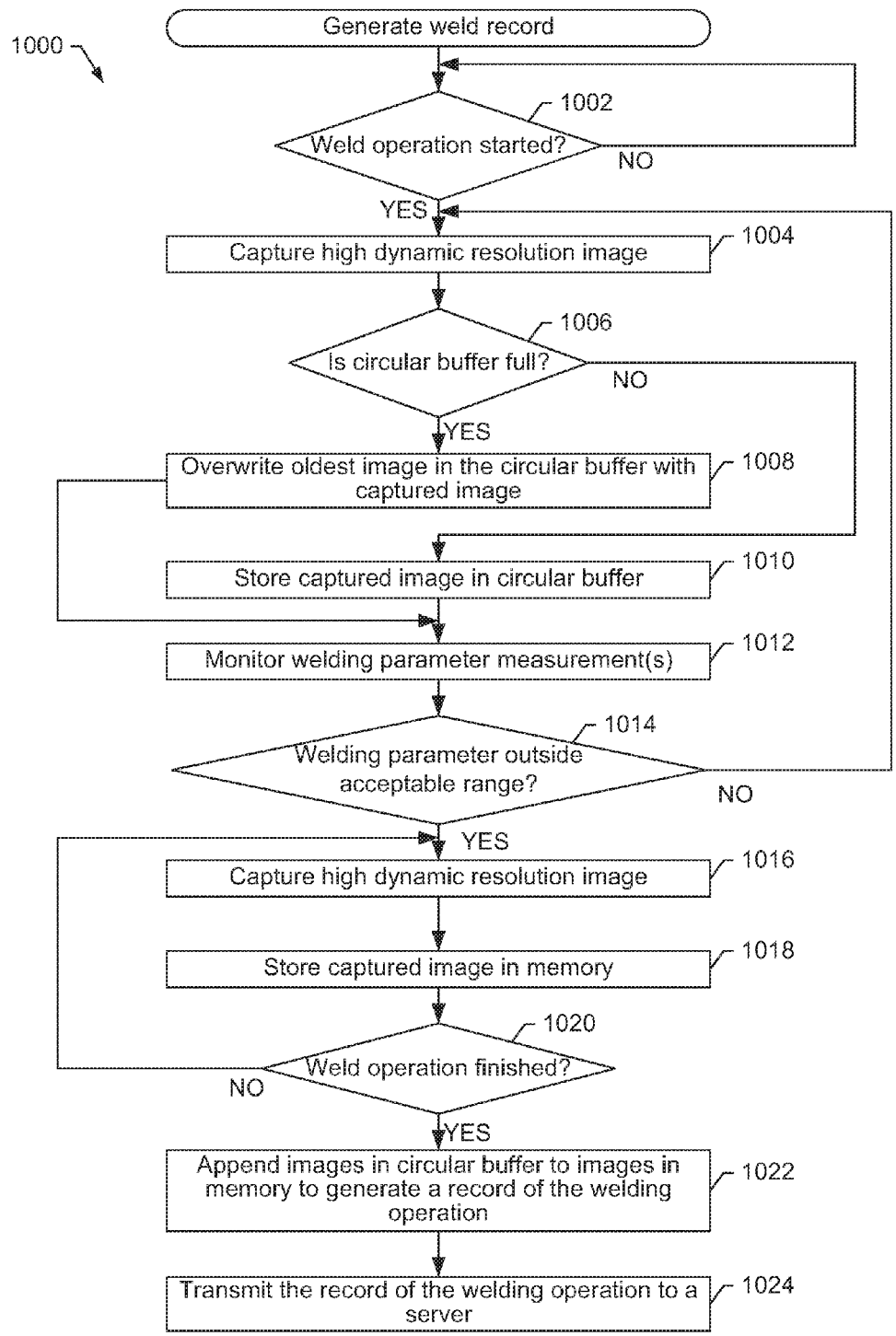
FIG. 10 is a flowchart illustrating example machine readable instructions which may be executed by a processor to generate a weld record for a welding process embodying aspects of this disclosure.

FIG. 10 is a flowchart illustrating example machine readable instructions 1000 which may be executed by a processor to generate a weld record for a welding process. The example instructions 1000 may be executed by the example headwear 20 of FIGS. 3 and/or 4, by a mobile device and/or other computing device (e.g., a smartphone mounted to a welding helmet or other personal protective equipment). The example instructions 1000 will be described with reference to the example headwear 20 of FIG. 4 (e.g., the example processor 410 executing the instructions 428 stored in the memory 426).

At block 1002, the processor 410 determines whether a weld operation has started. For example, the processor 410 may identify a weld operation based on a signal from the sensor(s) 422, one or more image(s) from the optical sensor 414, and/or via a signal received via the communications interface 406 (e.g., a synchronization signal from a welding power source and/or from a server). If the weld operation has not started (block 1002), the processor 410 iterates block 1002 to monitor for the start of a weld operation.

At block 1004, the example optical sensor 414 captures a HDR image. For example, the optical sensor 414 may record high dynamic range image(s), record high dynamic range video, record wide dynamic resolution image(s), record wide dynamic resolution video, recording time-of-flight image(s), recording structured-light three-dimensional image(s), and/or recording images at a frame rate of 500-10,000 frames per second or higher.

At block 1006, the processor 410 determines whether a circular buffer is full. For example, the circular buffer may be a designated portion of the memory 426 and/or a separate buffer or storage device.

If the circular buffer is full (block 1006), the example processor 410 overwrites an oldest image stored in the circular buffer with the captured image (block 1008). For example, the processor 410 and the circular buffer may store buffered images in a first-in-first-out sequence to retain the most recent images.

If the circular buffer is not full (block 1006), the processor 410 stores the captured image in the circular buffer (block 1010).

After storing the captured image in the circular buffer (block 1008 or block 1010), at block 1012 the example processor 410 monitors welding parameter measurement(s). For example, the processor 410 may receive one or more welding parameters from a power source being used in the welding operation via the communications interface 406, and compare the welding parameter(s) to corresponding range(s) of values.

At block 1014, the processor 410 determines whether any of the welding parameter(s) are outside of a corresponding acceptable range (block 1014). For example, the processor 410 may determine if a current or voltage have exceeded a range designated for the welding operation. If none of the welding parameter(s) are outside of the corresponding range (block 1014), the processor 410 returns control to block 1004.

If any of the welding parameter(s) are outside of the corresponding range (block 1014), the example optical sensor 414 captures a HDR image (block 1016). Block 1016 may be implemented in the same manner as block 1004.

At block 1018, the example processor 410 stores the captured image(s) in the memory 426. In block 1018, the processor 410 does not store the captured image(s) in the circular buffer, and instead stores the captured image(s) in a different portion of the memory 426 while leaving the circular buffer intact.

At block 1020, the processor 410 determines whether the welding operation is finished (block 1020). For example, the processor 410 may determine whether the weld operation is finished based on a signal from the sensor(s) 422, one or more image(s) from the optical sensor 414, and/or via a signal received via the communications interface 406 (e.g., from the welding power source and/or the server). If the welding operation is not finished (block 1020), the processor 410 returns control to block 1016 to continue capturing images.

When the welding operation is not finished (block 1020), at block 1022 the processor 410 appends the images in the circular buffer to the images in the memory to generate a record of the welding operation (e.g., a video of the weld from the operator's approximate point of view, or from another vantage point from which the welding operation can be adequately observed). In some examples, the processor 410 also appends welding parameter measurements that have been received to the record. The example processor 410 includes time stamps of the images and/or the parameter measurements to enable any deviations in the welding parameters to be correlated to the images taken at approximately the same time.

At block 1024, the example processor 410 transmits the record of the welding operation to a server. For example, the processor 410 may automatically transmit the record, transmit the record in response to a request, and/or transmit the record when one or more criteria are met (e.g., sufficient battery power to complete transmission, sufficient wireless network connectivity and/or speed, etc.).

The example instructions 1000 of FIG. 10 generate a record that enables a review of a welding operation for training, production control, maintenance, and/or for any other purpose. While the example instructions 1000 trigger the generation of a record in response to identifying welding parameters that fall outside of an acceptable range, in some other examples the instructions 1000 automatically generate the record of the weld based on another trigger, and/or without any trigger (e.g., to record high quality welds for training and/or to record all welds).

In some examples, the weld record further includes audio collected during the weld by one or more microphones. The audio information may be replayed and/or analyzed for audio signatures corresponding to different weld qualities and/or defects. Example methods and systems that may be used to collect and/or analyze welding audio are described in U.S. Pat. No. 5,306,893, issued Apr. 26, 1994. The entirety of U.S. Pat. No. 5,306,893 is incorporated herein by reference.

Figure 11:
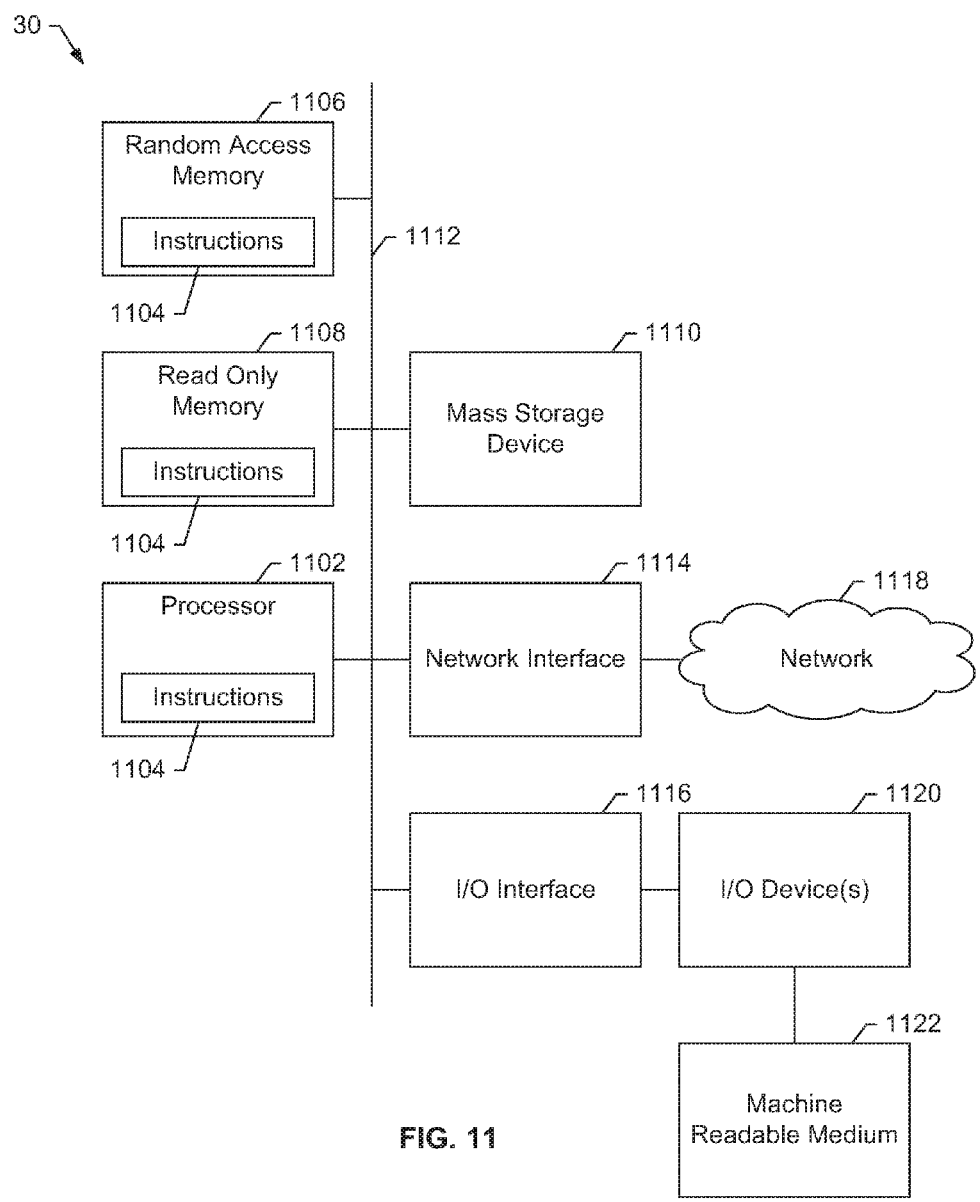
FIG. 11 is a block diagram of an example implementation of the server of FIG. 1.

FIG. 11 is a block diagram of an example implementation of the server 30 of FIG. 1. The example server 30 of FIG. 11 may be a general-purpose computer, a laptop computer, a tablet computer, a mobile device, a server, and/or any other type of computing device. In some examples, the server 30 may be implemented in a cloud computing environment using one or more physical machines and, in some examples, one or more virtual machines in the data center.

The example server 30 of FIG. 11 includes a processor 1102. The example processor 1102 may be any general purpose central processing unit (CPU) from any manufacturer. In some other examples, the processor 1102 may include one or more specialized processing units, such as graphic processing units and/or digital signal processors. The processor 1102 executes machine readable instructions 1104 that may be stored locally at the processor (e.g., in an included cache), in a random access memory 1106 (or other volatile memory), in a read only memory 1108 (or other non-volatile memory such as FLASH memory), and/or in a mass storage device 1110. The example mass storage device 1110 may be a hard drive, a solid state storage drive, a hybrid drive, a RAID array, and/or any other mass data storage device.

A bus 1112 enables communications between the processor 1102, the RAM 1106, the ROM 1108, the mass storage device 1110, a network interface 1114, and/or an input/output interface 1116.

The example network interface 1114 includes hardware, firmware, and/or software to connect the server 30 to a communications network 1118 such as the Internet. For example, the network interface 1114 may include IEEE 802.X-compliant wireless and/or wired communications hardware for transmitting and/or receiving communications.

The example I/O interface 1116 of FIG. 11 includes hardware, firmware, and/or software to connect one or more input/output devices 1120 to the processor 1102 for providing input to the processor 1102 and/or providing output from the processor 1102. For example, the I/O interface 1116 may include a graphics processing unit for interfacing with a display device, a universal serial bus port for interfacing with one or more USB-compliant devices, a FireWire, a field bus, and/or any other type of interface. Example I/O device(s) 1120 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example server 30 may access a non-transitory machine readable medium 1122 via the I/O interface 1116 and/or the I/O device(s) 1120. Examples of the machine readable medium 1122 of FIG. 11 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Figure 12:
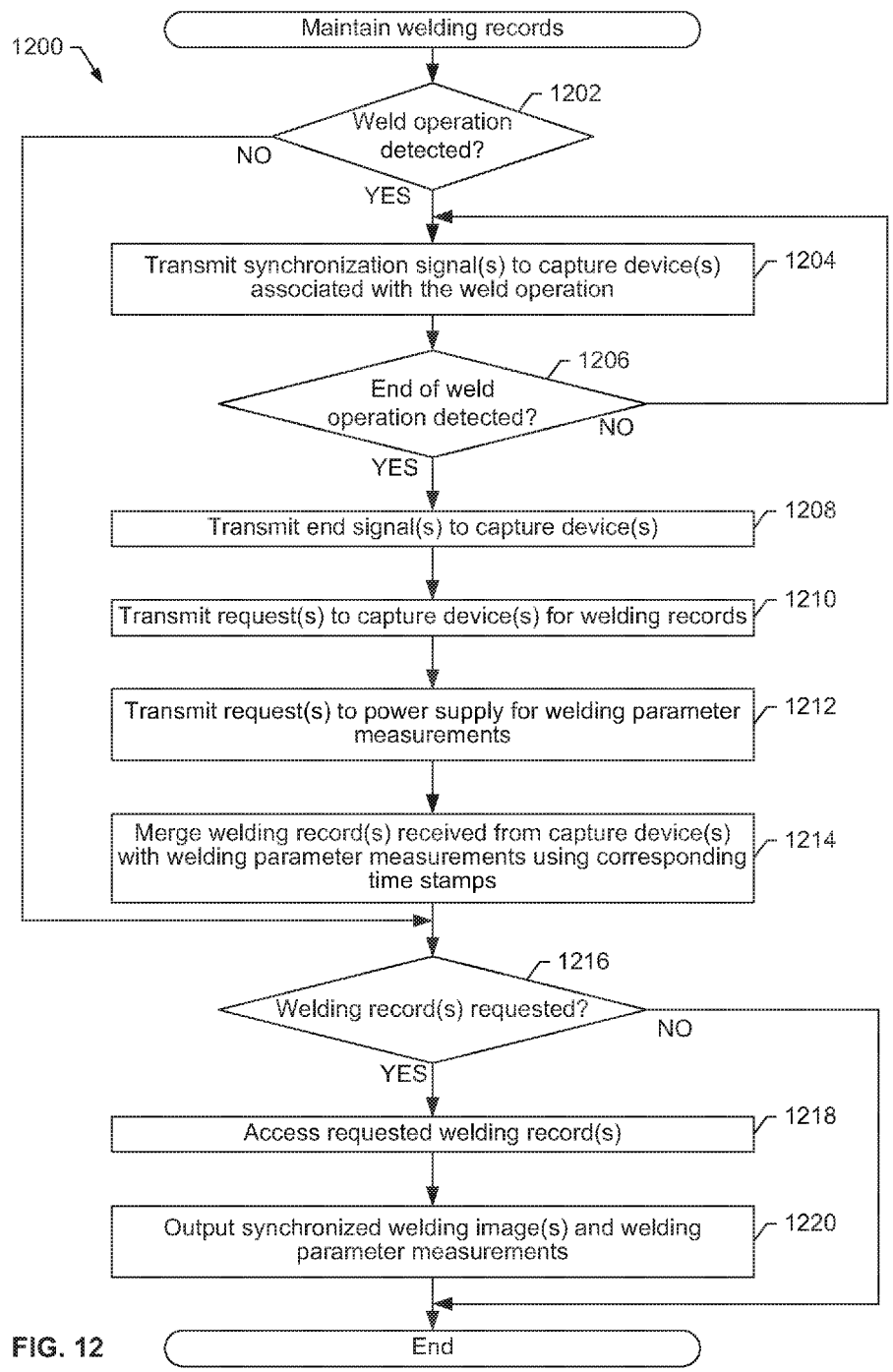
FIG. 12 is a flowchart illustrating example machine readable instructions 1200 which may be executed by a processor to implement the server of FIGS. 1 and/or 11 to store and/or display welding records of welding operations.

FIG. 12 is a flowchart illustrating example machine readable instructions 1200 which may be executed by a processor to implement the server 30 of FIGS. 1 and/or 11 to store and/or display welding records of welding operations. The example instructions 1200 may be stored on the any of the non-transitory machine readable media described in FIG. 11, and/or executed by the processor 1102 of FIG. 11.

In block 1202, the example processor 1102 determines whether a weld operation has been detected. For example, the processor 1102 may be in communication with the equipment 12 (e.g., a welding power supply) of FIG. 1, from which the processor 1102 receives statuses of welding operations performed using the equipment 12.

If a weld operation has been detected (block 1202), in block 1204 the processor 1102 transmits synchronization signal(s) to capture device(s) associated with the welding operation. For example, the processor 1102 may be in communication with the headwear 20 and/or the camera 32 of FIG. 1.

In block 1206, the example processor 1102 determines whether an end of the weld operation has been detected. For example, the processor 1102 may receive an end signal from the equipment 12 indicating that the equipment 12 has ended a welding operation (e.g., in response to release of the gun trigger by the operator). If an end of the weld operation has not been detected (block 1206), the processor 1102 returns control to block 1204.

When the end of the weld operation has not been detected (block 1206), the processor 1102 transmits an end signal to the capture device(s) (e.g., the headwear 20, the camera 32) (block 1208). In some examples, the processor 1102 may further alert or remind an operator, via the display, to look at the completed weld as a visual inspection.

In block 1210, the example processor 1102 transmits requests to the capture device(s) for welding records. In response, the example capture device(s) may generate the welding records as described above with reference to FIG. 10.

In block 1212, the example processor 1102 transmits requests to the power supply for welding parameter measurements. In response, the example equipment 12 may collect a set of measurements (e.g., voltage measurements, current measurements, process selection, etc.) generated during the welding operation. In some examples, the equipment 12 sends the parameter measurements during the welding operation, and the processor 1102 may access the previously-received measurements in lieu of block 1212.

In block 1214, the processor 1102 merges the welding record(s) received from the capture device(s) with the welding parameter measurements using corresponding time stamps of the image(s) in the welding records and the welding parameter measurements. Thus, the merged welding records and parameter measurements can synchronize captured images with welding parameter measurements that occurred at the same or approximately the same times as the images.

After merging the record(s) (block 1214), or if a weld operation was not detected (block 1202), in block 1216 the processor 1102 determines whether any welding record(s) have been requested. For example, a QA manager, a welder trainer, or a shop supervisor, a service technician may wish to review the images and/or parameter measurements captured for a particular welding operation.

If a welding record has been requested (block 1216), the processor 1102 accesses the requested welding record(s) (block 1218). For example, the processor 1102 may access the welding record(s) from a local or remote storage device. The processor 1102 outputs the synchronized welding image(s) and welding parameter measurements (block 1220). For example, the processor 1102 may generate a web-based interface (e.g., an HTML5 interface, etc.) for display on a display device and/or interactive viewing by a viewer. In some examples, the processor 1102 transmits the interface to another device (e.g., a tablet computer, a computer terminal, etc.) for viewing and/or interaction.

After outputting the synchronized welding image(s) and welding parameter measurements (block 1220), and/or if no welding records were requested (block 1216), the example instructions 1200 may end.

Figure 13:
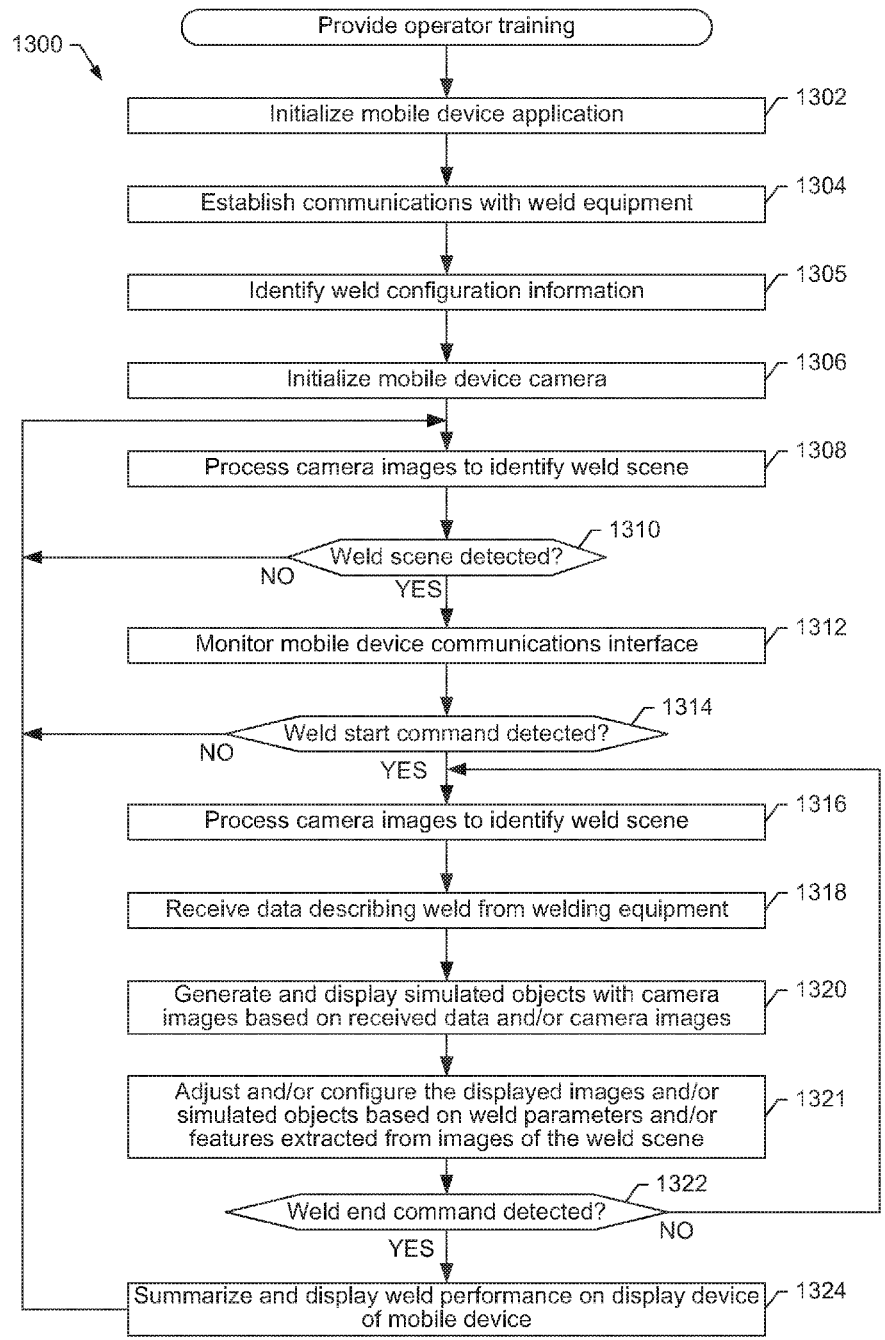
FIG. 13 is a flowchart illustrating example computer readable instructions which may be executed to implement the example headwear of FIGS. 3A-4B to provide weld operator training.

FIG. 13 is a flowchart illustrating example computer readable instructions which may be executed to implement the example headwear 20 of FIGS. 3A-4B to provide weld operator training. In the example instructions 13, the headwear 20 is implemented using a mobile device such as a smartphone that can be mounted to a helmet or other head-worn device such that the display of the mobile device is facing the weld operator and a camera of the mobile device is facing in same direction as the weld operator.

At block 1302, the processor 410 initializes a mobile device application (e.g., an app), which may be stored as the instructions 428 in the memory 426.

At block 1304, when the mobile device app is initialized, the processor 410 establishes communications with weld equipment, such as a power supply. For example, the processor 410 may use the communications interface 406 and one or more wired or wireless protocols such as Zigbee, Bluetooth, or WiFi, MiFi, cellular, satellite network to communicate with a power supply that is to be used for the training.

At block 1305, the processor 410 receives weld configuration information. The example weld configuration information may include, for example, a description of the welding equipment being used. The processor 410 may receive the weld configuration information via the communications interface 406 and/or via a user input. At block 1306, the processor 410 initializes a camera 414 of the mobile device.

At block 1308, the image processor 416 and/or the processor 410 process camera images with image processing techniques to identify a weld scene. As an example, the image processor 416 may identify localization markers within the images captured by the camera 414 to identify a weld scene. At block 1310, the processor 410 determines whether the weld scene is detected. If the weld scene is not detected (block 1310), control returns to block 1308 to continue processing the camera images.

When the weld scene is detected (block 1310), at block 1312 the processor 410 monitors the communications interface 406. For example, the processor 410 may wait for a trigger signal from the power supply or wire feeder indicating that the weld operator has pulled the trigger. At block 1314, the processor 410 determines if a weld start command has been detected, such as by receiving a trigger signal, a voice command or other user input, and/or identifying an electrical arc from captured images. In some examples, such as training using actual welding, the processor 410 may also monitor for an indication from the image processor 416 whether an arc start has been detected (e.g., via recognizing a high-brightness image). If a weld start is not detected (block 1314), control returns to block 1308.

When a weld start is detected (block 1314), at block 1316 the image processor 416 processes camera images to identify a weld scene. For example, the image processor 416 may identify weld objects such as a weld pool, an electrode, an arc, and/or a weld gun in the images captured by the camera 414.

At block 1318, the processor 410 receives weld parameters from the welding equipment (e.g., via the communications interface 406). Example weld parameters may include a voltage setpoint, a current setpoint, a weld process (e.g., MIG, TIG, spray transfer, controlled short circuit, etc.), and/or a wire feed speed.

At block 1320, the GPU 418 generates and displays simulated objects with (e.g., overlaid on) the camera images on the display 304 of the mobile device to display the weld scene to the operator. The simulated objects may include a simulated arc, a simulated weld puddle, graphics illustrating the received weld data, and/or any other training information. In the example, the display 304 acts as the operator's vision of the weld scene.

At block 1321, the example processor 410 adjusts or configures the display of the simulation (e.g., the displayed images of the weld scene and/or the simulated objects) based on the weld parameters and/or features extracted from images of the weld scene. For example, extracted features such as contact-tip-to-work distance indicate how an operator performs, and may be extracted from the images by identifying the electrode and/or the weld torch, identifying the workpiece, calibrating distance measurements using a distance reference, and measuring the distance using the calibrated distances. For example, the processor 410 may determine how the simulated weld would act based on a model (e.g., a thermodynamic model, a neural network model, etc.), using the wire feed speed and/or a gun travel speed to determine a puddle size and a weld voltage to determine an arc length. The processor 410 determines how the weld would act in a real welding situation and displays a corresponding image of the weld to the user.

At block 1322, the processor 410 determine whether the weld end command is detected. For example, the processor 410 may receive a trigger release signal from the weld equipment via the communications interface 406. If the end of the weld is not detected (block 1322), control returns to block 1316.

When the end of the weld is detected (block 1322), at block 1324 the processor 410 summarizes and displays the weld performance for the training weld in a post-weld summary interface on the display 304. When the weld operator clears the display (e.g., via a voice command or other input), control returns block 1308.

Figure 14:
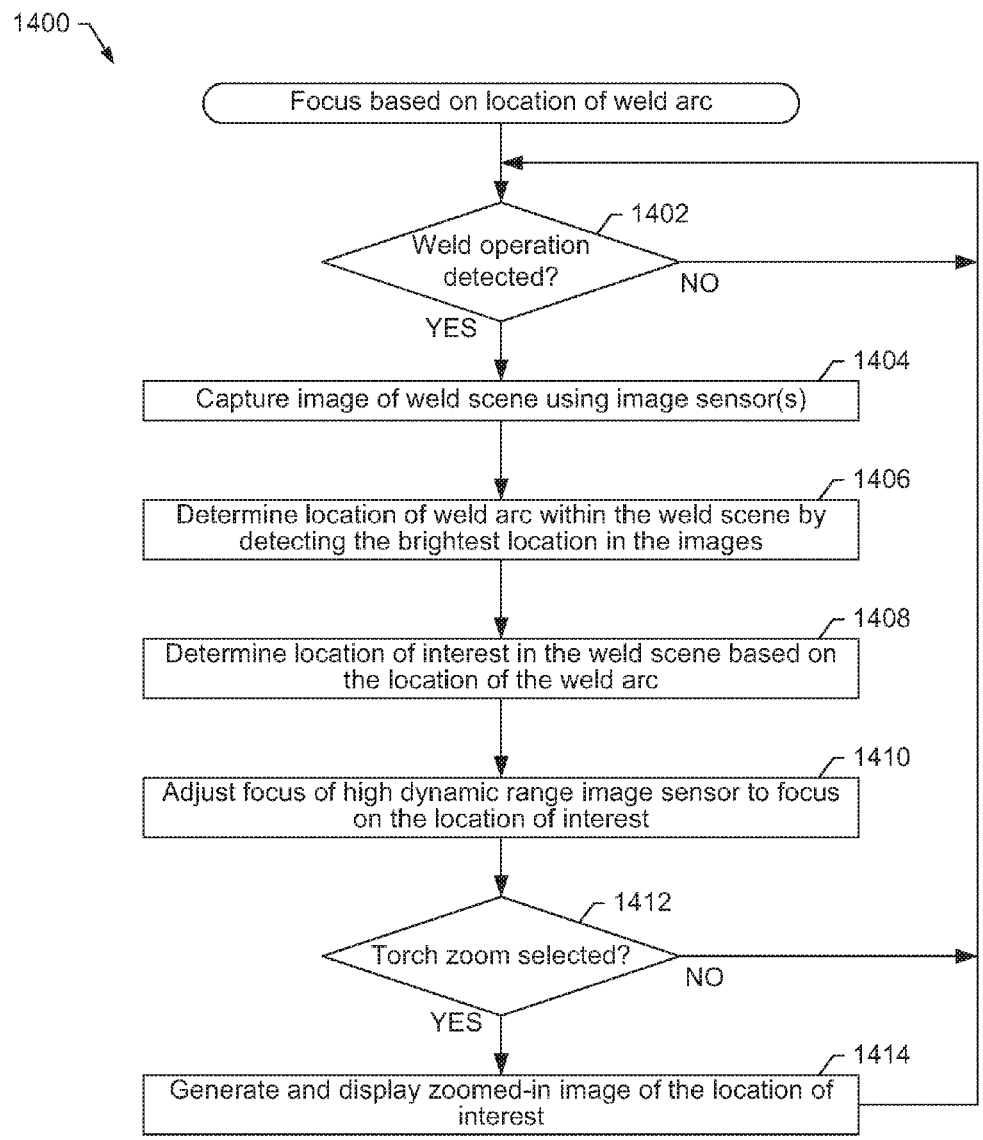
FIG. 14 is a flowchart illustrating example computer readable instructions which may be executed to implement the example headwear of FIGS. 3A-4B to focus and/or zoom an image sensor based on identifying a location of a weld arc.

FIG. 14 is a flowchart illustrating example computer readable instructions 1400 which may be executed to implement the example headwear 20 of FIGS. 3A-4B to focus and/or zoom an image sensor based on identifying a location of a weld arc. The example instructions 1400 may be executed by the processor 410 of FIGS. 3C and/or 4B to focus the image sensor(s) 422 and/or zoom an image captured by the image sensor(s) for display on the display 304. The instructions may be performed in conjunction with any of the other instructions of FIGS. 6A, 7A, 9, 10, 12, and/or 13. At block 1402, the processor 410 determines whether a weld operation is detected. For example, the processor 410 may process one or more images from the image sensor(s) 422 to determine whether an arc is present based on whether a brightness of the image and/or any portion of the image exceeds a threshold. If a weld operation is not detected (block 1402), control iterates until a weld operation is detected.

When a weld operation is detected (block 1402), the image sensor(s) 422 capture image(s) of the weld scene (block 1404). In some examples, the image sensor(s) 422 capture multiple images to facilitate generation of HDR, WDR, or MDR images.

In block 1406, the processor 410 determines a location of a weld arc within the weld scene by detecting the brightest location (e.g., region) in the image(s). In some cases in which multiple (e.g., stereoscopic) image sensors are used, a three-dimensional location of the arc is determined.

In block 1408, the processor 410 determines a location of interest in the weld scene based on the location of the weld arc. For example, the processor 410 may determine the location of the weld puddle as a short distance from the location of the weld arc, due to the relationship between the weld arc and the weld puddle.

In block 1410, the example processor 410 controls the camera(s) 414 (e.g., HDR image sensors) to focus on the location of interest. By focusing on the location of interest, the processor 410 may improve the operator's view of the location of interest.

In block 1412, the processor 410 determines whether a torch zoom is selected. When the torch zoom is selected (block 1412), the processor 410 generates and displays (e.g., via the display 304) a zoomed-in image of the location of interest.

After generating and presenting the zoomed in image (block 1414), or if the torch zoom is not selected (block 1412), control returns to block 1402.

Figure 15:
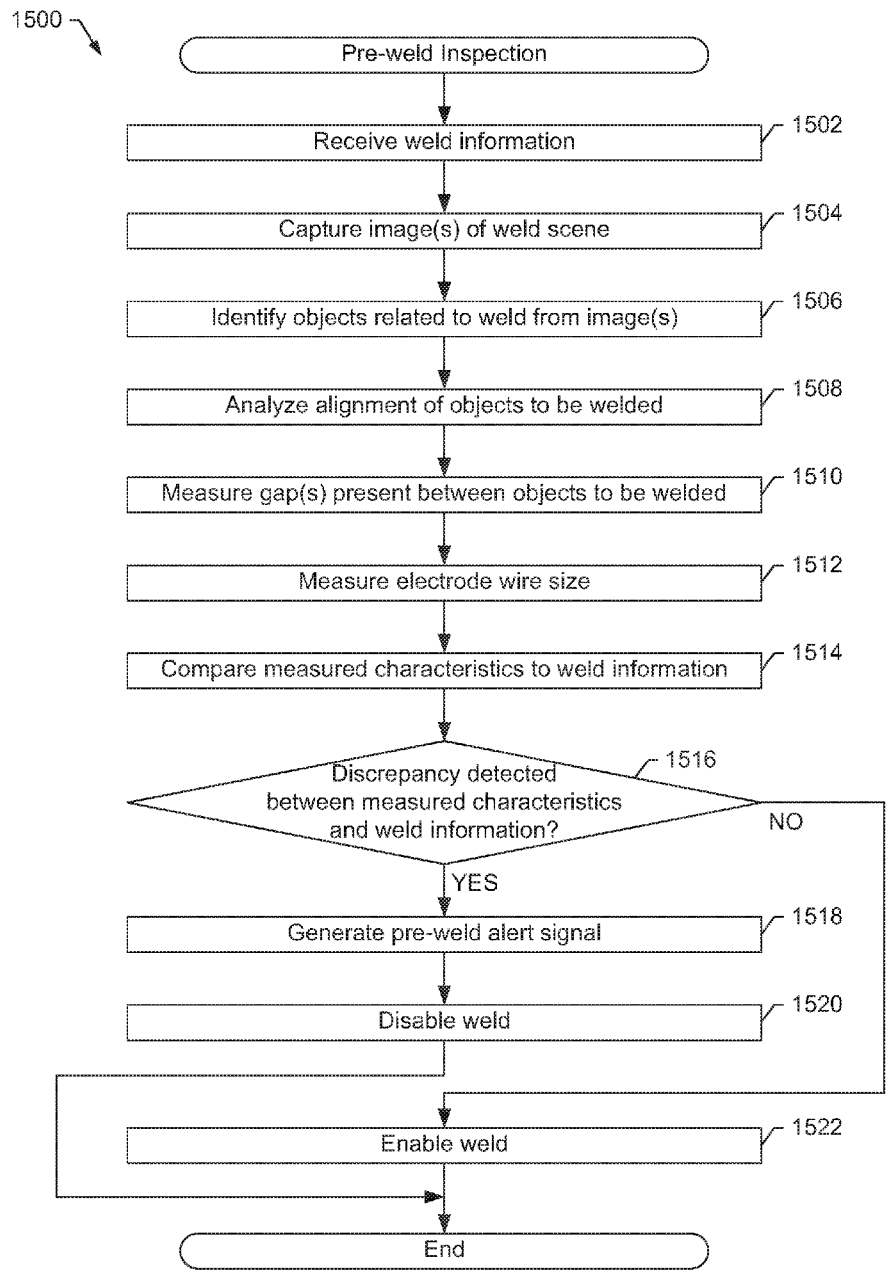
FIG. 15 is a flowchart representative of example machine readable instructions which may be executed to implement the example headwear of FIGS. 3A-4B to perform a pre-weld inspection of a weld scene.

FIG. 15 is a flowchart representative of example machine readable instructions 1500 which may be executed to implement the example headwear 20 of FIGS. 3A-4B to perform a pre-weld inspection of a weld scene. While the example instructions 1500 are described with reference to the processor 410, the example instructions 1500 may be implemented using external processing resources such as cloud computing or any other external computing resources.

In block 1502, the processor 410 receives weld information, such as a WPS, equipment information, workpiece information and/or any other information describing the weld operation. The processor 410 may receive the weld information via the communications interface and/or via user input.

In block 1504, the camera(s) 414 capture image(s) of the weld scene. In block 1506, the processor 410 processes the images to identify objects related to the weld. For example, the processor 410 may identify the workpiece (e.g., one or more pieces to be welded), a weld torch, an electrode wire, and/or any other objects in the images of the weld scene.

In block 1508, the processor 410 analyzes the alignment of the objects to be welded. For example, the processor 410 may identify the outline(s) of the pieces to be welded and compare the positions of the pieces based on the outline(s). For example, if a surface of a first piece to be welded is abutting an incorrect surface of a second piece to be welded, the processor 410 may identify that the orientation of identified edges, surfaces, and/or cross-sections of the first and second pieces do not match the weld information.

In block 1510, the processor 410 measures gap(s) present between the pieces to be welded. In block 1512, the processor 410 measures electrode wire size based on the image. For example, the processor 410 may use a reference to determine measurements of distance, and apply the measurements to one or more gaps between pieces to be welded and/or to determine the electrode wire size. Example references include markers having known sizes, orientations, and/or spacing in the image, and/or a known distance between multiple image sensors (e.g., stereoscopic image sensors). From the reference(s), the processor 410 can measure the gap(s) and/or electrode wire sizes. In some examples, the measurements may be determined from stereoscopic images taken by the camera(s) 414. The example electrode wire may be identified for measurement based on performing edge detection and/or other image processing techniques on the image to identify a welding gun and the electrode wire in proximity.

Additionally or alternatively, the processor 410 identifies and verifies acceptable weld conditions and/or unacceptable weld conditions such as: whether the appropriate welding tool (e.g., torch) is identified; whether identified welding consumable(s) matches the consumable(s) that are specified in a WPS (e.g., based on matching an identification code, such as a QR code, with a code specified in the WPS); whether there is a proper fixture engagement of workpiece (e.g., if work clamp(s) are engaged, whether tack welds exist and/or are in the correct pattern(s) and/or location(s)); whether a voltage sense lead is connected; whether the contact tip and/or nozzle are in acceptable condition; whether the workpiece surface has been properly cleaned in accordance with a WPS (e.g., based on color); whether the workpiece fit-up (e.g., gap between parts) is within a tolerance window, and/or any other visually identifiable weld condition.

In block 1514, the processor 410 compares the measured characteristics (e.g., alignment, gap sizes, electrode wire sizes, etc.) to the weld information (e.g., from the WPS). In block 1516, the processor 410 determines whether a discrepancy is detected between the measured characteristics and the weld information. For example, the processor 410 may determine whether the workpieces are out of alignment by more than threshold, whether any gaps are larger than is permissible, and/or whether the electrode wire size is incorrect, based on the weld information for the weld to be performed.

If the processor 410 detects any discrepancies (block 1516), in block 1518 the processor 410 generates a pre-weld alert signal. The pre-weld alert signal may be displayed via the display 304, output via the speaker driver 412, and/or communicated to the equipment 12 via the communications interface 406. In block 1520, the processor 410 disables (e.g., prevents) the weld by communicating a disable signal to the equipment via the communications interface 406. In some examples, the pre-weld alert signal serves as the disable signal to the equipment 12. While the weld is disabled, a pull of the weld torch trigger by the user does not result in an arc start. In some examples, the weld is disabled until another pre-weld inspection is passed, or the weld is manually enabled by the operator and/or a supervisor.

If the processor 410 does not detect any discrepancies (block 1516), in block 1522 the processor 410 enables the weld. For example, the processor 410 provides an enable signal to the equipment 12. In some examples, the weld is enabled until the processor 410 sends a disable signal.

After disabling the weld (block 1520) or enabling the weld (block 1522), the example instructions 1500 end.

Figure 16:
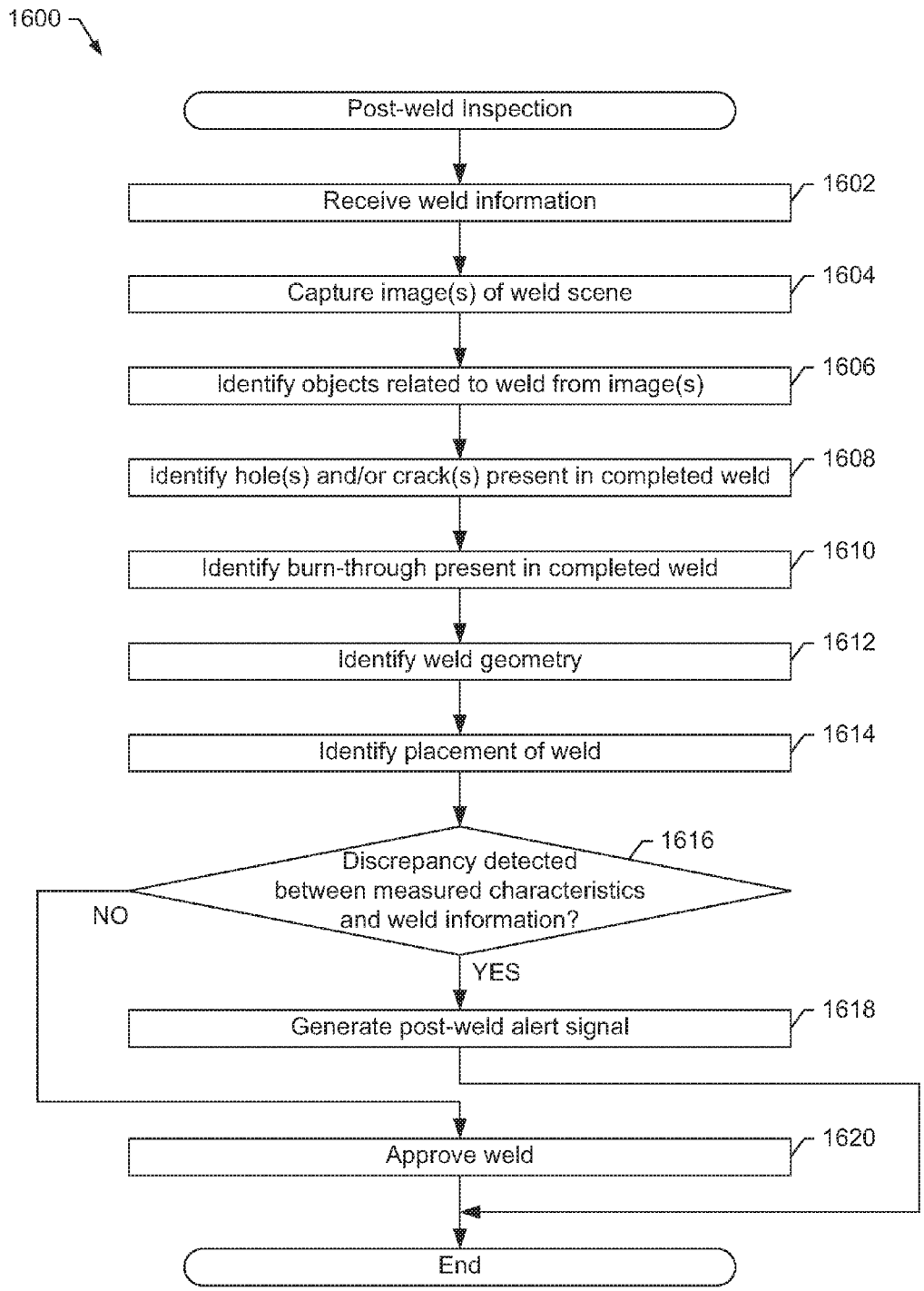
FIG. 16 is a flowchart representative of example machine readable instructions which may be executed to implement the example headwear of FIGS. 3A-4B to perform a post-weld inspection of a weld scene.

FIG. 16 is a flowchart representative of example machine readable instructions 1600 which may be executed to implement the example headwear 20 of FIGS. 3A-4B to perform a post-weld inspection of a weld scene. While the example instructions 1600 are described with reference to the processor 410, the example instructions 1600 may be implemented using external processing resources such as cloud computing or any other external computing resources.

In block 1602, the processor 410 receives weld information, such as a WPS, equipment information, workpiece information and/or any other information describing the weld operation. The processor 410 may receive the weld information via the communications interface and/or via user input.

In block 1604, the camera(s) 414 capture image(s) of the weld scene. In block 1606, the processor 410 processes the images to identify objects related to the weld. For example, the processor 410 may identify the workpiece (e.g., one or more pieces to be welded), a weld torch, an electrode wire, and/or any other objects in the images of the weld scene.

In block 1608, the processor 410 identifies hole(s) and/or crack(s) present in the completed weld. For example, the processor 410 may identify holes and/or cracks based on identifying colors and/or shapes in the weld bead that are substantially different than the surrounding weld bead. In block 1610, the processor 410 identifies burn-through present in the completed weld. For example, the processor 410 may identify burn-through by analysis of the images using burn-through shapes and/or colors based on the material.

In block 1612, the processor 410 identifies the weld geometry. For example, the processor 410 may analyze the path of the completed weld bead to determine the size of the weld and/or the length of the weld. In block 1614, the processor 410 identifies the placement of the weld. For example, the processor 410 may determine whether the workpiece was welded at a correct location and/or whether spot welds were properly placed. The processor 410 may use reference points to determine measurements of distance, and apply the measurements to analyze the weld geometry and/or placement. In some examples, the measurements may be determined from stereoscopic images taken by the camera(s) 414.

In block 1616, the processor 410 determines whether any discrepancies between the measured characteristics and the weld information are detected. For example, the processor 410 may determine whether there are any holes, cracks, and/or burn-through present, if the weld geometry is outside of a threshold acceptable geometry, and/or if the weld was improperly located. If discrepancies are identified (block 1616), in block 1618 the processor 410 generates a post-weld alert signal. The post-weld alert signal may be displayed via the display 304, output via the speaker driver 412, and/or communicated to the equipment 12 and/or to a weld monitoring server via the communications interface 406.

On the other hand, if no discrepancies are identified (block 1616), in block 1620 the processor 410 approves the weld. The processor 410 may send a weld approval signal to the equipment and/or to a weld monitoring server.

After generating the post-weld alert signal (block 1618), or after approving the weld (block 1620), the example instructions 1600 end.

Figure 17:
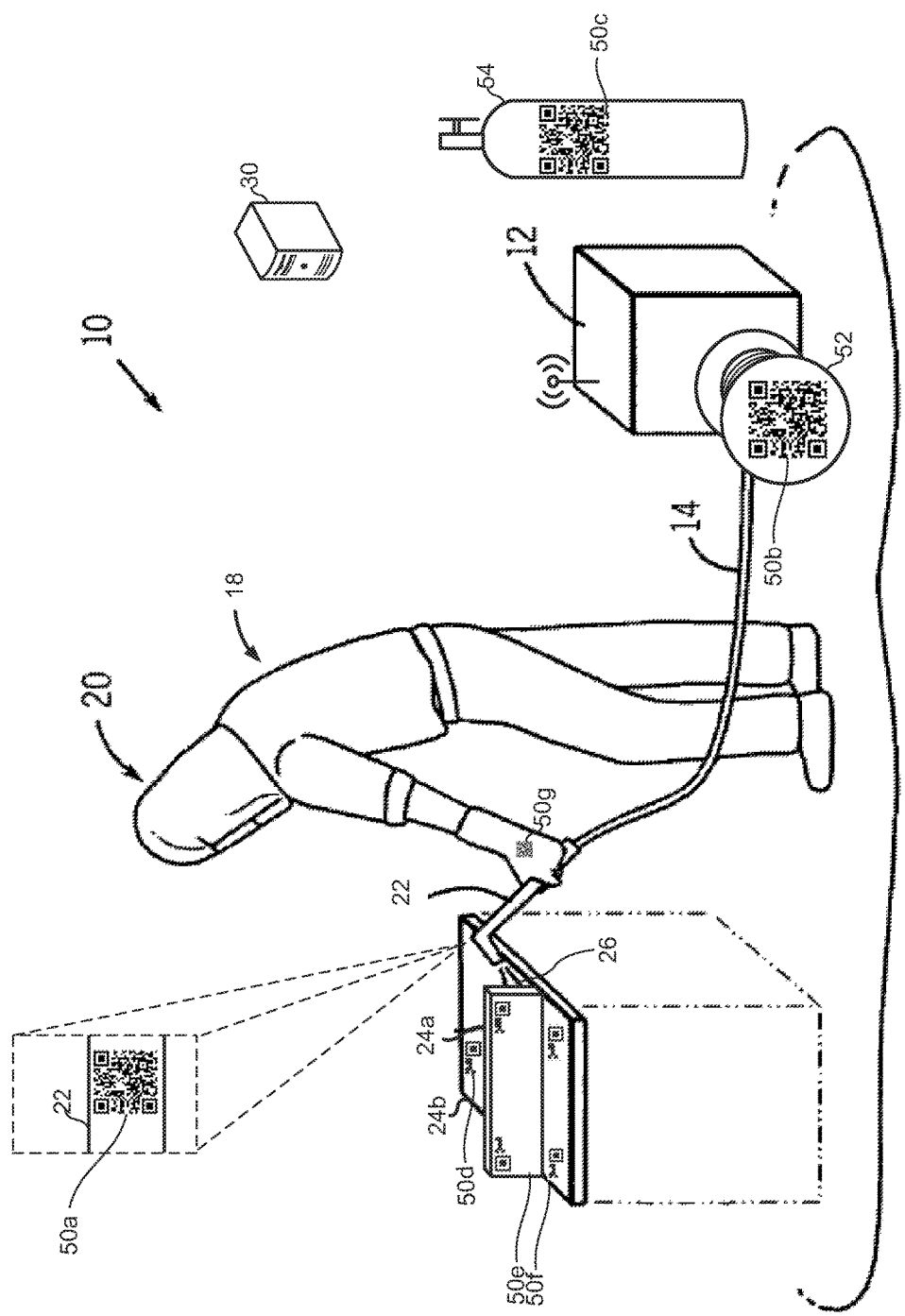
FIG. 17 illustrates another example of the welding system in accordance with aspects of this disclosure.

FIG. 17 illustrates another example of the welding system 10 in which an operator 18 is wearing welding headwear 20 and welding workpieces 24*a* and 24*b* using the torch 22 to which power or fuel is delivered by equipment 12 via a conduit 14. In the example of FIG. 17, the camera(s) 414 may be used for operator identification. For example, the operator may face the camera and may be logged into the welding system by facial recognition software analyzing the facial features of the operator and compare it with a database of authorized operators for particular equipment or for a particular weld job. A qualification record of the operator may be automatically checked for presence and expiration. Similarly, when the operator is wearing the helmet, the camera may capture identifying features (e.g., information tags or high contrast markers 50) of welding gun, power source, consumables such as gas and wire, etc. Image processing software may log in the proper gun, consumables, etc. for the weld job and check against a WPS (weld procedure specification) for mistakes. The markers 50 could be, for example, barcodes or QR codes printed on the packaging of the welding consumables (e.g., QR code 50*b* on the spool 52 and QR code 50*c* on gas cylinder 54) so that proper consumables can be identified for conformance to WPS prior to welding. Another example is that a QR code 50*g* on the operator gloves can be used to log in the operator to the welding system and the operator credentials (his/her WPQ) are verified and accepted. Another example is that a QR code near the joint (e.g. QR code 50*d*) is used to identify the weld number within a weldment assembly so that the proper weld sequence can be enforced and the weld procedure for that particular joint can be recalled or set automatically by the welding equipment 12. Alternatively, high contrast markers can be printed on stickers or pre-etched on the workpieces 24*a* and 24*b* (e.g., marker strips 50*e*, and 50*f*) and welding gun (e.g., marker 50*a*) to track gun position, orientation and motion relative to the seam. Information such as gun travel speed, gun orientation relative to the joint (i.e. torch angle and travel angle) and wire placement relative to the center of the joint can be extracted from image processing. The marker 50*a*, 50*e*, and 50*f* may, for example, be printed with near-infrared reflective ink or pigments so that they are more visible under the bright arc conditions if the imager of the camera is sensitive to IR but rejects visible arc spectrum. In yet another example, operator 18 may look at the spool 52 and the camera 414 in the headwear 20 can capture the image of wire spool 52 and the corresponding image processing will determine if the spool is low on wire and needs replenishment. Similarly, operator 18 may hold the torch 22 close to the helmet and visually inspect the front end of the torch 22 for the Third Eye camera to capture the tip and the nozzle conditions. The corresponding image processing will determine if the tip or the nozzle need to be changed based on a predetermined criteria. Another example is, after welding, operator 18 may visually inspect the weld he/she just completed. The Third Eye camera may automatically capture the image of the weld and compute the actual length, width, bead shape and exterior defects or discontinuities of the weld and compare the measurements with the quality criteria for visual acceptance. Missing weld, oversized weld, undersized weld or poor quality weld can be automatically flagged in the system. Operator 18 may be notified on the spot via speaker driver 412.

Figure 18:
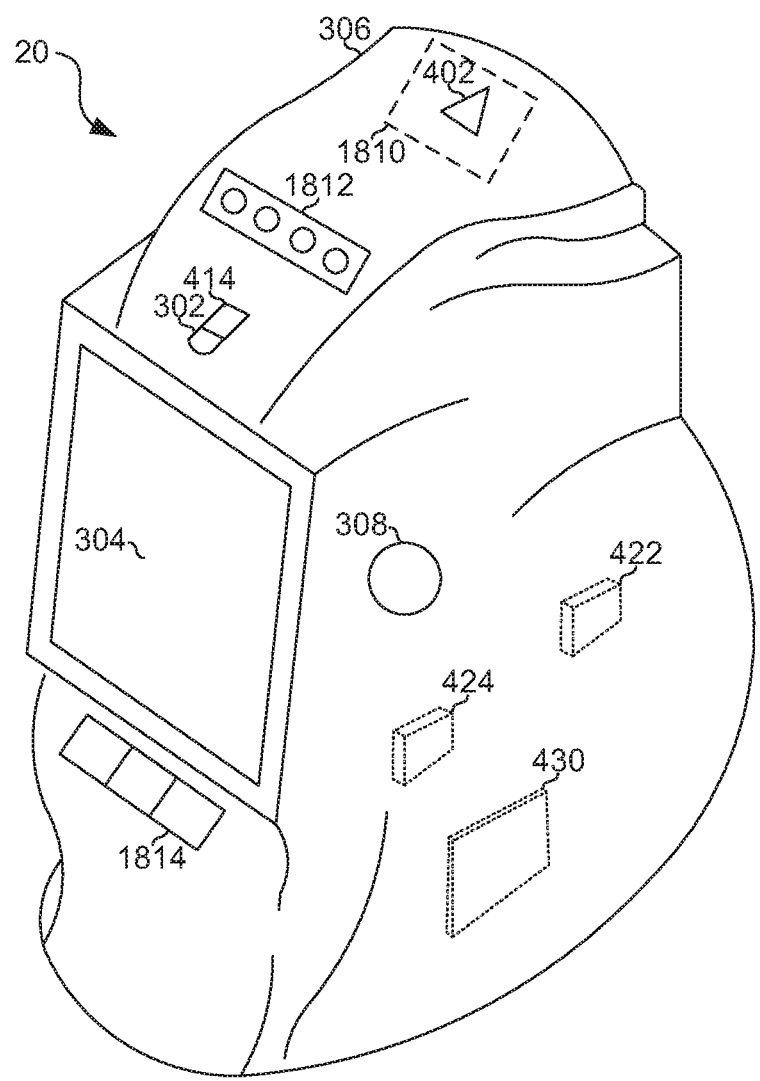
FIG. 18 illustrates another example welding headwear in accordance with aspects of this disclosure.

FIG. 18 illustrates another example welding headwear 20 including electromagnetic shielding 1810, a light source 1812, and solar cells 1814. The example headwear 20 further includes the optical components 302, the display 304, the user interface components 308, the antenna 402, the camera(s) 414, the sensors 422, the power source 424, and the PCB 430.

The shielding 1810 may be positioned to shield the wearer from electromagnetic emissions from the antenna 402 and other electronic components of the headwear 20.

The light source 1812 may include, for example, a super bright LED array to help illuminate the weld scene. To conserve battery, control circuitry may activate the light source 312 only it is determined that additional lighting would be beneficial (e.g., when the brightness of the weld scene without the additional lighting is beyond the capabilities of the camera(s) 414, such as before the arc is lit). Additionally, or alternatively, the light source may be activated and deactivated by an operator interface, such as a voice command, upon pull of the trigger of the welding torch, etc.

Figure 19:
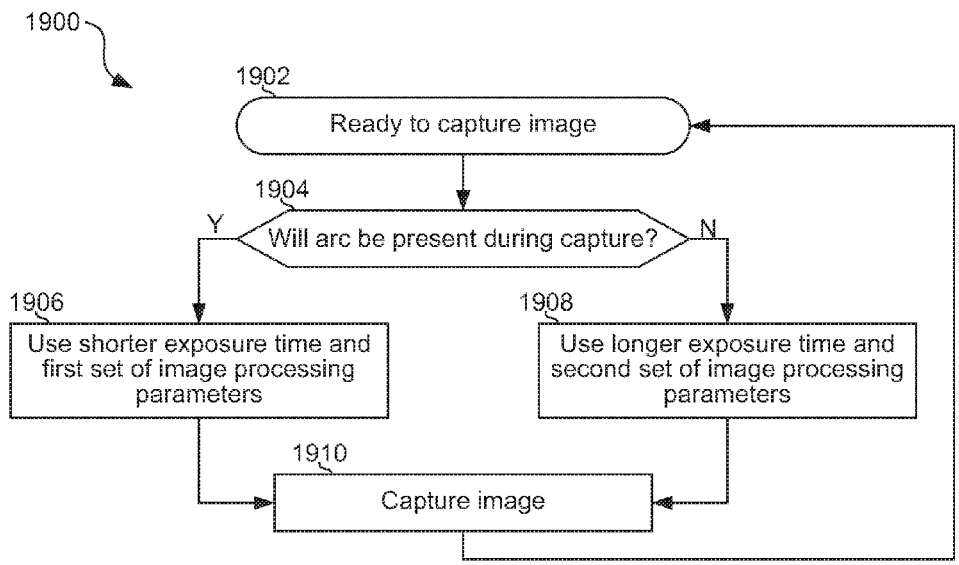
FIG. 19 is a flowchart illustrating a process for automatic exposure control in accordance with aspects of this disclosure.

FIG. 19 is a flowchart illustrating a process 1900 for automatic exposure control. The example method 1900 may be performed by the headwear 20 of FIGS. 3A-4B and/or 18.

In block 1902, the camera(s) 414 are ready to capture an image. In block 1904, circuitry of the headwear 20 determines whether a welding arc will be present when the image is captured.

If the arc will be present, then in block 1906 a relatively shorter exposure time, and first set of image processing parameters and algorithms, are used to reveal the details of the dark areas such as joint and wire extension. The first set of image processing parameters may comprise, for example, relatively more aggressive image compression and digital image filtering of the bright scene.

Returning to block 1904, if the arc will not be present during the image capture, longer exposure can be used together with a second set image processing parameters and algorithms may be used. The second set of image processing parameters and algorithms may comprise, for example, relatively less aggressive image compression ratio and digital image filtering for the dark scene.

In block 1910 the image is captured using the exposure and parameters and algorithms determined in either block 1906 or 1908 and then the process returns to block 1902 for the next capture.

Returning to block 1904, there are a variety of ways in which it may be determined whether the arc will be present during the capture. In an example implementation, arc signals (e.g., communicated to the headwear 20 from equipment 12) may be used as a feed forward signal to adapt the exposure time. For example, if the arc voltage sensed (not including the welding cable voltage and electrode stickout voltage) is greater than 14V, it may be determined that an arc is present and will likely remain present for the impending image capture.

In another example implementation, rather than predicting merely the presence or absence of the arc, brightness of the arc may be predicted and used for adapting the exposure time and/or image processing parameters. For example, the level of arc voltage or arc current (or the product of voltage and current which is the arc power) can be used to predict the brightness of the scene and choose exposure and image processing parameters and algorithms accordingly. This is useful not only during arc start and stop, but in welding process where the arc brightness changes quickly, (e.g., in 20 Hz to 250 Hz frequency), such as in pulse welding and short circuiting welding.

Figure 20:
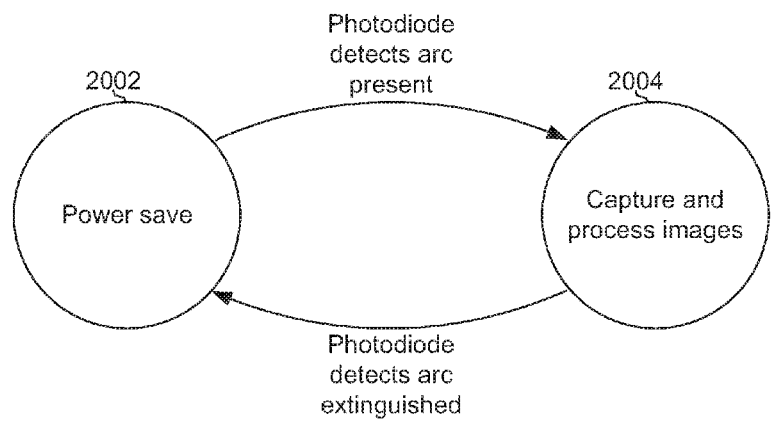
FIG. 20 is a state diagram illustrating example operation of welding headwear in accordance with aspects of this disclosure.

FIG. 20 is a state diagram illustrating example operation of welding headwear in accordance with aspects of this disclosure. The headwear 20 may power up in state 2002 in which circuitry such as the circuitry residing on PCB 430 is in a power save state. While in state 2002, the camera(s) 414 may not be capturing photos, the communication interface 406 may not be transmitting or receiving any data, etc. While the headwear 20 is in the power save mode, a photodiode of sensor(s) 422 may monitor light incident on it to detect the presence of a welding arc. Upon sensing the presence of a welding arc, the photodiode generates an interrupt which triggers a transition from state 2002 to state 2004. In state 2004, circuitry which was in a power save mode in state 2002 is awakened. For example, the camera(s) 414 may start capturing video, the GPU 418 may process the video, and the communication interface 406 may start streaming the video wirelessly with P2P networking such that they video may be displayed in a web browser of a device nearby. When the photodiode detects that the arc is extinguished, it may trigger circuitry to do transition back to power save mode (including doing some "housekeeping" such as storing state information to memory, etc. and then the system returns to state 2002.

Figure 21A:
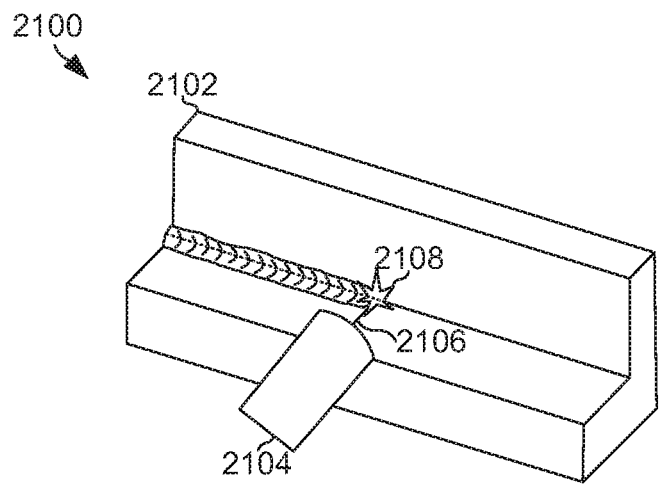
FIGS. 21A and 21B illustrate an example of capturing an image of a weld environment during a short circuit condition of a welding operation in accordance with aspects of this disclosure.
Figure 21B:
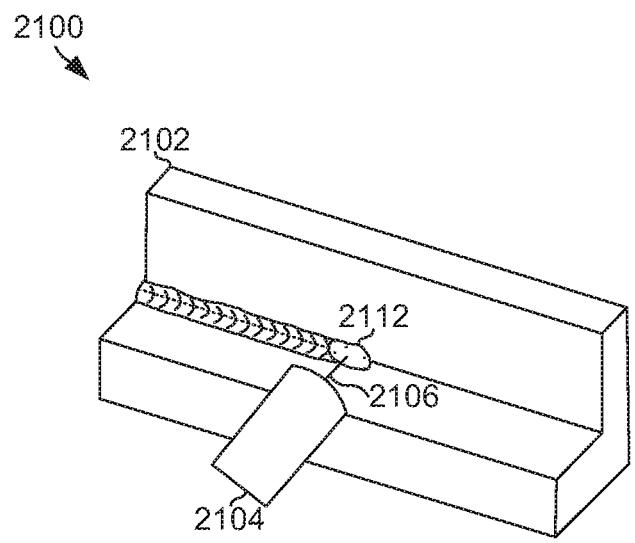

FIGS. 21A and 21B illustrate an example of capturing an image of a weld environment 2100 during a short circuit condition of a welding operation. The example of FIGS. 21A and 21B may be performed by the example headwear 20 of FIGS. 3A-4C to capture images of the welding environment during a welding operation. For example, the headwear 20 may use low-cost optical sensors or cameras (e.g., the camera(s) 414) that do not rely on techniques such as HDR, WDR, MDR, ToF sensing, or any other techniques used to capture images while an electrical arc is present.

Referring to FIG. 21A, the example weld environment 2100 includes a workpiece 2102 which is being welded during an ongoing welding operation. In the welding operation, a torch 2104 is feeding an electrode wire 2106 to the welding operation, and an electrical arc 2108 that has a high brightness is present between the electrode wire 2106 and the workpiece 2102. Due to the high brightness of the arc 2108, images captured of the weld environment 2100 during the presence of the arc 2108 may not show the weld puddle or other features of interest in the weld environment 2100 without the use of HDR and/or other techniques as described above.

Referring to FIG. 21B, the welding operation of FIG. 21A has experienced a short circuit condition in which the electrode wire 2106 makes direct contact with the weld puddle 2112 and/or the workpiece 2102. As a result, the electrical arc 2106 is extinguished (e.g., temporarily) and current flows directly from the electrode wire 2106 to the weld puddle 2112. Because the electrical arc 2106 is not present, the weld environment 2100 has a lower brightness difference between different elements in the weld environment 2100, and images of the weld environment 2100 can be captured using lower-dynamic-range image techniques.

The example processor 410 of the headwear 20 identifies the time periods in which short circuit conditions are present in the welding operation and, during the identified time periods, captures images via the camera(s) 414. The images may be displayed to the wearer of the headwear 20 (e.g., on the display 304), overlaid with one or more simulated objects, stored, and/or transmitted for remote viewing, as described herein.

In some examples, the processor 410 identifies the time periods during which the short circuit conditions are present by receiving one or more signals from the sensor(s) 422 and/or the camera(s) 414 (e.g., brightness values) and/or by receiving data from the equipment 12 via the communications interface 406. Example data that may be received from the equipment 12 includes measured voltage and/or current values output by the power supply and/or the wire feeder, and/or an operating mode of the power supply indicating that the power supply is operating based on a short circuit condition. For example, if the processor 410 receives welding variable values from the equipment 12 that indicates a short circuit condition (e.g., a drop in voltage and/or an increase in current to threshold levels), the processor 410 causes the camera(s) 414 to capture one or more image(s).

In some examples, the processor 410 receives an identification that a controlled short circuit process is being used. Based on the controlled short circuit process and/or weld variable data provided by the equipment, the example processor 410 predicts times at which the short circuit is present and captures images at the predicted time(s). In some examples, the processor 410 transmits a signal to command the equipment 12 to cause a short circuit condition at a particular time.

Figure 22:
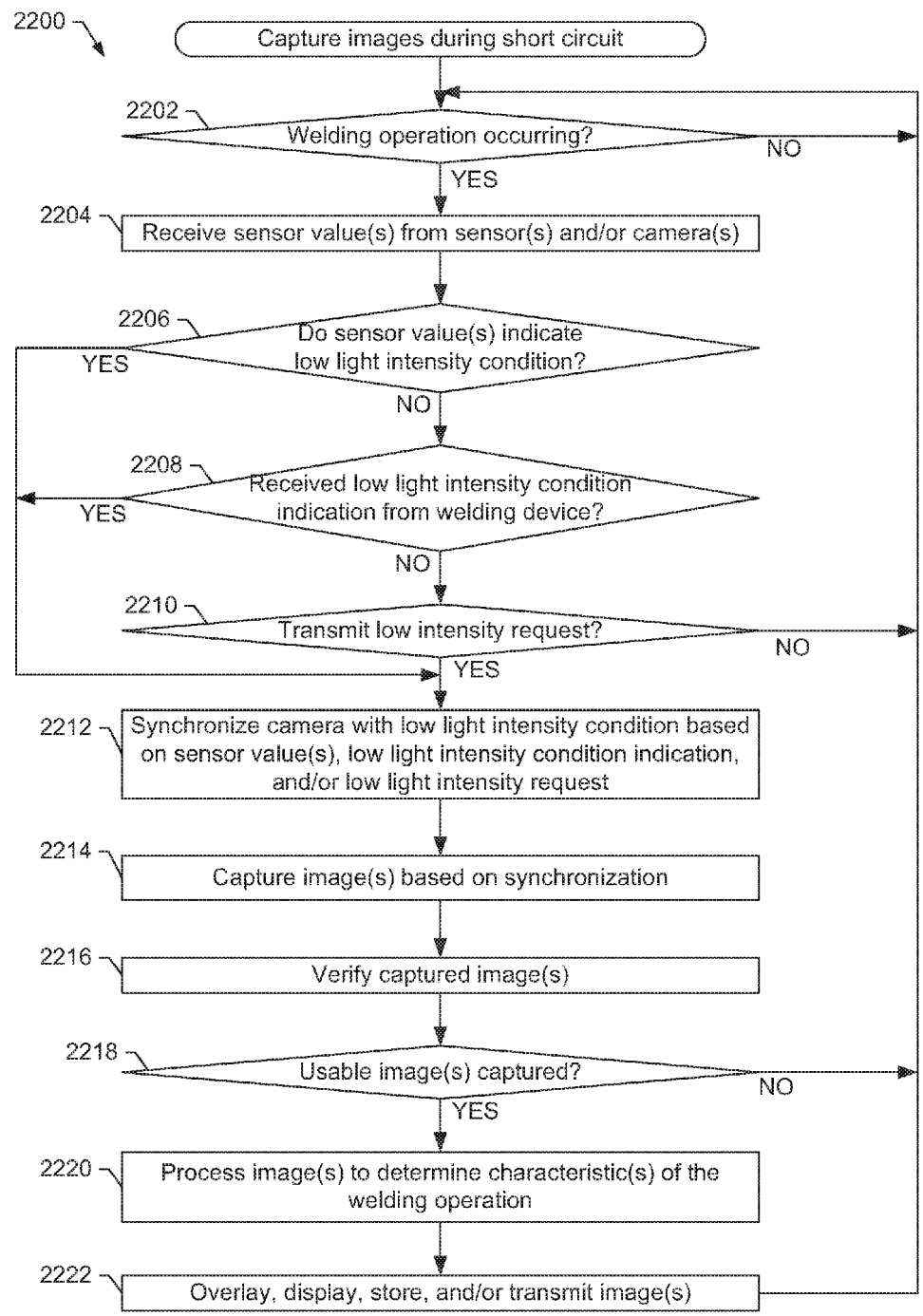
FIG. 22 is a flowchart representative of example machine readable instructions which may be executed to capture an image of a weld environment during a short circuit condition of a welding operation in accordance with aspects of this disclosure.

FIG. 22 is a flowchart representative of example machine readable instructions 2200 which may be executed by the processor 410 of FIGS. 3A-4C to capture an image of a weld environment (e.g., the weld environment 2100 of FIGS. 21A-21B) during a short circuit condition of a welding operation.

At block 2202, the example processor 410 of FIGS. 3A-4C determines whether a welding operation is occurring. If a welding operation is not occurring (block 2202), control returns to block 2202 to await a welding operation.

If a welding operation is occurring (block 2202), at block 2204 the processor 410 receives one or more sensor value(s) from the sensor(s) 422 and/or the camera(s) 414. For example, the sensor value(s) may include a brightness (e.g., luminance) value of an environment around the headwear 20.

At block 2206, the processor 410 determines whether the sensor value(s) indicate a low light intensity condition. A low light intensity condition may occur during a short circuit (e.g., the arc is extinguished) and/or during a low-current condition. In some examples, a low light intensity condition may be determined in a similar or identical manner as an automatically-dimming welding visor determines a condition to reduce a dimming effect. For example, if the brightness values are greater than a threshold brightness value indicating an arc is present, the processor 410 may determine that a low light intensity condition does not exist.

If the sensor value(s) do not indicate a low light intensity condition (block 2206), at block 2208 the processor 410 determines whether a low light intensity condition indication has been received from a welding device. For example, the processor 410 may determine whether a voltage variable, a current variable, and/or any other signal or data has been received (e.g., from the equipment 12 and/or via the communications interface 406) that indicates that a low light intensity condition is present. Example indications of a low light intensity condition include a voltage change measurement (e.g., a threshold voltage drop in a time period) and/or an arc voltage measurement that is less than a threshold (e.g., less than 14V). In some examples in which a controlled short circuit weld process is being used, the processor 410 may receive information identifying the frequency of the short circuit process and/or a waveform of the controlled short circuit process. The processor 410 may use the frequency and/or waveform information to predict the times at which the short circuit conditions occur during the welding operation.

If a short circuit condition indication has not been received (block 2208), at block 2210, the processor 410 determines whether a low light intensity request is to be transmitted (e.g., to cause a short circuit in the welding operation). For example, the processor 410 may request a low light intensity condition to provide an opportunity to capture image(s) if no images have been captured for at least a threshold time period. In some other examples, a low light intensity condition may be requested in response to another condition, such as detecting an anomaly in the welding operation and/or other condition. The example low light intensity request may be formatted to cause a power supply and/or a wire feeder to cause a low light intensity condition by, for example, temporarily increasing a wire feed speed and/or temporarily reducing a weld voltage or weld current (e.g., less than 50 amperes) to reduce an light intensity from the arc. The example weld equipment 12 may respond to the low light intensity request by briefly reducing current in the weld cable by, for example, sinking current output by an inverter to divert the current from the weld cable. The current diversion causes a rapid inverse spike in the weld cable current, which reduces the intensity of the arc light and enables capture of one or more images by the camera(s) 414. If there are no data or communications that indicate that a low light intensity condition exists (blocks 2206-2210), control returns to block 2202.

If the sensor value(s) indicate a low light intensity condition (block 2206), if a low light intensity condition indication has been received (block 2208), and/or if a low light intensity request is transmitted (block 2210), at block 2212 the processor synchronizes the camera(s) 414 with a low light intensity condition based on the sensor value(s), the received low light intensity condition indication, and/or the low light intensity request. For example, the processor 410 may determine, based on sensor values, that a low light intensity condition has already begun and/or currently exists (e.g., there is a short circuit occurring based on a brightness sensor value, and the image(s) should be captured immediately). Additionally or alternatively, the processor 410 may predict a present and/or future low light intensity condition based on received low light intensity indications and/or low light intensity requests. For example, the processor 410 may use the frequency and/or waveform information to predict the times at which the low light intensity conditions occur during the welding operation.

At block 2214, the processor 410 controls the camera(s) 414 to capture one or more image(s) during the time period of the short circuit condition. In some examples, the processor 410 controls an illumination device, such as a light emitting diode (LED) or other light source, to illuminate the area for which images are being captured. When using the illumination source, in some examples the processor 410 turns off the illumination source when not capturing images to conserve energy.

At block 2216, the processor 410 verifies the captured image(s) to determine that the images have suitable brightness and/or contrast characteristics for viewing and/or analysis. At block 2218, the processor 410 determines whether usable image(s) have been captured. If no usable images have been captured (e.g., due to interference or an incorrectly calculated time period) (block 2218), control returns to block 2202.

If usable images have been captured (block 2218), at block 2220 the processor 410 processes the image(s) to determine characteristics of the welding operation (e.g., as described herein). At block 2222, the processor 410 overlays the image(s) (e.g., using simulated objects), displays the image(s) (e.g., on the display 304, with or without the simulated objects), stores the image(s), and/or transmits the image(s), as described herein. Control returns to block 2202 to continue capturing images during low light intensity conditions while the welding operation is ongoing.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A weld training system, comprising:
    a display;
    a camera;
    a communications device to communicate with welding equipment capable of performing actual welding; and
    a welding helmet comprising a view port and configured to hold the camera, the communications device, and the display such that, when the welding helmet is worn by a wearer, the display is viewable by the wearer, the camera has a view through the view port such that the display displays to the wearer images taken by the camera through the view port and displays a simulated object generated based on information received from the welding equipment via the communications device, wherein the display, the camera, and the communications device are in a smartphone or tablet computer attached to the welding helmet.

2. The weld training system as defined in claim 1, wherein the communications device is to transmit a command to welding equipment to cause the welding equipment to operate in a training or simulation mode.

3. The weld training system as defined in claim 2, wherein the communications device is to receive a trigger signal identifying a start of a simulated weld, the display to display the simulated object in response to receiving the trigger signal.

4. The weld training system as defined in claim 1, wherein the smartphone or tablet computer comprises a microphone and a processor configured to:
    recognize a first audio command received via the microphone;
    begin a weld training operation, the weld training operation including displaying the images and the simulated object to the wearer via the display;
    recognize a second audio command received via the microphone; and
    end the weld training operation.

5. The weld training system as defined in claim 1, further comprising a processor to execute software to provide weld training to the wearer.

6. The weld training system as defined in claim 5, the processor is to render at least one of a simulated weld arc, a simulated weld bead, or a simulated weld puddle as the simulated object.

7. The weld training system as defined in claim 1, wherein the communications device is to receive welding parameters from the welding equipment, the system further comprising a processor to:
    process the images to extract a plurality of welding conditions; and
    render the simulated object based on the welding parameters and based on the plurality of welding conditions, the display to superimpose the simulated object on the images with a position and a perspective based on the images.

8. The weld training system as defined in claim 7, wherein the welding conditions comprise at least one of a contact-tip-to-work distance, a workpiece gauge thickness, a workpiece fit-up, a torch aim with respect to a joint seam, a torch travel angle, a torch work angle, or a torch travel speed.

9. The weld training system as defined in claim 7, wherein the simulated object comprises at least one of a simulated weld arc, a simulated weld puddle, simulated spatter, simulated fumes, or a simulated weld bead.

10. The weld training system as defined in claim 9, further comprising a speaker to output at least one of a simulated arc sound or a simulated gas flow sound.

11. The weld training system as defined in claim 7, wherein the welding parameters comprise at least one of a voltage setpoint, an arc length setpoint, a current setpoint, or a wire feed speed setpoint, or a weld program preset.

12. The weld training system as defined in claim 7, wherein the processor is to process the images to extract a characteristic of a weld scene and render the simulated object based further on the characteristic, the characteristic comprising at least one of a welding process type, a torch type, a torch condition, a welding consumable type, a weld joint type, a tack weld presence, a workpiece surface cleanliness, a weld fixture state, or a weld clamp state.

13. The weld training system as defined in claim 1, wherein the communications device is configured to communicate with the weld equipment via wireless communications.

14. The weld training system as defined in claim 1, further comprising a processor to:
    measure a first characteristic of a weld scene by extracting and analyzing features of the images;
    determining whether a difference between the first characteristic and a second characteristic corresponds to an unacceptable weld condition; and when the difference corresponds to the unacceptable weld condition, outputting an alert via the display indicating that the weld scene has the unacceptable weld condition.

15. The weld training system as defined in claim 1, further comprising a processor to:
   analyze the images to identify objects in the images and spatial relationships between the objects;
   render a graphic representative of the spatial relationships; and
   superimpose the graphic over the images on the display.

16. The weld training system as defined in claim 1, wherein the communications device is to communicate with the welding equipment to detect a start of a simulated weld operation or an end of the simulated weld operation, and the display to present the simulated object in response to the start of the simulated welding operation or remove the simulated object in response to the end of the simulated welding operation.

17. The weld training system as defined in claim 1, wherein the camera is a high dynamic range camera and the images are high dynamic range images.

18. The weld training system as defined in claim 1, wherein the camera is a medium dynamic range camera and the images are medium dynamic range images.

19. The weld training system as defined in claim 1, wherein the camera is a wide dynamic range camera and the images are wide dynamic range images.

* * * * *